US012198568B2

(12) United States Patent
Becker et al.

(10) Patent No.: US 12,198,568 B2
(45) Date of Patent: Jan. 14, 2025

(54) WELD TRAINING SIMULATIONS USING MOBILE DEVICES, MODULAR WORKPIECES, AND SIMULATED WELDING EQUIPMENT

(71) Applicants: Illinois Tool Works Inc., Glenview, IL (US); Seabery North America, Inc., Annapolis, MD (US)

(72) Inventors: William Joshua Becker, Manitowoc, WI (US); Olivia Arreola, Appleton, WI (US); Mitchell James Muske, Neenah, WI (US); Veronika Pashkina, Appleton, WI (US); Pedro Gerardo Marquinez Torrecilla, Severna Park, MD (US)

(73) Assignees: ILLINOIS TOOL WORKS INC., Glenview, IL (US); SEABERY NORTH AMERICA, INC., Annapolis, MD (US)

( * ) Notice: Subject to any disclaimer, the term of this patent is extended or adjusted under 35 U.S.C. 154(b) by 0 days.

(21) Appl. No.: 17/103,656

(22) Filed: Nov. 24, 2020

(65) Prior Publication Data
US 2021/0158724 A1    May 27, 2021

Related U.S. Application Data

(60) Provisional application No. 62/940,138, filed on Nov. 25, 2019.

(51) Int. Cl.
*G09B 19/24* (2006.01)
*G06F 3/04847* (2022.01)
(Continued)

(52) U.S. Cl.
CPC ......... *G09B 19/24* (2013.01); *G06F 3/04847* (2013.01); *G06Q 30/0643* (2013.01);
(Continued)

(58) Field of Classification Search
CPC ........ G09B 19/00; G09B 19/24; B23K 9/095; B23K 9/10
See application file for complete search history.

(56) References Cited

U.S. PATENT DOCUMENTS

| 3,555,239 A | 1/1971 | Kerth |
| 3,652,824 A | 3/1972 | Okada |

(Continued)

FOREIGN PATENT DOCUMENTS

| CA | 2725719 A1 | 6/2012 |
| CA | 2778699    | 11/2012 |

(Continued)

OTHER PUBLICATIONS

Anonymous: "AugmentedArc(TM) Augmented Reality Welding System", May 30, 2017 (May 30, 2017), pp. 1-4, XP055501429, Retrieved from the Internet: URL:https://patongroup.com/wp-content/uploads/2017/05/AugmentedArc-Brochure.pdf.

(Continued)

*Primary Examiner* — Kang Hu
*Assistant Examiner* — Correll T French
(74) *Attorney, Agent, or Firm* — McAndrews, Held & Malloy, Ltd.

(57) ABSTRACT

Systems for simulating joining operations, such as welding, are disclosed. In some examples, a system may use a mobile device for conducting welding simulations, such as for purposes of training. In some examples, the system may additionally, or alternatively, use modular workpieces. In some examples, the system may additionally, or alternatively, conduct the welding simulation based on one or more selected pieces of welding equipment.

20 Claims, 23 Drawing Sheets

(51) Int. Cl.
   *G06Q 30/0601* (2023.01)
   *G09B 5/02* (2006.01)
   *G09B 9/00* (2006.01)
   *G06F 3/0482* (2013.01)

(52) U.S. Cl.
   CPC .............. *G09B 5/02* (2013.01); *G09B 9/00* (2013.01); *G06F 3/0482* (2013.01)

(56) References Cited

U.S. PATENT DOCUMENTS

| | | |
|---|---|---|
| 3,927,290 A | 12/1975 | Denley |
| 4,021,840 A | 5/1977 | Ellsworth |
| 4,280,137 A | 7/1981 | Ashida |
| 4,453,085 A | 6/1984 | Pryor |
| 4,477,712 A | 10/1984 | Lillquist |
| 4,482,960 A | 11/1984 | Pryor |
| 4,577,796 A | 3/1986 | Powers |
| 4,602,163 A | 7/1986 | Pryor |
| 4,641,292 A | 2/1987 | Tunnell |
| 4,654,949 A | 4/1987 | Pryor |
| 4,707,647 A | 11/1987 | Coldren |
| 4,733,051 A | 3/1988 | Nadeau |
| 4,753,569 A | 6/1988 | Pryor |
| 4,769,700 A | 9/1988 | Pryor |
| 4,788,440 A | 11/1988 | Pryor |
| 4,812,614 A | 3/1989 | Wang |
| 5,148,591 A | 9/1992 | Pryor |
| 5,275,327 A | 1/1994 | Watkins |
| 5,380,978 A | 1/1995 | Pryor |
| 5,506,682 A | 4/1996 | Pryor |
| 5,572,102 A | 11/1996 | Goodfellow |
| 5,580,475 A | 12/1996 | Sakai |
| 5,602,967 A | 2/1997 | Pryor |
| 5,608,847 A | 3/1997 | Pryor |
| 5,923,555 A | 7/1999 | Bailey |
| 5,932,123 A | 8/1999 | Marhofer |
| 5,956,417 A | 9/1999 | Pryor |
| 5,978,090 A | 11/1999 | Burri |
| 6,044,183 A | 3/2000 | Pryor |
| 6,051,805 A | 4/2000 | Vaidya |
| 6,107,601 A | 8/2000 | Shimagama |
| 6,122,042 A | 9/2000 | Wunderman et al. |
| 6,163,946 A | 12/2000 | Pryor |
| 6,167,607 B1 | 1/2001 | Pryor |
| 6,186,855 B1 | 2/2001 | Bauer et al. |
| 6,230,327 B1 | 5/2001 | Briand |
| 6,240,253 B1 | 5/2001 | Yamaguchi |
| 6,242,711 B1 | 6/2001 | Cooper |
| 6,271,500 B1 | 8/2001 | Hirayama |
| 6,301,763 B1 | 10/2001 | Pryor |
| 6,314,631 B1 | 11/2001 | Pryor |
| 6,315,186 B1 | 11/2001 | Friedl |
| 6,317,953 B1 | 11/2001 | Pryor |
| 6,441,342 B1 | 8/2002 | Hsu |
| 6,476,354 B1 | 11/2002 | Jank |
| 6,479,793 B1 | 11/2002 | Wittmann |
| 6,572,379 B1 | 6/2003 | Sears |
| 6,587,186 B2 | 7/2003 | Bamji |
| 6,734,393 B1 | 5/2004 | Friedl |
| 6,750,428 B2 | 6/2004 | Okamoto |
| 6,754,518 B1 | 6/2004 | Lloyd |
| 7,358,458 B2 | 4/2008 | Daniel |
| 7,523,069 B1 | 4/2009 | Friedl et al. |
| 7,534,005 B1 | 5/2009 | Buckman |
| 7,926,118 B2 | 4/2011 | Becker |
| 7,962,967 B2 | 6/2011 | Becker |
| 7,987,492 B2 | 7/2011 | Liwerant |
| 8,144,193 B2 | 3/2012 | Melikian |
| 8,224,029 B2 | 7/2012 | Saptharishi |
| 8,274,013 B2 | 9/2012 | Wallace |
| 8,275,201 B2 | 9/2012 | Rangwala |
| 8,316,462 B2 | 11/2012 | Becker et al. |
| 8,428,926 B2 | 4/2013 | Choquet |
| 8,502,866 B2 | 8/2013 | Becker |
| 8,512,043 B2 | 8/2013 | Choquet |
| 8,569,646 B2 | 10/2013 | Daniel |
| 8,569,655 B2 | 10/2013 | Cole |
| 8,605,008 B1 | 12/2013 | Prest |
| 8,648,903 B2 | 2/2014 | Loipetsberger |
| 8,657,605 B2 | 2/2014 | Wallace |
| 8,680,432 B2 | 3/2014 | Uecker |
| 8,680,434 B2 | 3/2014 | Stoger et al. |
| 8,747,116 B2 | 6/2014 | Zboray et al. |
| 8,749,396 B2 | 6/2014 | Maggiore |
| 8,777,629 B2 | 7/2014 | Kreindl |
| 8,808,164 B2 | 8/2014 | Hoffman |
| 8,826,357 B2 | 9/2014 | Fink |
| 8,834,168 B2 | 9/2014 | Peters |
| 8,851,896 B2 | 10/2014 | Wallace |
| 8,884,177 B2 | 11/2014 | Daniel |
| 8,911,237 B2 | 12/2014 | Postlethwaite |
| 8,915,740 B2 | 12/2014 | Zboray |
| 8,934,029 B2 | 1/2015 | Nayar |
| 8,957,835 B2 | 2/2015 | Hoellwarth |
| 8,964,298 B2 | 2/2015 | Haddick |
| RE45,398 E | 3/2015 | Wallace |
| 8,987,628 B2 | 3/2015 | Daniel et al. |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,056,365 B2 | 6/2015 | Hoertenhuber |
| 9,073,138 B2 | 7/2015 | Wills |
| 9,089,921 B2 | 7/2015 | Daniel |
| 9,097,891 B2 | 8/2015 | Border |
| 9,101,994 B2 | 8/2015 | Albrecht |
| 9,104,195 B2 | 8/2015 | Daniel |
| 9,196,169 B2 | 11/2015 | Wallace |
| 9,218,745 B2 | 12/2015 | Choquet |
| 9,221,117 B2 | 12/2015 | Conrardy |
| 9,230,449 B2 | 1/2016 | Conrardy |
| 9,235,051 B2 | 1/2016 | Salter |
| 9,244,539 B2 | 1/2016 | Venable |
| 9,269,279 B2 | 2/2016 | Penrod et al. |
| 9,280,913 B2 | 3/2016 | Peters |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,352,411 B2 | 5/2016 | Batzler |
| 9,368,045 B2 | 6/2016 | Becker |
| 9,468,988 B2 | 10/2016 | Daniel |
| 9,483,959 B2 | 11/2016 | Wallace |
| 9,583,014 B2 | 2/2017 | Becker |
| 9,583,023 B2 | 2/2017 | Becker et al. |
| 9,589,481 B2 | 3/2017 | Becker et al. |
| 9,610,476 B1 | 4/2017 | Tran et al. |
| 9,666,160 B2 | 5/2017 | Patel |
| 9,977,242 B2 | 5/2018 | Patel |
| 10,201,868 B2 | 2/2019 | Dunahoo |
| 10,909,872 B2 | 2/2021 | Albrecht |
| 2001/0048519 A1 | 12/2001 | Bamji |
| 2002/0017752 A1 | 2/2002 | Levi |
| 2003/0103075 A1* | 6/2003 | Rosselot ............. H04L 41/22 348/E7.083 |
| 2004/0034608 A1 | 2/2004 | de Miranda et al. |
| 2004/0189675 A1 | 9/2004 | Pretlove |
| 2005/0001155 A1 | 1/2005 | Fergason |
| 2005/0099102 A1 | 5/2005 | Villarreal |
| 2005/0103767 A1 | 5/2005 | Kainec |
| 2005/0161357 A1 | 7/2005 | Allan |
| 2005/0199605 A1 | 9/2005 | Furman |
| 2006/0087502 A1 | 4/2006 | Karidis |
| 2006/0090135 A1 | 4/2006 | Fukuda |
| 2006/0176467 A1 | 8/2006 | Rafii |
| 2006/0207980 A1 | 9/2006 | Jacovetty |
| 2006/0213892 A1 | 9/2006 | Ott |
| 2006/0281971 A1 | 12/2006 | Sauer |
| 2007/0187378 A1 | 8/2007 | Karakas |
| 2008/0083351 A1 | 4/2008 | Lippert |
| 2008/0158502 A1 | 7/2008 | Becker |

(56) References Cited

U.S. PATENT DOCUMENTS

| | | |
|---|---|---|
| 2008/0187235 A1 | 8/2008 | Wakazono |
| 2008/0314887 A1 | 12/2008 | Stoger |
| 2009/0014500 A1 | 1/2009 | Cho et al. |
| 2009/0134203 A1 | 5/2009 | Domec et al. |
| 2009/0231423 A1 | 9/2009 | Becker |
| 2009/0276930 A1 | 11/2009 | Becker |
| 2009/0298024 A1 | 12/2009 | Batzler |
| 2010/0036624 A1 | 2/2010 | Martin |
| 2010/0048273 A1 | 2/2010 | Wallace |
| 2010/0062406 A1 | 3/2010 | Zboray |
| 2010/0079356 A1 | 4/2010 | Hoellwarth |
| 2010/0206851 A1 | 8/2010 | Nakatate |
| 2010/0223706 A1 | 9/2010 | Becker |
| 2010/0262468 A1 | 10/2010 | Blankenship |
| 2011/0006047 A1 | 1/2011 | Penrod |
| 2011/0083241 A1 | 4/2011 | Cole |
| 2011/0091846 A1 | 4/2011 | Kreindl |
| 2011/0108536 A1 | 5/2011 | Inada |
| 2011/0117527 A1 | 5/2011 | Conrardy |
| 2011/0187859 A1 | 8/2011 | Edelson |
| 2011/0220616 A1 | 9/2011 | Mehn |
| 2011/0220619 A1 | 9/2011 | Mehn |
| 2011/0227934 A1 | 9/2011 | Sharp |
| 2011/0309236 A1 | 12/2011 | Tian |
| 2012/0006800 A1 | 1/2012 | Ryan |
| 2012/0012561 A1 | 1/2012 | Wiryadinata |
| 2012/0074114 A1 | 3/2012 | Kawamoto |
| 2012/0122062 A1 | 5/2012 | Yang et al. |
| 2012/0152923 A1 | 6/2012 | Sickels |
| 2012/0176659 A1 | 7/2012 | Hsieh |
| 2012/0180180 A1 | 7/2012 | Steve |
| 2012/0189993 A1 | 7/2012 | Kindig |
| 2012/0229632 A1 | 9/2012 | Hoertenhuber |
| 2012/0241429 A1 | 9/2012 | Knoener |
| 2012/0249400 A1 | 10/2012 | Demonchy |
| 2012/0262601 A1 | 10/2012 | Choi |
| 2012/0291172 A1 | 11/2012 | Wills |
| 2012/0298640 A1 | 11/2012 | Conrardy |
| 2012/0305532 A1 | 12/2012 | Harris |
| 2013/0050432 A1 | 2/2013 | Perez |
| 2013/0081293 A1 | 4/2013 | Delin |
| 2013/0112678 A1 | 5/2013 | Park |
| 2013/0163090 A1 | 6/2013 | Yu |
| 2013/0189657 A1 | 7/2013 | Wallace |
| 2013/0189658 A1 | 7/2013 | Peters |
| 2013/0200882 A1 | 8/2013 | Almalki |
| 2013/0206740 A1 | 8/2013 | Pfeifer |
| 2013/0206741 A1 | 8/2013 | Pfeifer et al. |
| 2013/0208569 A1 | 8/2013 | Pfeifer |
| 2013/0215281 A1 | 8/2013 | Hobby |
| 2013/0229485 A1 | 9/2013 | Rusanovskyy |
| 2013/0234935 A1 | 9/2013 | Griffith |
| 2013/0252214 A1 | 9/2013 | Choquet |
| 2013/0288211 A1 | 10/2013 | Patterson |
| 2013/0291271 A1 | 11/2013 | Becker |
| 2013/0321462 A1 | 12/2013 | Salter |
| 2013/0345868 A1 | 12/2013 | One |
| 2014/0014637 A1 | 1/2014 | Hunt |
| 2014/0014638 A1 | 1/2014 | Artelsmair |
| 2014/0017642 A1 | 1/2014 | Postlethwaite |
| 2014/0020147 A1 | 1/2014 | Anderson |
| 2014/0042135 A1 | 2/2014 | Daniel et al. |
| 2014/0042136 A1 | 2/2014 | Daniel et al. |
| 2014/0042137 A1 | 2/2014 | Daniel et al. |
| 2014/0059730 A1 | 3/2014 | Kim |
| 2014/0063055 A1 | 3/2014 | Osterhout |
| 2014/0065584 A1 | 3/2014 | Wallace |
| 2014/0092015 A1 | 4/2014 | Xing |
| 2014/0097164 A1 | 4/2014 | Beistle |
| 2014/0134579 A1 | 5/2014 | Becker |
| 2014/0134580 A1 | 5/2014 | Becker |
| 2014/0144896 A1 | 5/2014 | Einav |
| 2014/0159995 A1 | 6/2014 | Adams |
| 2014/0183176 A1 | 7/2014 | Hutchison |
| 2014/0184496 A1 | 7/2014 | Gribetz |
| 2014/0185282 A1 | 7/2014 | Hsu |
| 2014/0205976 A1 | 7/2014 | Peters |
| 2014/0220522 A1 | 8/2014 | Peters |
| 2014/0232825 A1 | 8/2014 | Gotschlich |
| 2014/0234813 A1 | 8/2014 | Peters |
| 2014/0263224 A1 | 9/2014 | Becker |
| 2014/0263227 A1 | 9/2014 | Daniel et al. |
| 2014/0263249 A1 | 9/2014 | Miller |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0315167 A1 | 10/2014 | Kreindl |
| 2014/0320529 A1 | 10/2014 | Roberts |
| 2014/0322684 A1 | 10/2014 | Wallace |
| 2014/0326705 A1 | 11/2014 | Kodama |
| 2014/0346158 A1 | 11/2014 | Matthews |
| 2014/0349256 A1 | 11/2014 | Connor |
| 2015/0009316 A1 | 1/2015 | Baldwin |
| 2015/0034618 A1 | 2/2015 | Langeder |
| 2015/0056584 A1 | 2/2015 | Boulware |
| 2015/0056585 A1 | 2/2015 | Boulware |
| 2015/0072323 A1 | 3/2015 | Postlethwaite |
| 2015/0116366 A1 | 4/2015 | Daveney et al. |
| 2015/0125836 A1 | 5/2015 | Daniel |
| 2015/0154884 A1 | 6/2015 | Salsich |
| 2015/0170539 A1 | 6/2015 | Barrera |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | DeLisio |
| 2015/0228203 A1 | 8/2015 | Kindig |
| 2015/0235565 A1 | 8/2015 | Postlethwaite |
| 2015/0248845 A1 | 9/2015 | Postlethwaite |
| 2015/0264992 A1 | 9/2015 | Happel |
| 2015/0268663 A1 | 9/2015 | Daniel et al. |
| 2015/0304538 A1 | 10/2015 | Huang |
| 2015/0320601 A1 | 11/2015 | Gregg |
| 2015/0325153 A1 | 11/2015 | Albrecht |
| 2015/0348439 A1 | 12/2015 | Zboray |
| 2015/0348441 A1 | 12/2015 | Zboray |
| 2015/0352653 A1 | 12/2015 | Albrecht |
| 2015/0356888 A1 | 12/2015 | Zboray |
| 2015/0375324 A1 | 12/2015 | Becker |
| 2015/0375327 A1 | 12/2015 | Becker |
| 2015/0379894 A1 | 12/2015 | Becker |
| 2016/0012750 A1 | 1/2016 | Wallace |
| 2016/0027215 A1 | 1/2016 | Burns |
| 2016/0039034 A1 | 2/2016 | Becker |
| 2016/0039053 A1 | 2/2016 | Becker |
| 2016/0045971 A1 | 2/2016 | Holverson |
| 2016/0049085 A1 | 2/2016 | Beeson |
| 2016/0093233 A1 | 3/2016 | Boulware |
| 2016/0107257 A1 | 4/2016 | Denis |
| 2016/0114418 A1 | 4/2016 | Jones |
| 2016/0125592 A1 | 5/2016 | Becker et al. |
| 2016/0125593 A1 | 5/2016 | Becker |
| 2016/0125594 A1 | 5/2016 | Becker |
| 2016/0125761 A1 | 5/2016 | Becker |
| 2016/0125762 A1 | 5/2016 | Becker |
| 2016/0125763 A1 | 5/2016 | Becker |
| 2016/0125764 A1 | 5/2016 | Becker |
| 2016/0142596 A1 | 5/2016 | Depaschoal |
| 2016/0155358 A1 | 6/2016 | Zboray |
| 2016/0155359 A1* | 6/2016 | Zboray ............... G09B 5/00 434/234 |
| 2016/0155360 A1 | 6/2016 | Zboray et al. |
| 2016/0155361 A1 | 6/2016 | Peters |
| 2016/0158884 A1 | 6/2016 | Hagenlocher |
| 2016/0163221 A1 | 6/2016 | Sommers |
| 2016/0171906 A1 | 6/2016 | Matthews |
| 2016/0183677 A1 | 6/2016 | Achillopoulos |
| 2016/0189559 A1 | 6/2016 | Peters |
| 2016/0203732 A1 | 7/2016 | Wallace |
| 2016/0203733 A1 | 7/2016 | Wallace |
| 2016/0203734 A1 | 7/2016 | Boulware |

(56) References Cited

U.S. PATENT DOCUMENTS

| | | |
|---|---|---|
| 2016/0203735 A1 | 7/2016 | Boulware |
| 2016/0236303 A1 | 8/2016 | Matthews |
| 2016/0260261 A1 | 9/2016 | Hsu |
| 2016/0267806 A1* | 9/2016 | Hsu .................. B23K 9/32 |
| 2016/0284311 A1 | 9/2016 | Patel |
| 2016/0288236 A1 | 10/2016 | Becker |
| 2016/0307460 A1 | 10/2016 | Peters |
| 2016/0321954 A1 | 11/2016 | Peters |
| 2016/0343268 A1 | 11/2016 | Postlethwaite |
| 2016/0353055 A1 | 12/2016 | Popescu |
| 2016/0354855 A1 | 12/2016 | Ulrich |
| 2016/0358503 A1 | 12/2016 | Batzler |
| 2016/0361774 A9 | 12/2016 | Daniel et al. |
| 2016/0365004 A1 | 12/2016 | Matthews |
| 2017/0036288 A1* | 2/2017 | Albrecht .............. B23K 31/125 |
| 2017/0046974 A1 | 2/2017 | Becker |
| 2017/0046977 A1 | 2/2017 | Becker |
| 2017/0046982 A1 | 2/2017 | Wallace |
| 2017/0053557 A1 | 2/2017 | Daniel |
| 2017/0060398 A1 | 3/2017 | Rastogi |
| 2017/0200384 A1* | 7/2017 | Albrecht .............. G09B 19/24 |
| 2017/0200395 A1 | 7/2017 | Albrecht |
| 2017/0249858 A1 | 8/2017 | Boettcher |
| 2018/0130376 A1 | 5/2018 | Meess et al. |
| 2019/0304338 A1 | 10/2019 | Campbell et al. |
| 2019/0340954 A1 | 11/2019 | Schneider |
| 2020/0265748 A1* | 8/2020 | Marquinez .............. G06T 15/00 |
| 2021/0012679 A1 | 1/2021 | Torrecilla |

FOREIGN PATENT DOCUMENTS

| | | |
|---|---|---|
| CN | 1749940 | 3/2006 |
| CN | 1957374 A | 5/2007 |
| CN | 101067905 A | 11/2007 |
| CN | 101248659 | 8/2008 |
| CN | 101965576 | 2/2011 |
| CN | 102165504 A | 8/2011 |
| CN | 102625739 A | 8/2012 |
| CN | 202741926 | 2/2013 |
| CN | 103170767 | 6/2013 |
| CN | 103687687 A | 3/2014 |
| CN | 103996322 | 8/2014 |
| CN | 204013703 | 12/2014 |
| CN | 104384765 | 3/2015 |
| CN | 104471629 | 3/2015 |
| CN | 104599314 | 5/2015 |
| CN | 104603860 | 5/2015 |
| CN | 104708174 | 6/2015 |
| CN | 105160645 | 12/2015 |
| CN | 105745696 A | 7/2016 |
| CN | 107000100 A | 8/2017 |
| CN | 107000101 A | 8/2017 |
| CN | 108057946 A | 5/2018 |
| CN | 108713223 A | 10/2018 |
| CN | 115191010 A | 10/2022 |
| DE | 4313508 A1 | 10/1994 |
| EP | 0165501 | 12/1985 |
| EP | 1533683 A2 | 5/2005 |
| EP | 2082656 A1 | 7/2009 |
| EP | 2801966 | 11/2014 |
| EP | 2863376 | 4/2015 |
| EP | 3537410 | 9/2019 |
| EP | 3537410 A1 | 9/2019 |
| EP | 3550432 | 10/2019 |
| JP | S52126656 | 10/1977 |
| JP | 2002178148 | 6/2002 |
| JP | 2016203205 | 12/2016 |
| WO | 2005102230 | 11/2005 |
| WO | 2008101379 A1 | 8/2008 |
| WO | 2009137379 A1 | 11/2009 |
| WO | 2009146359 | 12/2009 |
| WO | 2010062481 A1 | 6/2010 |
| WO | 2013122805 A1 | 8/2013 |
| WO | 2014188244 | 11/2014 |
| WO | 20140188244 | 11/2014 |
| WO | 2015121742 | 8/2015 |
| WO | 2015185973 A1 | 12/2015 |
| WO | 2016022452 | 2/2016 |
| WO | 2016044680 | 3/2016 |
| WO | 2016144744 | 9/2016 |
| WO | 2017120488 | 7/2017 |
| WO | 2017120491 | 7/2017 |
| WO | 2018080994 | 5/2018 |
| WO | 2018147868 | 8/2018 |

OTHER PUBLICATIONS

International Search Report and Written Opinion, International Patent Application No. PCT/US2020/062301, mailed Feb. 16, 2021, 15 pages.

International Search Report and Written Opinion, International Patent Application No. PCT/US2020/062267, mailed Feb. 15, 2021, 15 pages.

www.boxford.co.us: "Augmented Reality Welding Training", Commercial video from Boxford, Aug. 7, 2014 (Aug. 7, 2014); Retrieved from the Internet: URL:https://www.youtube.com/watch?v=mjJcebhlo_g [retrieved Dec. 23, 2020].

European Patent Office, Brief Communication with Oral Proceedings in Application No. 16713176.2, dated Nov. 3, 2020, 18 pages.

International Search Report and Written Opinion, International Patent Application No. PCT/US2020/062277, mailed Feb. 16, 2021, 12 pages.

ASH VR1-DIY Homebrew PC Virtual Reality Head Mounted Display HMD,' aIrons1972, https://www.youtube.com/Watch?v=VOQboDZqguU, Mar. 3, 2013, YouTube screenshot submitted in lieu of the video itself.

Soldamatic Augmented Training, Augmented Reality World, May 30, 2013, https://www.youtube.com/watch?V=Mn0O52Ow_qY, YouTube screenshot submitted in lieu of the video itself.

Optical Head-Mounted Display, Wikipedia, Jun. 2, 2016, https://en.wikipedia.org/wiki/Optical_head-mounted_display 14 pages.

About Us.' Weldobot.com. <http://weldobot.com/?page_id=6> Accessed Jun. 2, 2016. 1 page.

International Search Report and Written Opinion corresponding to International Patent Application No. PCT/US2016/020861, Mailed May 23, 2016.

Hillers, Bernd, Iat Institut fur Automatisierungstechnik, doctoral thesis Selective Darkening Filer and Welding Arc Observation for the Manual Welding Process, Mar. 15, 2012, 152 pgs.

"High Dynamic Range (HDR) Video Image Processing For Digital Glass, Wearable Cybernetic Eye Tap Helmet Prototype," Raymond Lo, https://www.youtube.com/watch?v=gtTdiqDqHc8, Sep. 12, 2012, YouTube screenshot Submitted in lieu of the video itself.

Int'l Search Report and Written Opinion for PCT/US2016/035473 dated Aug. 17, 2016 (15 pages).

G. Melton et al: "Laser diode based vision system for viewing arc welding (May 2009)", EUROJOIN 7, May 21, 2009 (May 21, 2009), XP055293872, Venice Lido, Italy, May 21-22, 2009.

Sergi Foix et al: "Exploitation of Time-of-Flight (ToF) Cameras IRI Technical Report", Oct. 1, 2007 (Oct. 1, 2007), pp. 1-22, XP055294087, Retrieved from the Internet: URL:http://digital.csic.es/bitstream/10261/30066/1 Itime-of-flight.pdf [retrieved on Aug. 8, 2016].

Int'l Search Report and Written Opinion Application No. PCT/US2017/012558 dated Mar. 23, 2017 (12 pages).

Klinker, Gudrun, Augmented Reality im prktischen Einsatz, Oct. 10, 2012 (40 pages).

Sandor, C., Klinker, G., A rapid prototyping software infrastructure for user interfaces in ubiquitous augmented reality, Pers Ubiquit Compu (2005) 9 169-185.

Invertig.Pro Digital. Sep. 16, 2013.

Rehm Welding Technology, Invertig.Pro Digital, Sep. 16, 2013.

Rehm Welding Technology, Product Range, Aug. 2013.

Tig Welder How to Play, www.tradesgamer.com, Nov. 17, 2011.

Hillers, Bernd & Aiteanu, D & Tschirner, P & Park, M & Graeser, Axel & Balazs, B & Schmidt, L. (2004). TEREBES: Welding helmet with AR capabilities.

Aiteanu, Dorin, "Virtual and Augmented Reality Supervisor for a New Welding Helmet" Nov. 15, 2005, pp. 1-150.

(56) References Cited

OTHER PUBLICATIONS

Mnich, Chris, et al., "In situ weld pool measurement using sterovision," Japan—UA Symposium on Flexible Automation, Denver, CO 2004.
Communication from European Patent Office Appln No. 18 150 120.6 dated Jul. 4, 2018 (9 pgs).
Int'l Search Report and Written Opinion for PCT/US2018/028261 mailed Aug. 6, 2018 (17 pgs).
Larkin et al., "3D Mapping using a ToF Camera for Self Programming an Industrial Robot", Jul. 2013, IEEE, 2013 IEEE/ASME International Conference on Advanced Intelligent Mechatronics (AIM), pp. 494,499.
Bombardier et al: "Dual Digimig/Pulse Feeder and SVI-450i Power Supply", Feb. 1999 (Feb. 1999), XP055480578, Retrieved from the Internet: URL:http://www.esabna.com/eu/literature/arc%20equipment/accessories/dual%20digimig_pulse_fdr%20&%20svi-450i_15-565.pdf [retrieved on Jun. 1, 2018].
European Office Action Appln No. 16713176.2 dated Oct. 17, 2018 (7 pgs).
Wang et al. "Stereo vision-based depth of field rendering on a mobile device". Journal of Electronic Imaging 23(2), 023009 (Mar.-Apr. 2014) (Year: 2014).
Mrovlje, et al. "Distance measuring based on stereoscopic pictures". 9th International PhD Workshop on Systems and Control: Young Generation Viewpoint 1.-3. Oct. 2008, Izola, Slovenia (Year. 2008).
Petrovai etal, "A stereovision based approach for detecting and tracking lane and forward obstacles on mobile devices". 2015 IEEE Intelligent Vehicles Symposium (IV) Jun. 28-Jul. 1, 2015. COEX, Seoul, Korea (Year: 2015).
International Search Report and Written Opinion, International Patent Application No. PCT/US2020/018869, mailed May 4, 2020, 16 pages.
Wikipedia, "Google Cardboard,"Jan. 30, 2019, retrieved on Apr. 17, 2020, 8 pages.
International Search Report and Written Opinion, International Patent Application No. PCT/US2020/018866, mailed Apr. 24, 2020, 15 pages.
Anonymous: "Showcasing latest international developments in welding training systems", Australasian Welding Journal, vol. 59, Third Quarter, Jan. 1, 2014 (Jan. 1, 2014), pp. 1-5, XP055742728, Retrieved from the internet: URL:https://www.slv-halle.de/fileadmin/user_uphold/Halle/Pressemitteilungen/Welding-training-IIW-C-XIV.pdf [retrieved on Oct. 22, 2020].
NAMeS Users Guide, A Tech Neural Applications, Copyright 1997, 1998, 1999, 2000 Golden, CO (123 pages).
Klinker, Gudrun, Intelligent Welding Gun, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Fite-Georgel, Pierre; "Is there a Reality in Industrial Augmented Reality?" 10th IEEE International Symposium on Mixed and Augmented Reality (ISMAR), 2011.
ARVIKA Forum Vorstellung Projeckt PAARA, BMW Group Virtual Reality Center, Nuernberg, 2003.
Li, Larry, Time-of-Flight Camera—An Introduction, Technical White Paper, SLOA190B—Jan. 2014, revised May 2014 (10 pages).
Heston, Tim, Lights, camera, lean-recording manufacturing efficiency, The Fabricator, Aug. 2010 (4 pages).
Wavelength Selective Switching, http://en.wikipedia.org/wiki/wavelength_selective_switching, Mar. 4, 2015 (5 pages).
Cavilux HF, Laser Light for High-Speed Imaging, See What You Have Missed (2 pages).
Cavilux Smart, Laser Light for Monitoring and High Speed Imaging, Welcome to the Invisible World (2 pages).
Windows 10 to Get 'Holographic' Headset and Cortana, BBC News, www.bbc.com/news/technology-30924022, Feb. 26, 2015 (4 pages).
Daqri Smart Helmet, The World's First Wearable Human Machine Interface, Brochure (9 pages).
Intelligenter SchweiBbrenner, Intelligent Welding Torch, IP Bewertungs AG (IPB) (12 pages).
Intelligent Robotic Arc Sensing, Lincoln Electric, Oct. 20, 2014, http://www.lincolnelectric.com/en-us/support/process-and-theory/pages/intelligent-robotic-detail.aspx (3 pages).
LiveArc Welding Performance Management System, A reality-based recruiting, screening and training solution, MillerWelds.com 2014 (4 pages).
Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of_robot_reference_frames_for_enhanced_robot_positioning_accuracy (19 pages).
Lutwak, Dr. Robert, Micro-Technology for Positioning, Navigation, and Timing Towards PNT Everywhere and Always Stanford PNT Symposium, Stanford, CA Oct. 29, 2014 (26 pages).
Lutwak, Dr. Robert, DARPA, Microsystems Tech. Office, Micro-Technology for Positioning, Navigation, and Timing Towards PNT Everywhere and Always, Feb. 2014 (4 pages).
Parnian, Neda et al., Integration of a Multi-Camera Vision System and Strapdown Inertial Naviation System (SDINS) with a Modified Kalman Filter, Sensors 2010, 10, 5378-5394; doi: 10.3390/s100605378 (17 pages).
Pipe-Bug, Motorized & Manual Chain Driven Pipe Cutting Machines From Bug-0 Systems (4 pages).
Electronic speckle pattern interferometry Wikipedia, the free encyclopedia (4 pages), [retrieved Feb. 10, 2015].
Rivers, et al., Position-Correcting Tools for 2D Digital Fabrication (7 pages).
Int' Search Report and the Written Opinion Appln No. PCT/US2016/016107, dated May 17, 2016 (11 pages).
Handheld Welding Torch with Position Detection technology description, Sep. 21, 2011 (11 pages).
Telops, Innovative Infrared Imaging, HDR-IR High Dynamic Range IR Camera, http://www.telops.com/en/infrared-Cameras/hdr-ir-high-dynamic-range-ir-camera, 2015 (2 pages).
OV10642:1.3-Megapixel OmniHDRTM, http://www.ovt.com/applications/application.php?id=7 (2 pages).
Altasens—Wide Dynamic Range (WDR), http://www.altasens.com/index.php/technology/wdr (1 page), [retrieved Jan. 5, 2016).
HDR Camera for Industrial and Commercial Use, Invisual E Inc., http://www.invisuale.com/hardware/hdr-camera.html (2 pages), [retrieved Jan. 5, 2016).
NIT, Magic Technology—White Paper, Scene Contrast Indexed Image Sensing with WDR (14 pages).
Ni, Yang, et al., A CMOS Log Image Sensor with On-Chip FPN Compensation (4 pages).
NIT, Application Note: Native WDRTM for your Industrial Welding Applications, www.new-imaging-technologies.com (2 pages).
Reverchon, J.L., et al. New InGaAs SWIR Imaging Solutions from III-VLab, New Imaging Technologies (10 pages).
Ni, Y. et al. A 768x576 Logarithmic Image Sensor with Photodiode in Solar Cell Mode, New Imaging Technologies (4 pges).
NIT, 8Care12004-02-B1 Datasheet, New Imaging Technologies (9 pages).
NIT, NSC1005, Datasheet, Revised Nov. 2012, NSC1005 HD ready Logarithmic CMOS Sensor (28 pages).
NIT Image Processing Pipeline for Lattice HDR-6-, NIP, Pipeline, IP_NIT_NSC1005C_HDR60_V1_0 (23 pages).
NIT, WiDySwire, New Imaging Technologyies (7 pages).
NIT Image Processing Pipeline, R&D Report N RD1220—Rev B, May 14, 2012 (10 pages).
NIT Color Management, R&D Report N RD1113—Rev B, Apr. 11, 2011 (31 pages).
Int'l Search Report and Written Opinion for PCT/US2015/067931 dated Jul. 26, 2016 (19 pages).

(56) References Cited

OTHER PUBLICATIONS

Cameron Series: "Why Weld Cameras Need Why High Dynamic Range Imaging", Apr. 10, 2013 (Apr. 10, 2013), XP055269605, Retrieved from the Internet: URL:http://blog.xiris.com/blog/bid/258666/Why-Weld-Cameras-Need-High-Dynamic-Range-Imaging [retrieved on Apr. 29, 2016] the whole document (5 pages).

AD-081CL Digital 2CCD Progressive Scan HDR/High Frame Rate Camera User's Manual, Jul. 1, 2012 (Jul. 1, 2012) p. 27, XP055269758, Retrieved from the Internet: URL:http://www.stemmer-imaging.de/media/uploads/docmanager/53730_JAI_AD-081_CL_Manual.pdf [retrieved on Apr. 29, 2016] the whole document (55 pages).

Anonymous: "JAI introduces unique high-dynamic-range camera, Nov. 5, 2009 (Nov. 5, 2009), XP055269759, Retrieved from the Internet: URL:http://www.jai.com/en/newsevents/news/ad-081c1 [retrieved on Apr. 29, 2016] Typical HDR applications for the AD-081CL include inspection tasks where incident light or bright reflections are Oresent, such as .. welding" (2 pages).

International Search Report and Written Opinion corresponding to International Patent Application No. PCT/US2016/012164, mailed May 12, 2016.

NIT Image Processing Pipeline for Lattice HDR-60, NIP IP Pipeline, NIT_HDR60_V1_0_Pipeline_Sample (48 pages).

Patent Cooperation Treaty, Notification of Transmittal of the International Search Report and the Written Opinion of the International Searching Authority, in PCT/US2016/020865, dated May 11, 2016, 12 pages.

Choi et al., Simulation of Dynamic Behavior in a GMAW System, Welding Research Supplement, Oct. 2001, 239-s thru 245-s (7 pages).

Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).

High Dynamic Range (HDR) Video Image Processing For Digital Glass, Augmented Reality in Quantigraphic Lightspace and Mediated Reality with Remote Expert, Raymond Lo, Sep. 12, 2012, https://www.youtube.com/Watch?v=ygcm0AQXX9k, YouTube screenshot submitted in lieu of the video itself.

\* cited by examiner

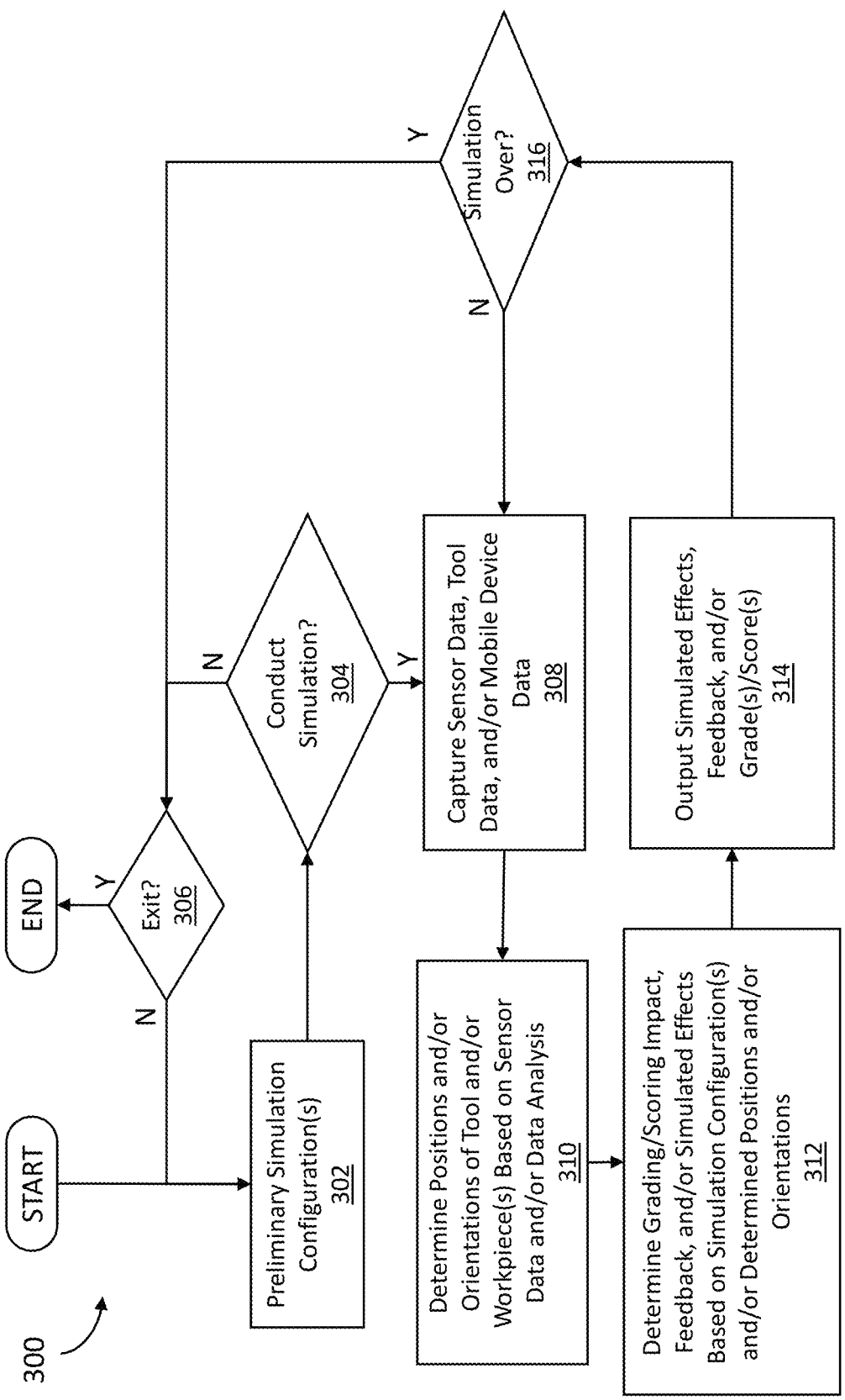

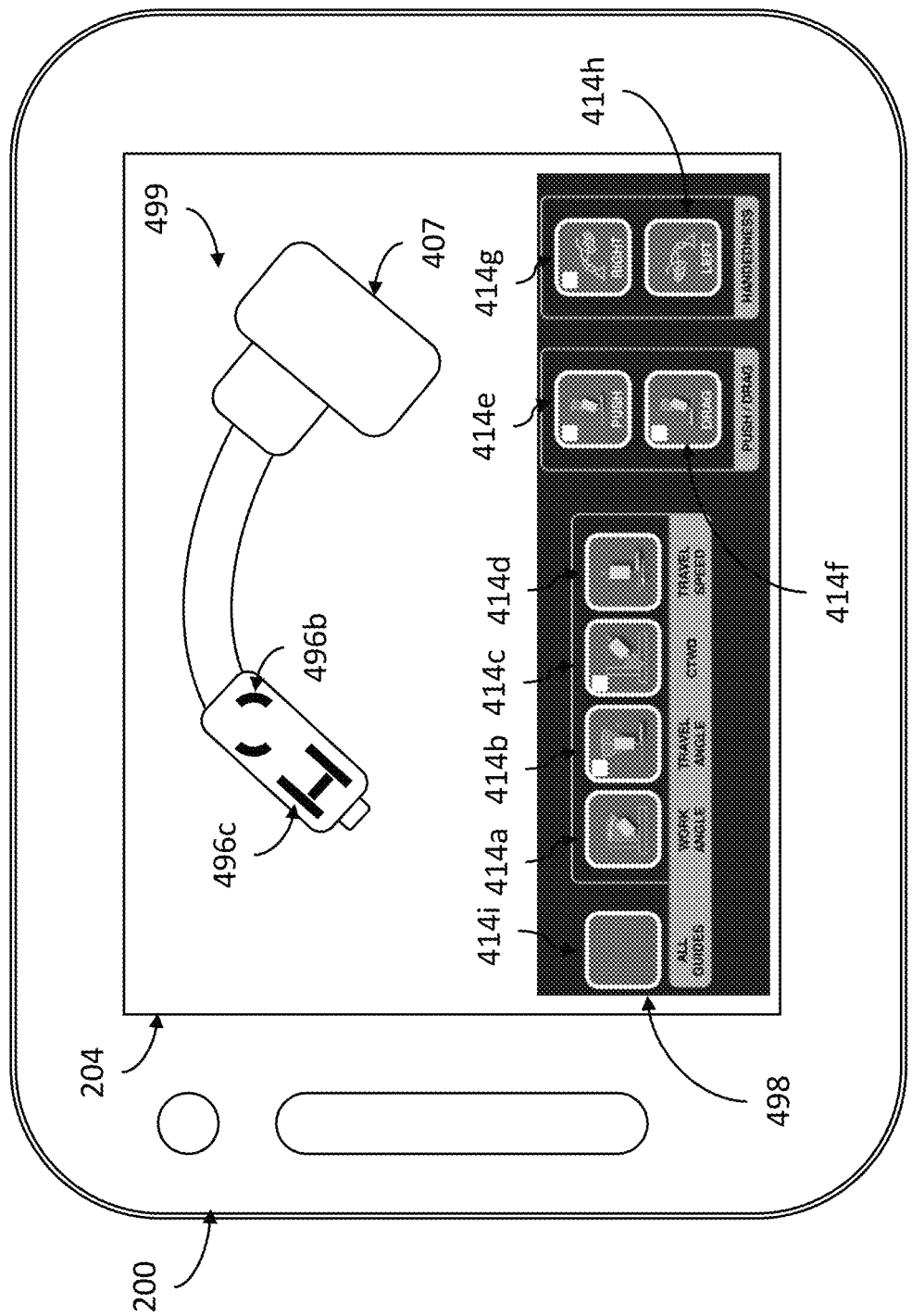

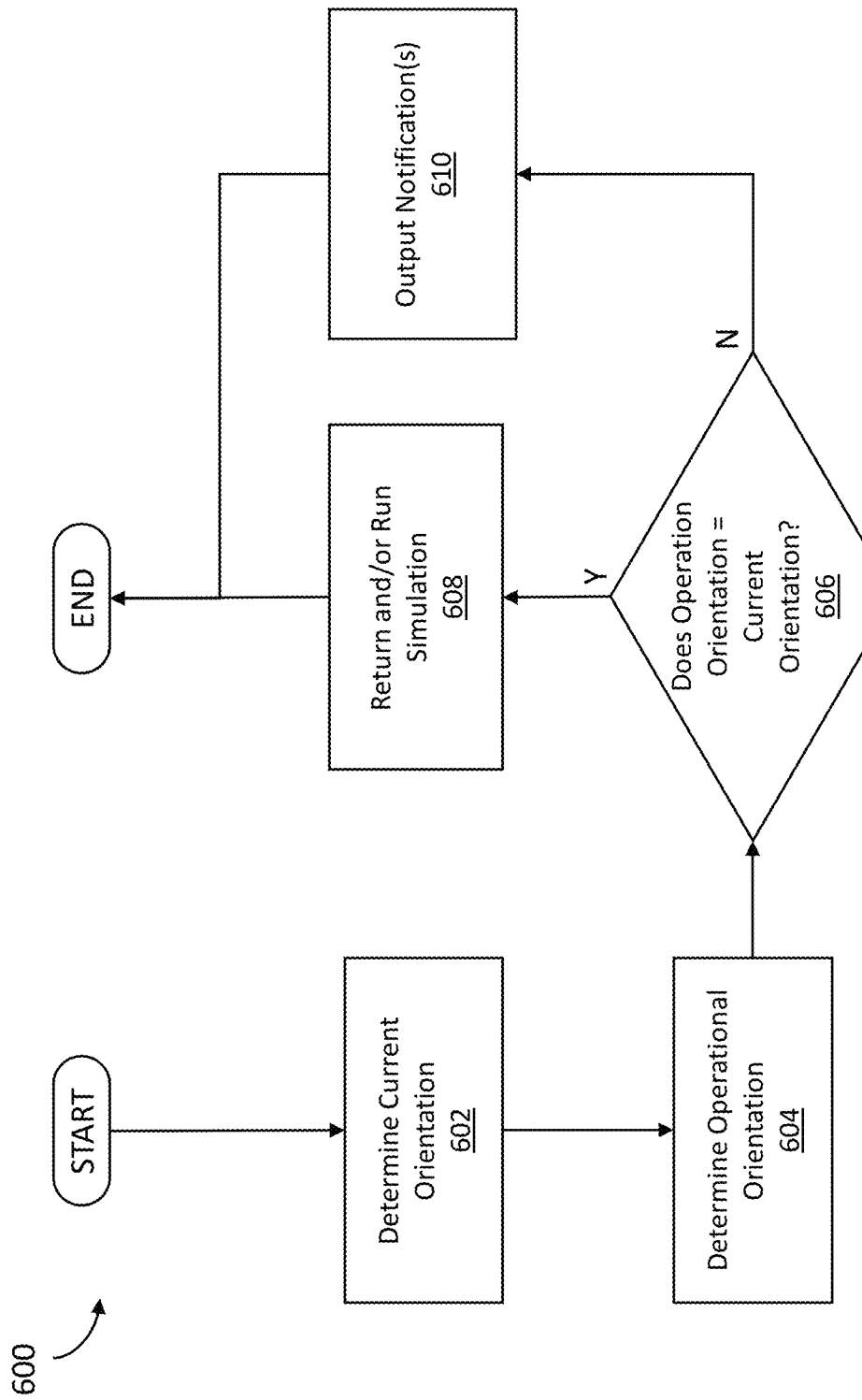

WELD TRAINING SIMULATIONS USING MOBILE DEVICES, MODULAR WORKPIECES, AND SIMULATED WELDING EQUIPMENT

CROSS REFERENCE TO RELATED APPLICATIONS

The present application claims the benefit of, and priority to, Provisional Patent Application No. 62/940,138, entitled "WELD TRAINING SIMULATIONS USING MOBILE DEVICES, MODULAR WORKPIECES, AND SIMULATED WELDING EQUIPMENT," filed Nov. 25, 2019, the entire contents of which are hereby incorporated by reference.

TECHNICAL FIELD

The present disclosure generally relates to weld training simulations and, more particularly, to weld training simulations using mobile devices, modular workpieces, and simulated welding equipment.

BACKGROUND

The welding industry has a shortage of experienced and skilled operators. Additionally, it is difficult and expensive to train new operators using live welding equipment. Further, even experienced welders often have difficulty maintaining important welding techniques throughout welding processes. Thus, there is a demand for affordable training tools and equipment that help operators develop, maintain, and/or refine welding skills.

Simulated welding tools make it possible for both experienced and inexperienced weld operators to practice producing high quality welds prior to actually using the real welding equipment. Additionally, welding operators can test out different welding tools in a simulated environment prior to actually purchasing that particular welding tool. However, conventional systems and methods for simulating joining operations require substantial investments in equipment (e.g., processors, displays, practice workpieces, welding tool(s), sensor(s), etc).

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to weld training simulations using mobile devices, modular workpieces, and simulated welding equipment, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 3 is a flowchart illustrating an example welding simulation program of the example weld training systems of FIGS. 1*a*-1*b*, in accordance with aspects of this disclosure.

FIGS. 4*d*-4*f* depict an example mobile device display showing an options panel and example previews of the impact of certain selected options during the example welding simulation program of FIG. 3, in accordance with aspects of this disclosure.

FIG. 6 is a flowchart illustrating an example orientation configuration process, in accordance with aspects of this disclosure.

Figure 1A:
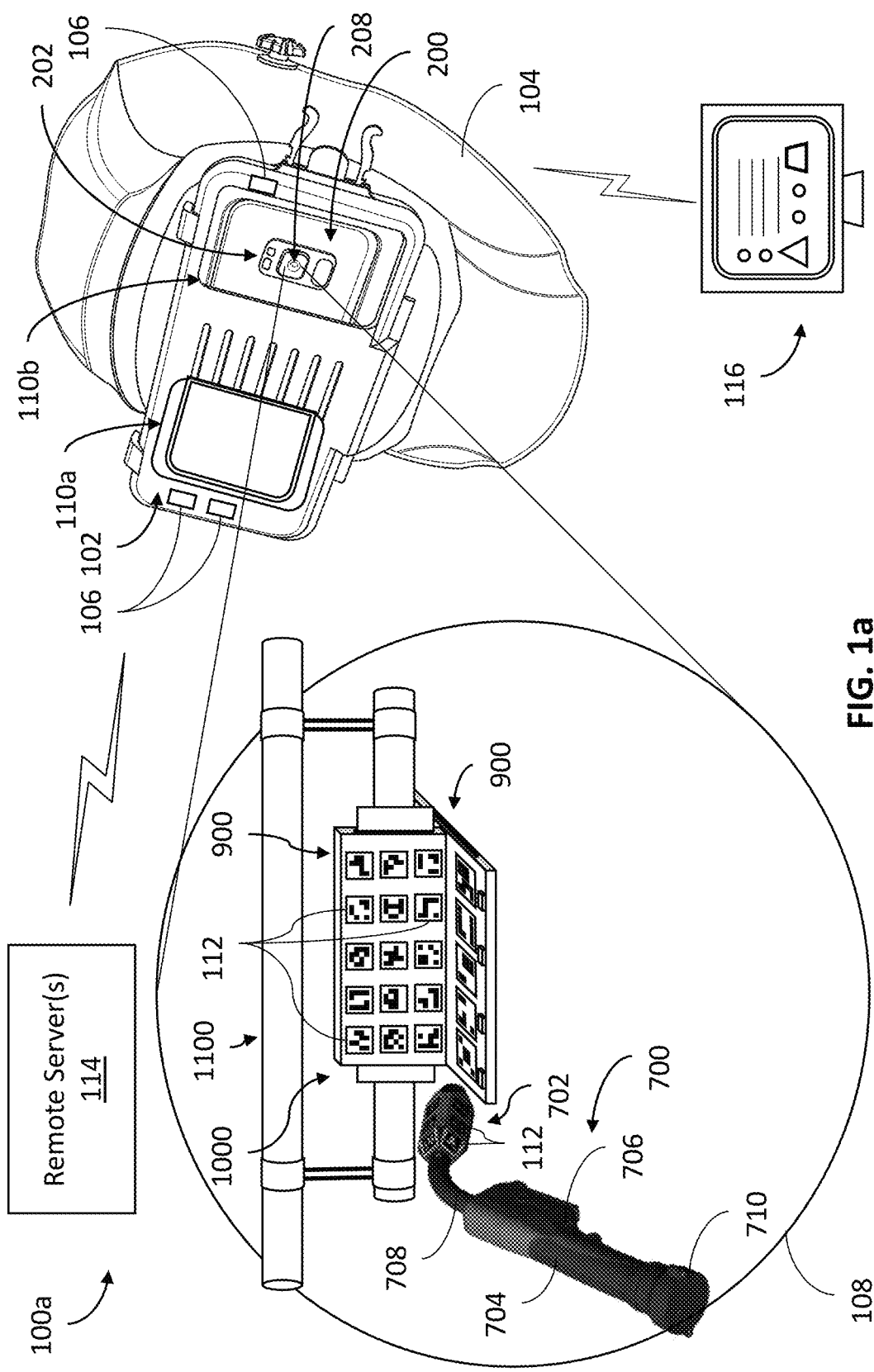
FIG. 1*a* depicts an example weld training system, in accordance with aspects of this disclosure.

The figures are not necessarily to scale. Where appropriate, the same or similar reference numerals are used in the figures to refer to similar or identical elements. For example, reference numerals utilizing lettering (e.g., workpiece 900*a*, workpiece 900*b*) refer to instances of the same reference numeral that does not have the lettering (e.g., workpieces 900).

DETAILED DESCRIPTION

Some examples of the present disclosure relate to simulating (e.g., via augmented, mixed, and/or virtual reality) joining operations (e.g., welding, brazing, adhesive bonding, and/or other joining operations). While the following disclosure sometimes refers to welding and/or weld training as a shorthand, the disclosure is equally applicable to other joining operations.

Some example of the present disclosure relate to using mobile devices (e.g., smartphone, tablet, personal digital assistant, electronic book reader, ipod, etc.) for conducting welding simulations, such as for purposes of training. In some examples, it may be advantageous to use mobile devices due to their availability, relative affordability, and/or technical power. The disclosure further contemplates automatically detecting whether an orientation of the mobile device is proper for the simulation, and notifying the user if not.

The present disclosure additionally contemplates using modular workpieces for conducting welding simulations. In some examples, the modular workpieces may be configured to tool-lessly connect to, and/or disconnect from, other modular workpieces to form various workpiece assemblies. In some examples, tool-less connectors may be advantageous because they can be easily connected to and/or engaged with other connectors without the need for auxiliary tools (e.g., screwdrivers, hammers, etc.). Tool-less connectors may also be advantageous over adhesives, as the tool-less connectors may be continually connected, disconnected, and reconnected with negligible change to their effectiveness, unlike adhesives. In some examples, the welding simulation may further be configured to recognize different joints formed by the modular workpieces, and conduct the welding simulation accordingly.

The present disclosure further contemplates using simulated equipment interfaces that replicate the appearance of actual equipment interfaces of actual welding-type equipment. In some examples, this replication may help orient a user who is already familiar with a particular piece of welding-type equipment and/or its actual equipment interface, thereby making them more comfortable with the welding simulation. In some examples, the replication may help users who are unfamiliar with a particular piece of welding-type equipment become familiar with the welding-type equipment (and/or its interface). Additionally, the present disclosure contemplates simulating certain welding effects in accordance with the way the effects might occur in the real world when real welding is performed using the real world welding-type equipment.

Some examples of the present disclosure relate to a weld training system, comprising: a mobile electronic device configured to conduct a weld training simulation, the mobile electronic device comprising: a display screen, processing circuitry, and memory circuitry comprising computer readable instructions which, when executed by the processing circuitry, cause the processing circuitry to: select welding-type equipment, display, on the display screen, a simulated welding-type equipment interface based on the welding-type equipment that was selected, receive one or more simulation parameters selected via the simulated equipment interface, and conduct the weld training simulation using the one or more simulation parameters.

In some examples, the simulated welding-type equipment interface replicates an appearance of an actual equipment interface of the welding-type equipment. In some examples, the one or more simulation parameters comprise one or more of a welding current, a welding voltage, a pulse frequency, a gas type, a gas pressure, a wire type, wire diameter, a wire feed speed, a workpiece material type, or a workpiece material thickness. In some examples, the welding-type equipment comprises a welding-type power supply, a gas supply, a wire feeder, or a welding tool.

In some examples, the memory circuitry comprises computer readable instructions which, when executed by the processing circuitry, further cause the processing circuitry to provide a recommendation of a welding consumable or complementary welding-type equipment based on the welding-type equipment that was selected. In some examples, the memory circuitry comprises computer readable instructions which, when executed by the processing circuitry, further cause the processing circuitry to display, on the display screen, an option to purchase the welding-type equipment, welding consumable, or complementary welding-type equipment. In some examples, the option to purchase comprises a link to a purchase page where the welding-type equipment, welding consumable, or complementary welding-type equipment can be purchased.

In some examples, the memory circuitry comprises computer readable instructions which, when executed by the processing circuitry, further cause the processing circuitry to receive an input representative of a selection of the welding-type equipment. In some examples, the welding simulation is conducted based on the welding-type equipment that was selected. In some examples, the welding simulation simulates a welding arc, a weld puddle, a weld bead, a welding sound, or a welding fume based on the welding-type equipment that was selected.

Some examples of the present disclosure relate to a weld training system, comprising: a mobile electronic device configured to conduct a weld training simulation, the mobile electronic device comprising: a display screen, processing circuitry, and memory circuitry comprising computer readable instructions which, when executed by the processing circuitry, cause the processing circuitry to: display, on the display screen, a plurality of selectable settings, receive one or more selections of the plurality of selectable settings, and display, on the display screen, a rendering based on the one or more selections, the rendering comprising a preview of the weld training simulation if the weld training simulation were conducted with the one or more selections.

In some examples, the rendering comprises a static image, an animation, or a previously recorded weld training simulation. In some examples, the rendering is of a welding tool or one or more feedback guides. In some examples, the plurality of selectable settings comprise a plurality of selectable feedback guide settings, a plurality of selectable simulation exercise settings, or a plurality of selectable user characteristic settings.

In some examples, the plurality of feedback guide settings comprise two or more of a work angle guide setting, a travel angle guide setting, travel speed guide setting, or a contact tip to work distance guide setting. In some examples, the plurality of simulation exercise settings comprise a push weld setting and a drag weld setting. In some examples, the plurality of user characteristic settings comprise a left handed characteristic setting and a right handed characteristic setting.

In some examples, the plurality of selectable settings comprise a plurality of selectable simulation exercise settings and a plurality of selectable user characteristic settings, and the display of the plurality of selectable simulation exercise settings is dependent upon which user characteristic setting of the plurality of selectable user characteristic settings is selected. In some examples, the one or more selections comprise one or more first selections, and the memory circuitry comprises computer readable instructions which, when executed by the processing circuitry, further cause the processing circuitry to: receive one or more second selections of the plurality of selectable options, the one or more second selections being at least partially different from the one or more first selections, and adjust the display of the rendering based on one or more differences between the one or more first selections and the one or more second selections. In some examples, the memory circuitry comprises computer readable instructions which, when executed by the processing circuitry, further cause the processing circuitry to conduct the weld training simulation based on the one or more selections.

Some examples of the present disclosure relate to a weld training system, comprising: a desktop electronic device configured to conduct a weld training simulation, the desktop electronic device comprising: a display screen, processing circuitry, and memory circuitry comprising computer readable instructions which, when executed by the processing circuitry, cause the processing circuitry to: select welding-type equipment, display, on the display screen, a simulated welding-type equipment interface based on the welding-type equipment that was selected, receive one or more simulation parameters selected via the simulated equipment interface, and conduct the weld training simulation using the one or more simulation parameters.

In some examples, the simulated welding-type equipment interface replicates an appearance of an actual equipment interface of the welding-type equipment. In some examples, the one or more simulation parameters comprise one or more of a welding current, a welding voltage, a pulse frequency, a gas type, a gas pressure, a wire type, wire diameter, a wire feed speed, a workpiece material type, or a workpiece material thickness. In some examples, the welding-type equipment comprises a welding-type power supply, a gas supply, a wire feeder, or a welding tool.

In some examples, the memory circuitry comprises computer readable instructions which, when executed by the processing circuitry, further cause the processing circuitry to provide a recommendation of a welding consumable or complementary welding-type equipment based on the welding-type equipment that was selected. In some examples, the memory circuitry comprises computer readable instructions which, when executed by the processing circuitry, further cause the processing circuitry to display, on the display screen, an option to purchase the welding-type equipment, welding consumable, or complementary welding-type equipment. In some examples, the option to purchase comprises a link to a purchase page where the welding-type equipment, welding consumable, or complementary welding-type equipment can be purchased.

In some examples, the memory circuitry comprises computer readable instructions which, when executed by the processing circuitry, further cause the processing circuitry to receive an input representative of a selection of the welding-type equipment. In some examples, the welding simulation is conducted based on the welding-type equipment that was selected. In some examples, the welding simulation simulates a welding arc, a weld puddle, a weld bead, a welding sound, or a welding fume based on the welding-type equipment that was selected.

Some examples of the present disclosure relate to a weld training system, comprising: a desktop electronic device configured to conduct a weld training simulation, the desktop electronic device comprising: a display screen, processing circuitry, and memory circuitry comprising computer readable instructions which, when executed by the processing circuitry, cause the processing circuitry to: display, on the display screen, a plurality of selectable settings, receive one or more selections of the plurality of selectable settings, and display, on the display screen, a rendering based on the one or more selections, the rendering comprising a preview of the weld training simulation if the weld training simulation were conducted with the one or more selections.

In some examples, the rendering comprises a static image, an animation, or a previously recorded weld training simulation. In some examples, the rendering is of a welding tool or one or more feedback guides. In some examples, the plurality of selectable settings comprise a plurality of selectable feedback guide settings, a plurality of selectable simulation exercise settings, or a plurality of selectable user characteristic settings.

In some examples, the plurality of feedback guide settings comprise two or more of a work angle guide setting, a travel angle guide setting, travel speed guide setting, or a contact tip to work distance guide setting. In some examples, the plurality of simulation exercise settings comprise a push weld setting and a drag weld setting. In some examples, the plurality of user characteristic settings comprise a left handed characteristic setting and a right handed characteristic setting.

In some examples, the plurality of selectable settings comprise a plurality of selectable simulation exercise settings and a plurality of selectable user characteristic settings, and the display of the plurality of selectable simulation exercise settings is dependent upon which user characteristic setting of the plurality of selectable user characteristic settings is selected. In some examples, the one or more selections comprise one or more first selections, and the memory circuitry comprises computer readable instructions which, when executed by the processing circuitry, further cause the processing circuitry to: receive one or more second selections of the plurality of selectable options, the one or more second selections being at least partially different from the one or more first selections, and adjust the display of the rendering based on one or more differences between the one or more first selections and the one or more second selections. In some examples, the memory circuitry comprises computer readable instructions which, when executed by the processing circuitry, further cause the processing circuitry to conduct the weld training simulation based on the one or more selections.

FIG. 1a shows an example weld training system 100. The weld training system 100 includes a mobile device 200 retained by a device mount 102 secured to a welding helmet shell 104. In some examples, the device mount 102 may be considered part of the mobile device 200. As shown, the device mount 102 includes two mounted sensors 106. In some examples, the device mount 102 may include more or less mounted sensors 106. In some examples, the mounted sensors 106 may include, for example, one or more temperature sensors, accelerometers, magnetometers, gyroscopes, proximity sensors, pressure sensors, light sensors, motion sensors, position sensors, ultrasonic sensors, infrared sensors, Bluetooth sensors, and/or near field communication (NFC) sensors.

In the example of FIG. 1a, the mobile device 200 includes one or more camera sensors 208. While only one camera sensor 208 is shown in the example of FIG. 1a for the sake of simplicity, in some examples, the mobile device 200 may include several camera sensors 208. The mobile device 200 also includes mobile sensors 206, as further discussed below with respect to FIG. 2. In the example of FIG. 1a, the one or more camera sensors 208 have a field of view (FOV) 108 that is unobstructed by the device mount 102 and welding helmet shell 104. As shown, the device mount 102 includes multiple apertures 110, such that the camera sensor(s) 208 may have an unobstructed FOV 108 in multiple different orientations. The mobile device 200 further includes several lights 202. In some examples, one or more of the lights 202 may help illuminate the FOV 108.

While the device mount 102 is shown as a clamshell case in the example of FIG. 1a for ease of illustration, in some examples, the device mount 102 may instead comprise an elastic webbing with a multitude of apertures 110. In some examples, the device mount 102 and/or helmet shell 104 may be configured such as shown in U.S. patent application Ser. No. 16/694,937, entitled "SYSTEMS FOR SIMULATING JOINING OPERATIONS USING MOBILE DEVICES," filed Nov. 25, 2019, the entirety of which is hereby incorporated by reference. Though not shown in FIG. 1a, in some examples, the device mount 102 and welding helmet shell 104 may be configured such that the mobile device 200 may be retained with a display screen 204 of the mobile device 200 visible to a wearer of the welding helmet shell 104. In some examples, the mobile device may instead be retained by goggles and/or some sort of head mounted wearable. In some examples, the device mount 102 may be secured to a different type of helmet shell 104 and/or headwear.

In some examples, the device mount 102 may be removably secured such that the device mount 102 may be toollessly separated from one helmet shell 104 and then toollessly secured to a different helmet shell 104. In some examples, the device mount 102 may be configured for attachment to the helmet shell 104 in multiple different orientations (e.g., left and right landscape orientations). In such an example, the orientation of the mobile device 200 may be adjusted by adjusting the attachment orientation of the device mount 102 to the helmet shell 104.

Figure 1B:
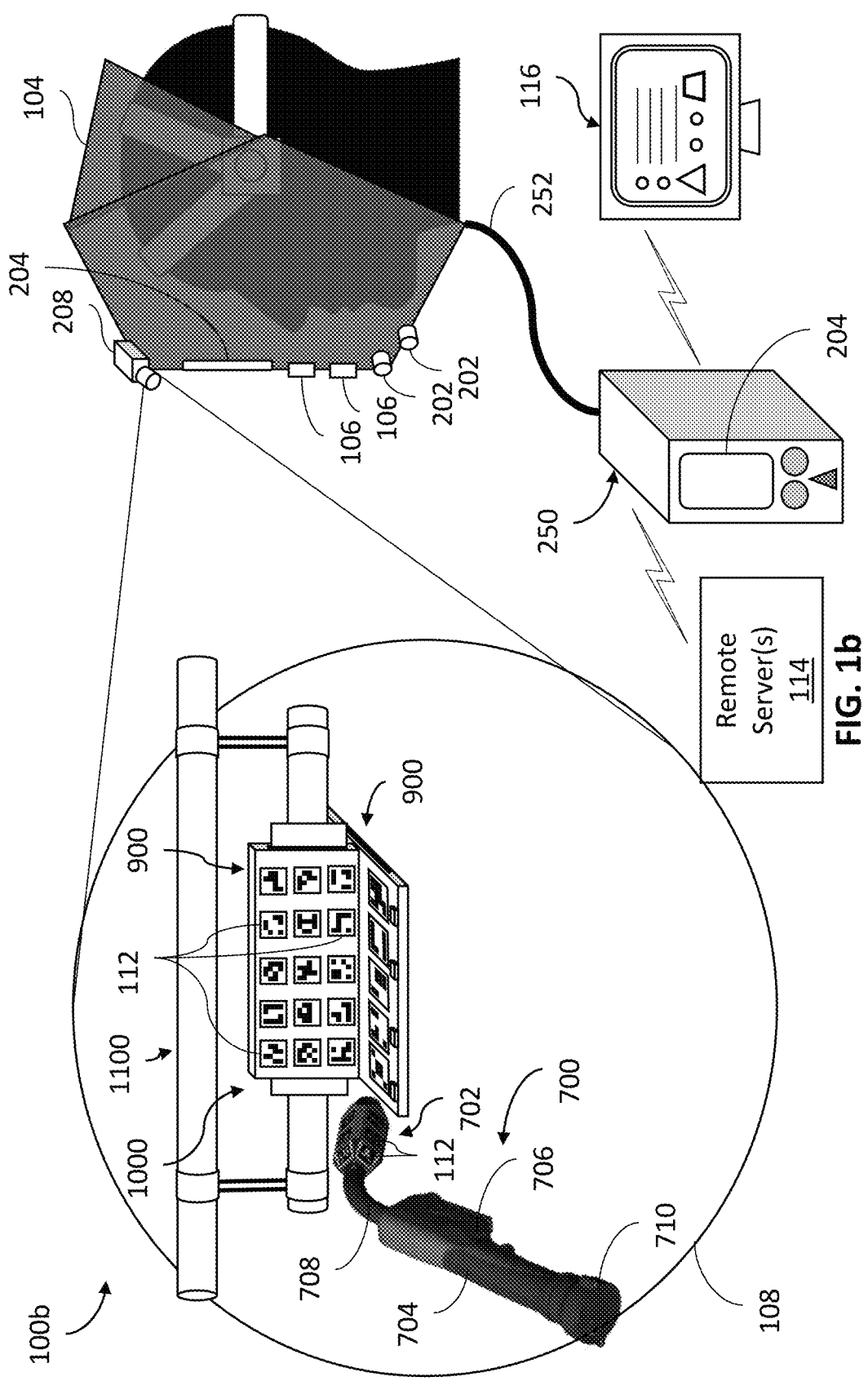
FIG. 1*b* depicts another example weld training system, in accordance with aspects of this disclosure.

FIG. 1b shows another example weld training system 100b. The weld training system 100b is similar to the weld training system 100a, except that the weld training system 100b includes a desktop device 250 instead of a mobile device 200. In some examples, the desktop device 250 may be a desktop computer (and/or similar computing apparatus) housed in a welding power supply façade. As shown, the desktop device 250 is a separate apparatus that is connected to the helmet shell 104 via cable 252 rather than mounted to helmet shell 104 via device mount 102 like the mobile device 200. While one cable 252 is shown in the example of FIG. 1b, in some examples, the cable 252 may be a bundle of several different cables (e.g., to route power, communications signals, etc.) While not shown in the example of FIG. 1b, in some examples, the desktop device 250 may be connected to mains power, such as through one or more power cables.

In the example of FIG. 1b, the desktop device 250 includes a display screen 204 on a housing of the desktop device 250, as well as a display screen 204 mounted to an interior of the helmet shell 104, where it is viewable by an operator wearing the helmet shell 104. Additionally, the mounted sensors 106 are mounted to the helmet shell 104 directly rather than through the device mount 102. Further, the camera sensor(s) 208 and lights 202 are mounted to the helmet shell 104. In some examples, the desktop device 250 may power and/or communicate with the devices mounted to the helmet shell 104 through cable 252. In some examples, the helmet shell 104 may be considered part of the desktop device 250.

While the below disclosure focuses on the mobile device 200 of FIG. 1a, in some examples, some or all of the disclosure pertaining to the mobile device 200 may pertain equally to the desktop device 250. For example, content disclosed as being displayed on the display screen 204 of the mobile device 200 may, in some examples, instead (or additionally) be displayed on the display screen(s) 204 of the desktop device 250. As another example, various components depicted and/or described as being part of the mobile device 200 (e.g., with respect to FIG. 2) may, in some examples, instead (or additionally) be part of the desktop device 250.

In the examples of FIGS. 1a-1b, a welding tool 700 and a workpiece assembly 1000 are in the FOV 108 of the camera sensor(s) 208 of the mobile device 200. As shown, the workpiece assembly 1000 comprises two workpieces 900 connected together, as further discussed below. Both workpieces 900 of the workpiece assembly 1000 include markers 112. As shown, the workpiece assembly 1000 is retained by a fixturing system 1100, as further discussed below.

In the examples of FIGS. 1a-1b, the welding tool 700 is a welding torch or gun, such as a torch or gun configured for gas metal arc welding (GMAW). In some examples, the welding tool 700 may be an electrode holder (i.e., stinger) configured for shielded metal arc welding (SMAW). In some examples, the welding tool 700 may comprise a torch and/or filler rod configured for gas tungsten arc welding (GTAW). In some examples, the welding tool 700 may comprise a gun configured for flux-cored arc welding (FCAW).

In the examples of FIGS. 1a-1b, the welding tool 700 includes markers 112 disposed on its nozzle 702. As shown, the welding tool 700 also includes a handle 704 having a trigger 706. A gooseneck 708 that leads to the nozzle 702 is attached to one end of the handle 704, while a communication module 710 is attached to the opposite end of the handle 704. In some examples, the communication module 710 may include communication circuitry configured for communication with communication circuitry 210 of the mobile device 200. In some examples, the welding tool 700 and/or communication module 710 may include one or more audio, visual, and/or vibration devices. In some examples, the communication module 710 may be configured to send one or more signals to the mobile device 200 when the trigger 706 is activated.

In some examples, the welding tool 700 may include markers 112 on other portions of the welding tool 700 (e.g., handle 704, gooseneck 708, communication module 710, and/or trigger 706). While shown as pattern markers in the examples of FIGS. 1a-1b, in some examples, the markers 112 (both on the welding tool 700 and/or workpiece(s) 900) may instead be reflectors, light emitting markers (e.g., LEDs), ultrasonic emitters, electromagnetic emitters, and/or other types of active and/or passive markers. In some examples, the markers 112 may be permanently affixed to, imprinted on, embedded in, and/or removably connected to the welding tool 700 and/or workpiece(s) 900. In some examples, each marker 112 may be uniquely recognizable when alone and/or when arranged with other markers 112 such that a particular combination and/or configuration of markers 112 are uniquely recognizable.

In some examples, the mobile device 200 may capture sensor data (e.g., images) relating to the welding tool 700 and/or workpiece(s) 900. In some examples, the mobile device 200 may determine a position, orientation, motion, configuration, and/or other characteristic(s) of the welding tool 700 and/or workpiece(s) 900 based on an analysis of the sensor data. In some examples, the markers 112 may assist in this analysis. For example, one or more characteristics of the markers 112 may be recognized and/or interpreted to help determine the position, orientation, motion, configuration, and/or other characteristic of the welding tool 700 and/or workpiece(s) 900. In some examples, the mobile device 200 may be configured to conduct a welding simulation using the sensor data, and/or positions, orientations, motions, configurations, and/or other characteristics of the welding tool 700 and/or workpiece(s) 900. In some examples, image recognition techniques may be utilized in recognizing and/or interpreting the markers 112, welding tool 700, and/or workpiece(s) 900. In some examples, the welding tool 700 and/or workpiece(s) 900 may be markerless, and the weld training system 100 may user markerless techniques to determine position, orientation, configuration, and/or other characteristics of the welding tool 700 and/or workpiece(s) 900.

In the examples of FIGS. 1a-1b, the weld training system 100 further includes one or more remote servers 114 and one or more remote displays 116. As shown, the mobile device 200 is in communication with the one or more remote servers 114 and one or more remote displays 116, such as through communication circuitry 210 of the mobile device 200, for example. In some examples, the mobile device 200 may be in communication with the one or more remote servers 114 and one or more remote displays 116 through a network (e.g., a local area network, wide area network, the internet, etc.). In some examples, the mobile device 200 may be configured to upload and/or download data (e.g., simulation and/or training data) to/from the remote display(s) 116 and/or remote server(s) 114. In some examples, the remote display(s) 116 may be configured to display a mirror image (and/or similar image) of the display screen 204 of the mobile device 200. While shown as separate in the examples of FIGS. 1a-1b, in some examples, one or more of the remote servers 114 and/or remote displays 116 may be in proximity to, interconnected with, and/or in communication with one another.

Figure 2:
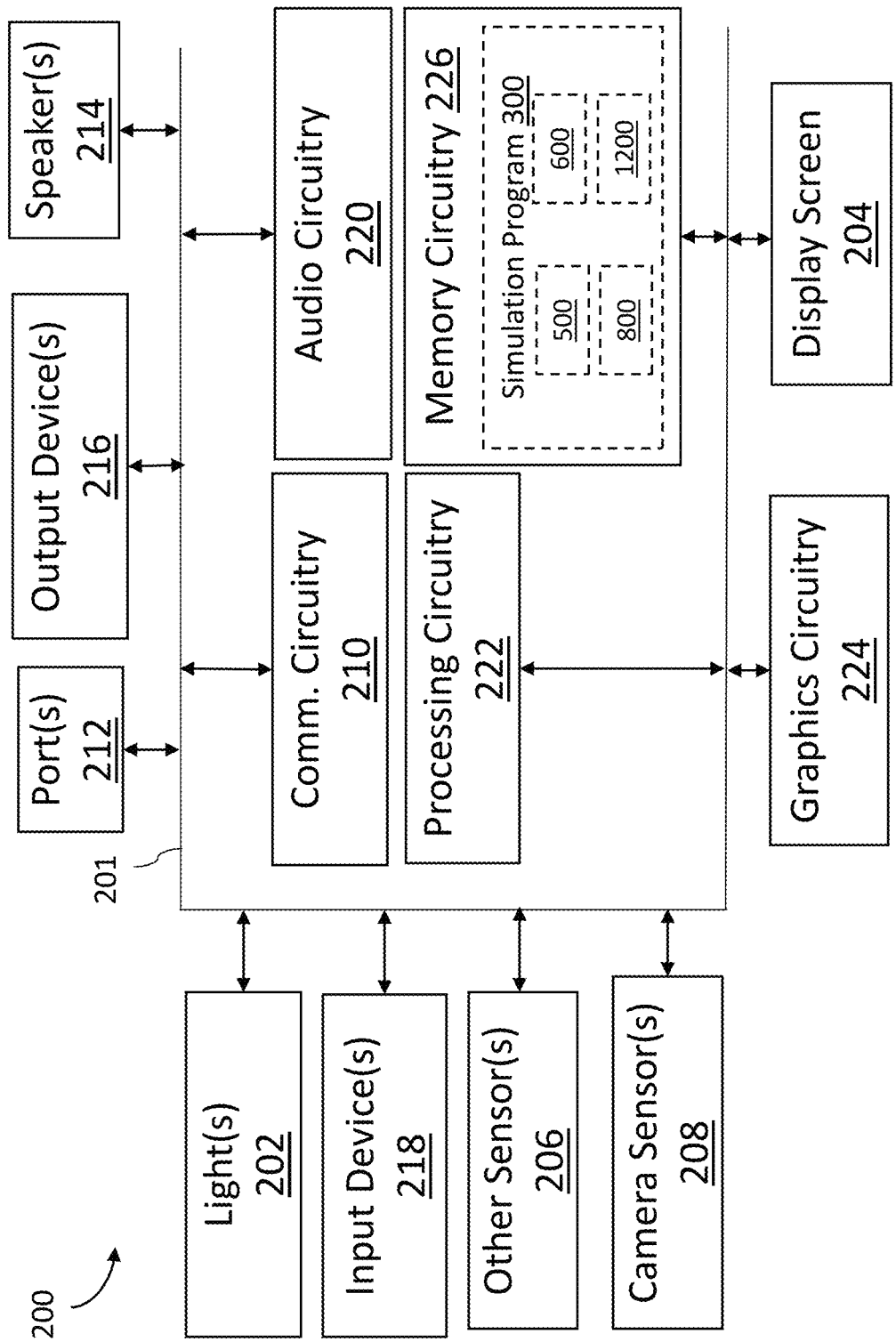
FIG. 2 is a block diagram showing example components of a mobile device of the weld training system of FIG. 1*a*, in accordance with aspects of this disclosure.

FIG. 2 is a block diagram showing example components of the mobile device 200. As shown, the mobile device 200 includes several components in electrical communication with one another via a common electrical bus 201. In particular, the mobile device 200 includes one or more data ports 212, speakers 214, lights 202, other output devices 216 (e.g., vibration devices), input devices 218, camera sensors 208, and/or other mobile sensors 206. The mobile device 200 further includes communication circuitry 210, audio circuitry 220, processing circuitry 222, graphics circuitry 224, memory circuitry 226, and a display screen 204.

In some examples, the components of the mobile device 200 may reside on one or more printed circuit boards (PCBs) and/or flex circuits. While not shown in the example of FIG. 2 for the sake of simplicity, in some examples the mobile device 200 may further include a power source in electrical communication with, and/or configured to supply power to, the various components of the mobile device 200. In some examples, the display screen 204 may be a touch screen configured to detect and/or receive touch based input (e.g., via capacitive, acoustic, inductive, and/or resistive touchscreen sensors). In some examples, the input devices 218 may include, for example, one or more touchscreen elements, microphones, physical buttons, gesture controls, biometric sensors, and/or other types of input devices that generate electric signals in response to user input.

In some examples, the camera sensor(s) 208 may include one or more adjustable lenses, filters, and/or other optical components for capturing electromagnetic waves in one or more spectra, such as, for example, infrared, visible, and/or ultraviolet. In some examples, two or more of the camera sensors 208 may implement stereoscopic tracking and/or capture stereoscopic images. In some examples, one or more of the camera sensors 208 and one or more of the mounted sensors 106 may implement stereoscopic tracking and/or capture stereoscopic images. In some examples, one or more of the other mobile sensors 206 may comprise temperature sensors, accelerometers, magnetometers, gyroscopes, proximity sensors, pressure sensors, light sensors, motion sensors, position sensors, ultrasonic sensors, infrared sensors, Bluetooth sensors, and/or near field communication (NFC) sensors.

In some examples, the communication circuitry 210 may be configured for wireless communication with the communication module 710 of the welding tool 700, remote server(s) 114, and/or remote display(s) 116 via one or more wireless communication protocols. For example, the one or more wireless communication protocols may include NFC protocols, cellular protocols (e.g., GSM, IS-95, UMTS, CDMA, LTE, etc.), IEEE 802.15.4 based protocols in the 2.4 GHz industrial, scientific, and medical (ISM) radio band (commonly known as Zigbee), low frequency magnetic signal protocols being transmitted at a frequency of approximately 131-134 kHz in conformance with IEEE 1902.1 standard (commonly known as Rubee), short wavelength ultra high frequency radio communication protocols in the 2.400 to 2.485 GHz ISM band in conformance with IEEE 802.15.1 standard (commonly known as Bluetooth), communication protocols in conformance with the IEEE 802.11 standard (commonly known as Wifi), and/or other appropriate communication protocols. Though not shown in the example of FIG. 2, in some examples, the communication circuitry 210 may be in electrical communication with an antenna of the mobile device 200.

In some examples, the audio circuitry 220 may include circuitry configured to drive the one or more speakers 214. In some examples, the graphics circuitry 224 may include one or more graphical processing units (GPUs), graphical driver circuitry, and/or circuitry configured to drive graphical display on the display screen 204. In some examples, the graphics circuitry 224 may be configured to generate one or more simulation (e.g., augmented reality, mixed reality, and/or virtual reality) images on the display screen 204 during a welding simulation.

In some examples, the processing circuitry 222 may include one or more processors. In the example of FIG. 2, the memory circuitry 226 includes (and/or stores) a welding simulation program 300. As shown, the welding simulation program 300 includes a temperature detection process 500, an orientation configuration process 600, a workpiece configuration process 800, and an equipment configuration process 1200. In some examples, the temperature detection process 500, orientation configuration process 600, workpiece configuration process 800, and/or equipment configuration process 1200 may be separate from the welding simulation program 300. In some examples, the welding simulation program 300 may comprise machine readable instructions configured to be executed by the processing circuitry 222.

FIG. 3 is a flowchart illustrating an example operation of the welding simulation program 300. In the example of FIG. 3, the welding simulation program 300 begins at block 302. At block 302, certain simulation parameters of the simulation program 300 are configured and/or selected during a preliminary configuration. The simulation parameters may include, for example, one or more simulation exercises, joint types, tutorial settings, goals, difficulty settings, feedback settings, realism settings, sensor settings, lighting settings, input device settings, output device settings, communication settings, simulation modes, fixture parameters, equipment types, equipment parameters, thresholds, product credentials, user credentials, user characteristics, upload settings, screen mirroring settings, marking parameters, and/or other appropriate settings and/or parameters. In some examples, the simulation program 300 may conduct a welding simulation based, at least in part, on some or all of these simulation parameters.

In some examples, a simulation exercise may comprise a predefined activity, test, and/or task for a user to complete during a welding simulation. In some examples, a simulation exercise may be automatically determined and/or selected by the simulation program 300, such as, for example, based on a selected/determined joint type and/or other simulation parameter. In some examples, a simulation exercise may be a freeform exercise, where there is no predefined task, and a user is instead given free reign to weld in whatever manner they wish.

In some examples, a joint type may comprise a type of joint defined by an intersection of two workpieces 900 in a workpiece assembly 1000. In some examples, a joint type may comprise, for example, a lap joint, a butt joint, a corner joint, a T joint, an edge joint, and/or a pipe joint. In some examples, a joint type may be automatically determined and/or selected by the simulation program 300, such as, for example, based on sensor data, a selected simulation exercise, and/or some other simulation parameter.

In some examples, a tutorial may be an audio, pictorial, and/or video tutorial that is output to a user through appropriate mechanisms of the mobile device 200. In some examples, a selected tutorial may be output prior to and/or during a welding simulation. In some examples, a tutorial may be interactive, requiring some input from user to complete. In some examples, a tutorial may be automatically determined and/or selected by the simulation program 300, such as, for example, based on a selected/determined exercise, joint type, goal, difficulty, feedback, realism, and/or other simulation parameters.

In some examples, a goal may be an objective and/or target grade and/or score for a user to achieve during a welding simulation. In some examples, the goal may be automatically determined and/or selected by the simulation program 300, such as, for example, based on a selected/determined exercise, joint type, difficulty, realism, mode, and/or other simulation parameter(s). In some examples, a difficulty (e.g., very easy, easy, normal, hard, very hard, etc.) may refer to how ambitious a goal may be, and/or how strict and/or stringent may be the scoring of the welding simulation. In some examples, the difficulty may be automatically determined and/or selected by the simulation program 300, such as, for example, based on a selected/determined exercise, realism, mode, and/or other simulation parameter(s).

In some examples, a feedback setting may indicate the means by which feedback should be provided to a user during the welding simulation. For example, feedback may be provided through audio, visual, vibration, and/or other means. In some examples, a feedback setting may indicate how much and/or how little feedback should be provided to the user during the welding simulation. For example, feedback may be provided with respect to all or some equipment parameters and/or welding technique parameters (e.g., tool angle, tool aim, tool speed, tool position, contact tip to work distance, workpiece position, workpiece orientation, workpiece configuration, equipment parameters, etc.). In some examples, a feedback setting may allow suppression of feedback with respect to some or all equipment parameters and/or welding technique parameters. In some examples, a feedback setting may allow suppression of feedback with respect to all but one equipment parameter and/or welding technique parameter. In some examples, a feedback setting may be automatically determined and/or selected by the simulation program 300, such as, for example, based on a selected/determined simulation exercise, joint type, tutorial, goal, difficulty, realism, and/or other appropriate simulation settings and/or parameters.

In some examples, a realism setting (e.g., low, medium, high, etc.) may indicate how close to reality the welding simulation attempts to adhere. For example, the welding simulation may simulate or omit certain things that sometimes occur during real life welding (e.g., sounds, smoke, fumes, lights, vibrations, resistance, anomalies, impurities, burn through, etc.) based on a realism setting. In some examples, the realism setting may impact certain performance quality settings (e.g., of the display screen 204, graphics circuitry 224, etc.). In some examples, a realism setting may be automatically determined and/or selected by the simulation program 300, such as, for example, based on a selected/determined simulation exercise, goal, difficulty, and/or other appropriate simulation settings and/or parameters.

In some examples, sensor settings may be settings pertaining to the camera sensor(s) 208 and/or mobile sensors 206 of the mobile device 200, and/or the mounted sensors 106 of the device mount 102. In some examples, sensor settings may include autofocus and/or auto-tracking settings of the camera sensor(s) 208. In some examples, sensor settings may include a calibration of one or more of the camera sensors 208 and/or mobile sensors 206 (e.g., accelerometers and/or gyroscopes). In some examples, lighting settings may include settings pertaining to the lights 202 of the mobile device, such as, for example, brightness, intensity, when to be on/off, how long to stay on/off, and/or other appropriate settings. In some examples, certain lighting settings may be automatically determined and/or selected by the simulation program 300, such as, for example, based on a selected/determined simulation exercise, goal, difficulty, realism, and/or other appropriate settings and/or parameters.

In some examples, input and/or output device settings may be settings pertaining to the input and/or output devices of the mobile device 200 (e.g., input devices 218, display screen 204, speaker(s) 214, etc.). For example, an input device setting may turn on/off a microphone and/or touch screen sensitivity of the display screen 204. As another example, an output device setting may be a volume of the speaker 214 and/or a brightness, color, resolution, and/or graphics quality of the display screen 204. In some examples, certain input and/or output device settings may be automatically determined and/or selected by the simulation program 300, such as, for example, based on a selected/determined exercise, tutorial, mode, feedback, realism, and/or other appropriate settings and/or parameters.

In some examples, communication settings may be settings pertaining to the communication circuitry 210 of the mobile device 200. For example, the communication settings may control and/or impact the connection between the mobile device 200 and the communication module 710 of the welding tool 700, the remote server(s) 114, and/or the remote display(s) 116. For example, the communication settings may control and/or impact the communication protocols used by the mobile device 200 to communicate with the communication module 710 of the welding tool 700, the remote server(s) 114, and/or the remote display(s) 116. In some examples, the communication settings may include a unique identifier of the communication module 710 and/or welding tool 700, to enable communication between the mobile device 200 and welding tool 700.

Figure 4A:
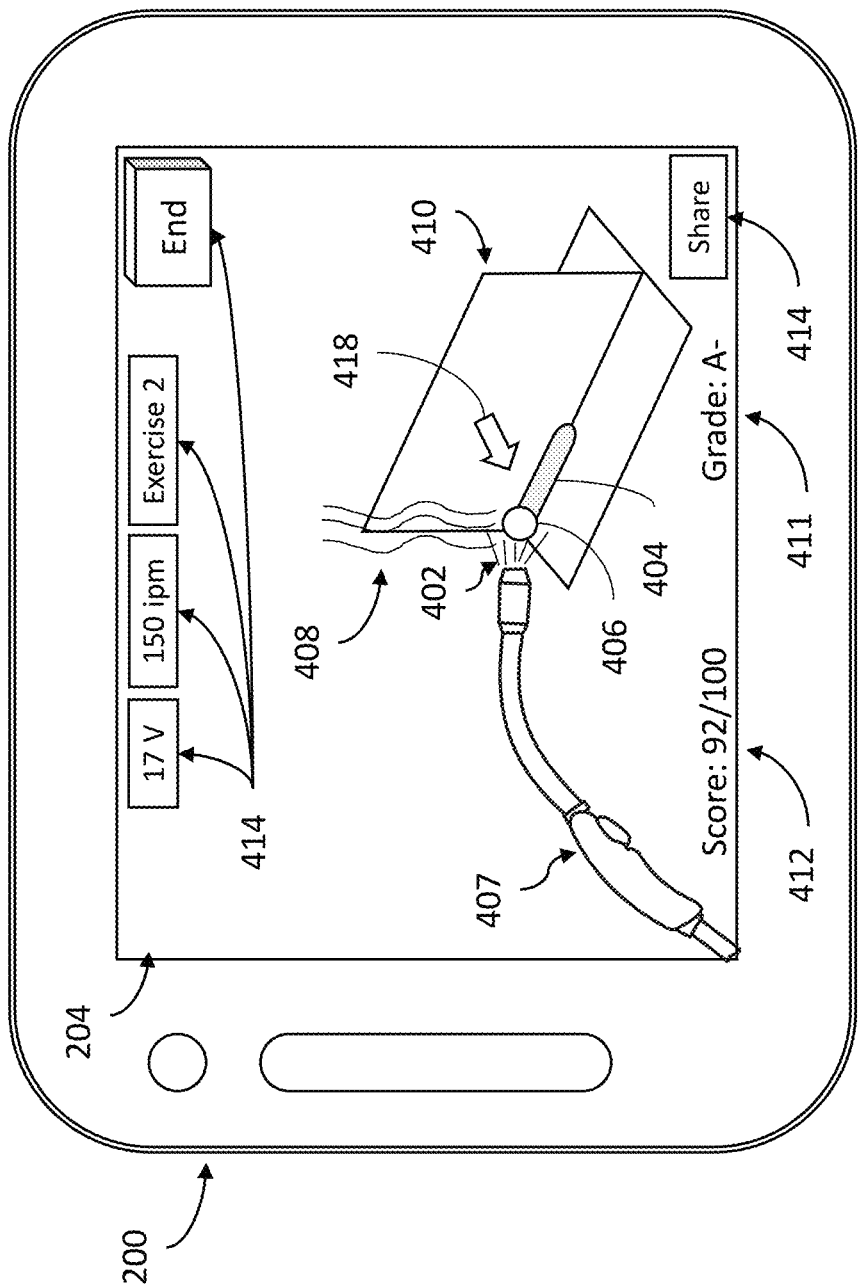
FIG. 4*a* depicts an example mobile device display during a normal operation of the example welding simulation program of FIG. 3, in accordance with aspects of this disclosure.

In some examples, simulation modes may set different modes of operation for the welding simulation. For example, selecting a normal mode of operation may lead to a normal simulation that overlays simulation images onto the welding tool 700, workpiece assemblies 1000, and/or other objects in the FOV 108 of the user (e.g., via the mobile device 200) when wearing the welding helmet shell 104. FIG. 4a shows an example of a display screen 204 of a mobile device 200 during a normal mode of operation.

Figure 4B:
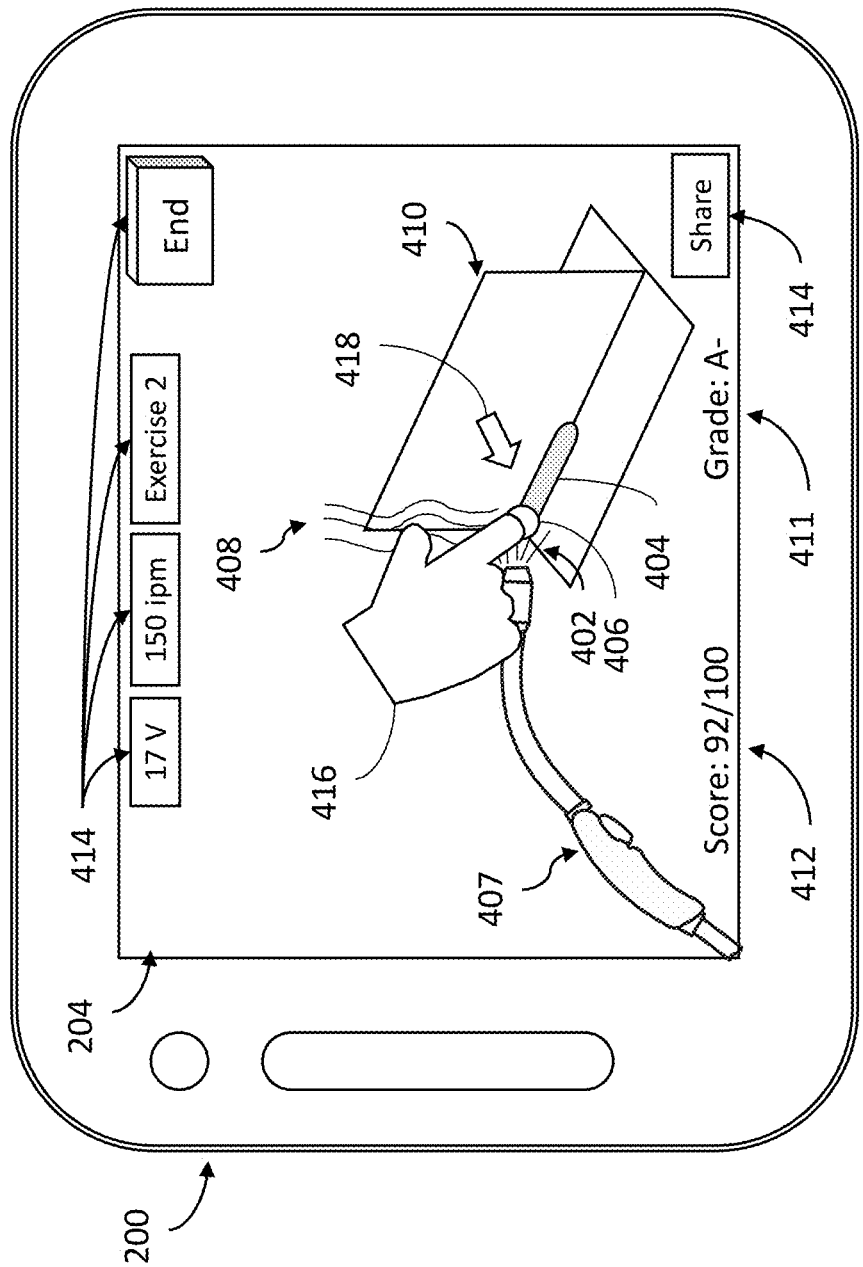
FIG. 4*b* depicts an example mobile device display during a tool-less operation of the example welding simulation program of FIG. 3, in accordance with aspects of this disclosure.

In some examples, selecting a tool-less mode of operation may lead to a more simplified welding simulation that does not use the welding tool 700 and/or workpieces 900. Instead of using a welding tool 700, in some examples, a user may use their finger(s) and/or stylus to deliver touch screen inputs and/or perform the welding simulation during a tool-less mode of operation. FIG. 4b shows an example of a display screen 204 of a mobile device 200 during a tool-less mode of operation.

Figure 4C:
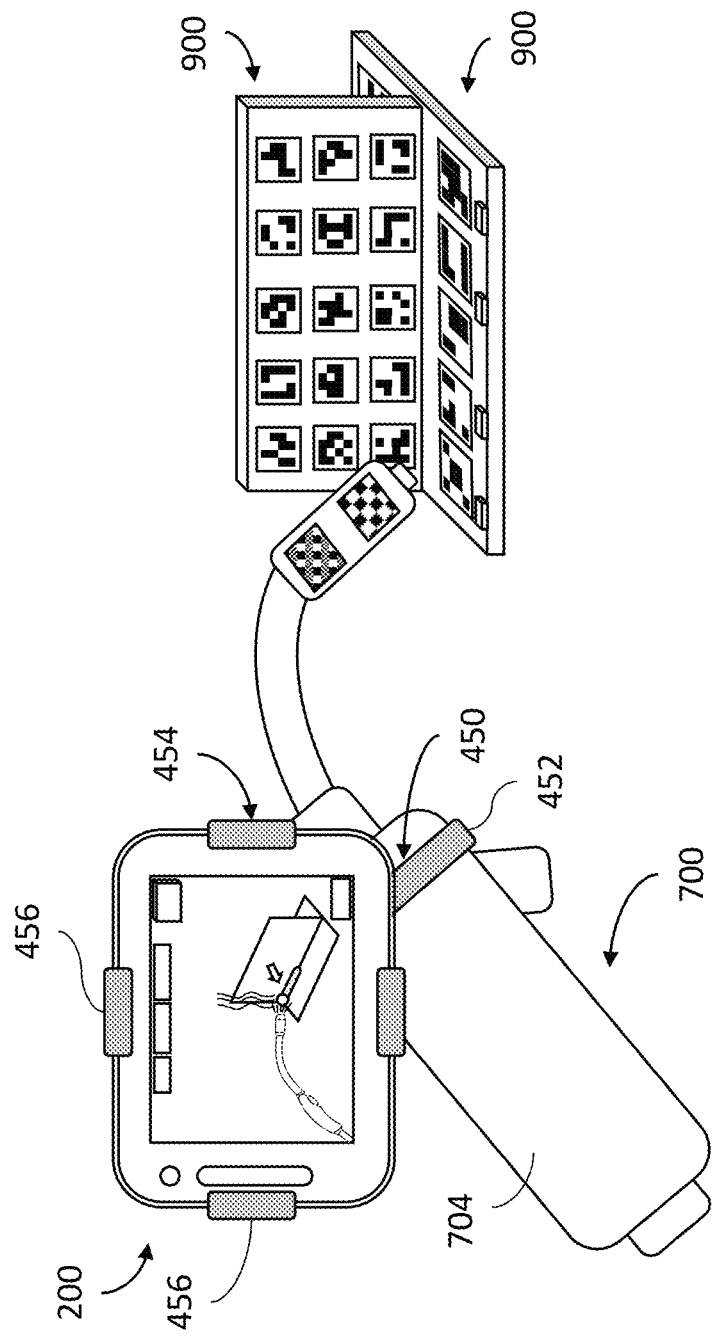
FIG. 4*c* depicts an example mobile device mounted to an example welding tool during a helmet-less operation of the example welding simulation program of FIG. 3, in accordance with aspects of this disclosure.

In some examples, selecting a helmet-less mode of operation may configure the welding simulation program 300 for operation without a helmet shell 104. In such an example, the mobile device 200 may be secured to the welding tool 700 instead of the helmet shell 104, such as via the device mount 102 and/or a torch mount 450. FIG. 4c shows an example of the mobile device 200 mounted to the welding tool 700 during a helmet-less mode of operation. In some examples, a simulation mode may be automatically determined and/or selected by the simulation program 300, such as, for example, based on a selected/determined exercise, realism, communication settings, and/or other appropriate simulated settings and/or parameters.

In some examples, a fixture parameter may be a location, configuration, and/or orientation of the fixturing system 1100. In some examples, one or more fixture parameters may be automatically determined and/or selected by the simulation program 300 via a calibration process. In some examples, an equipment type may include a type and/or model of a welding tool 700, a welding power supply, a wire feeder, a gas supply, and/or a gas valve. In some examples, an equipment parameter may be a parameter of a piece of welding-type equipment (e.g., power supply, gas supply valve, wire feeder, welding tool 700, etc.). Examples of equipment parameters include a welding process, current, voltage, pulse frequency, wire type, wire diameter, wire feed speed, pressure, workpiece material type, and/or workpiece material thickness. In some examples, a threshold may be an upper or lower limit on some parameter, such as, for example, a temperature and/or remaining power of the mobile device 200.

In some examples, a product credential may be a unique identifier (e.g., serial number) of the weld training system 100 and/or a component of the weld training system 100 (e.g., mobile device 200, simulation program 300, helmet shell 103, torch 700, etc.). In some examples, a user credential may be a username, unique identifier, and/or password of a user. In some examples, product credentials and/or user credentials may be sent to and/or verified by the remote server(s) 114.

In some examples, user characteristics may include, for example, one or more preferred simulation parameters, dominant hand, height, experience, qualifications, completed exercises, assigned exercises, scores, and/or other characteristics of a user. In some examples, user characteristics may be received by the mobile device 200 from the remote server(s) 114, such as in response to sending user credentials. In some examples, upload settings may include information pertaining to what, when, where, and/or how the simulation program 300 should upload data to the remote server(s) 114. In some examples, screen mirroring settings may include information pertaining to what, when, where, and/or how the simulation program 300 should send to and/or display on the remote display(s) 116.

In the example of FIG. 3, the simulation program 300 proceeds to block 304 after block 302. At block 304, the simulation program 300 determines whether or not to conduct the welding simulation. In some examples, this determination may be based on user input (e.g., selecting to begin simulation), a detected configuration of the workpieces 900 and/or welding tool 700, a timer, and/or some other appropriate consideration. For example, the simulation program 300 may prompt the user (e.g., via display screen 204 and/or speakers 214) to hold the trigger 706 for a certain length of time, touch an icon displayed on the screen 204, and/or provide some other input to begin conducting the welding simulation. As shown, the simulation program 300 proceeds to block 306 if the simulation program determines that the simulation should not yet begin. At block 306 the simulation program 300 either decides to return to block 302 or end the simulation program 300 (e.g., based on a user input to end and/or exit program and/or some other appropriate consideration).

In the example of FIG. 3, the simulation program 300 proceeds to block 308 after block 304 in response to a determination that a welding simulation should be conducted. In some examples, the simulation program 300 may provide instructions (e.g., via display screen 204 and/or speakers 214) as to how to setup the weld training system 100 for the simulation prior to actually beginning the simulation at block 308. For example, the simulation program 300 may output instructions (and/or guidance) as to how to secure the mobile device 200 to the helmet shell 104 and/or torch 700, and/or how to configure the workpiece(s) 900 prior to actually beginning the simulation at block 308. In some examples, the instructions may be in the form of one or more images, videos, animations, and/or auditory messages.

In some examples, the instructions (and/or guidance) may be tailored to the user and/or simulation using one or more parameters of the simulation program 300. For example, the simulation program 300 may output instructions (and/or guidance) as to how to secure the mobile device 200 to the helmet shell 104 in a normal mode of operation, and output instructions (and/or guidance) as to how to secure the mobile device 200 to the torch 700 in a helmet-less mode of operation. In some examples, instructions (and/or guidance) as to how to secure the mobile device 200 to the helmet shell 104 and/or torch 700 may only be provided if the user selects the icon displayed on the screen 204 to start the simulation 300 at block 306.

At block 308, the simulation program 300 captures sensor data via the camera sensor(s) 208, mobile sensors 206, and/or mounted sensors 106. For example, image, audio, thermal, position, movement, angle, and/or other data may be captured. Additionally, at block 308, the simulation program 300 captures data from the welding tool 700. In some examples, this may comprise receiving one or more signals from the communication module 710 of the welding tool 700. In some examples, the communication module 710 may be in electrical and/or mechanical communication with the trigger 706 of the welding tool 700, and/or send one or more signals indicative of the whether the trigger 706 has been and/or is being activated. In some examples, the simulation program 300 may additionally, or alternatively, determine whether the trigger has been and/or is being activated via an analysis of the sensor data (e.g., distance between and/or presence of certain markers 112). Finally, at block 308, the simulation program 300 captures input data from the input devices 218 and/or display screen 204 of the mobile device 200.

In the example of FIG. 3, the simulation program 300 proceeds to block 310 after block 308. At block 310, the simulation program 300 analyzes data obtained at block 308 to determine positions and/or orientations of the welding tool 700, workpiece(s) 900, and/or one or more simulated welding tools 407 and/or simulated workpieces 410. In some examples, the analysis may include analyzing sensor data to recognize markers 112 on the welding tool 700 and/or workpiece(s) 900 and determine the positions and/or orientations of those markers 112 relative to the mobile device 200. In some examples, the analysis may include using image, acoustic, and/or thermal recognition techniques to identify objects proximate to and/or in the FOV 108 of the mobile device 200. In some examples, the analysis may take into account one or more of the simulation parameters of block 302.

In the example of FIG. 3, the simulation program 300 proceeds to block 312 after block 310. At block 312, the simulation program 300 determines an impact to a score and/or grade of the user. For example, the user may start with a score of 0, 50, or 100, and/or a grade of F, C, or A, and the determined position and/or orientation of the welding tool 700 and/or workpiece(s) 900 may impact the grade and/or score. In some examples, the simulation program 300 may take into consideration one or more simulation parameters and/or welding technique parameters when determining the grade/score impact. For example, the simulation program 300 may determine how far from an expected position and/or orientation the welding tool 700 is when determining a score/grade impact. Further, the simulation program 300 may determine the expected position and/or orientation based on the simulation exercise and/or properties of the simulation exercise. As another example, the simulation program 300 may determine a degree to which a deviation and/or adherence to the expected position and/or orientation may impact the score/grade based on the difficulty and/or realism.

In the example of FIG. 3, the simulation program 300 further determines feedback at block 312. For example, the simulation program 300 may determine what actions may be taken by the user to improve their score (e.g., change of equipment parameters, welding technique, position and/or orientation of the welding tool 700 and/or workpiece(s) 900, etc.), and prepare feedback indicative of such actions. In some examples, the simulation program 300 may consider the position and/or orientation of the welding tool 700 and/or workpiece(s) 900 determined at block 310 when determining feedback. In some examples, the simulation program 300 may additionally, or alternatively, consider certain simulation parameters when determining feedback (e.g., the selected exercise, joint type, tutorial, goal, difficulty, feedback settings, mode, equipment type, equipment parameters, marking parameters, etc.). In some examples, feedback may be comprised of audio and/or visual output of the mobile device 200 and/or welding tool 700. In some examples, feedback may be comprised of vibration output of the mobile device 200 and/or welding tool 700. In some examples, feedback may be comprised of one or more simulated feedback effects.

In the example of FIG. 3, the simulation program 300 also determines one or more simulation effect and/or simulation effect properties at block 312. For example, the simulation program 300 may determine positions, orientations, intensities, and/or other properties of one or more simulated welding effects, simulated feedback effects, simulated interface effects and/or other simulated effects. In some examples, simulated welding effects may include simulated welding arcs, weld puddles, weld beads, welding sounds, welding fumes, and/or vibrations. In some examples, simulated feedback effects may include vibrations, reticles, targets, guides, instructions, scores, grades, markings, and/or other appropriate audio, visual, and/or tactile effects. In some examples, the weld training system 100 may allow a user to add, edit, and/or delete simulated markings, such as described, for example, in U.S. Non-Provisional patent application Ser. No. 16/273,980, filed Feb. 12, 2019, and titled "VIRTUAL MARKINGS IN WELDING SYSTEMS," the entirety of which is hereby incorporated by reference. In some examples, simulated interface effects may include simulated buttons, menus, and/or other appropriate audio, visual, and/or tactile effects that assist a user in controlling and/or interfacing with the configuration parameters and/or settings of the welding simulation. In some examples, other effects may include simulated material overlays (e.g., to make the welding tool 700 and/or workpiece(s) 900 appear more sturdy, heavy, metallic and/or realistic), buttons, instructions, markings, and/or other appropriate audio, visual, and/or tactile effects.

In some examples, certain properties of the simulated effects may be based, at least in part, on the simulation parameters. For example, the simulation program 300 may simulate certain welding effects (e.g., welding arcs, weld puddles, weld beads, welding sounds, welding fumes, vibration) differently depending on a type and/or model of welding-type equipment (e.g., welding-type power supply, wire feeder, gas supply, and/or welding tool 700) selected for the simulation, and/or the selected equipment parameters. In some examples, the simulation program 300 may configure effect properties to be similar to the properties of environmental effects that occur in the real world when welding using the selected equipment with the selected equipment parameters. This may provide a user with a welding experience that more closely adheres to a welding experience that they may experience in the real world using equipment they are familiar with and/or own. In some examples, the realism of the effects may also be impacted by a realism setting.

As another example, the simulation program 300 may simulate the properties of the feedback effects and/or other effects (e.g., reticles, targets, guides, instructions, markings) differently based on a selected exercise, joint type, tutorial, goal, difficulty, feedback setting, realism, mode, and/or marking setting. In some examples, different exercises and/or tutorials may entail welding at different locations with different equipment parameters and/or welding techniques. The simulation program 300 may simulate feedback effects differently to reflect this, such as, for example, by changing reticles, targets, guides, instructions, markings to indicate to the user the required and/or recommended equipment parameters, welding techniques, and/or positions, orientations, and/or configurations of the workpiece(s) 900 and/or welding tool 700.

In the example of FIG. 3, the simulation program 300 proceeds to block 314 after block 312. At block 314, the simulation program 300 outputs the feedback, simulated effects, and/or grade/score to the user (e.g., via the mobile device 200 and/or welding tool 700). For example, in an augmented reality simulation, the graphics circuitry 224 (and/or other circuitry) and display screen 204 of the mobile device 200 may generate one or more images that overlay one or more grades/scores, feedback, and/or simulated effects onto one or more images of the user's FOV 108 (e.g., captured by the camera sensor(s) 208, mounted sensors 106, and/or mobile sensors 206). In a virtual reality simulation, the graphics circuitry 224 (and/or other circuitry) and display screen 204 of the mobile device 200 may generate one or more entirely simulated images that include a simulated welding environment, welding tool 700, welding workpieces 900, etc., along with one or more grades/scores, feedback, and/or simulated effects. In some examples, the feedback, simulated effects, and/or grade/score may be output to the user via audio and/or tactile output instead of, or in addition to, visual output. In some examples, the simulation program 300 may additionally output an option allowing the user to share an image and/or video of the welding simulation, their weld, their current view, their grade/score, and/or some other aspect of the welding simulation to a social media application.

In the example of FIG. 3, the simulation program 300 proceeds to block 316 after block 314. At block 316, the simulation program 300 determines whether the simulation should end or continue. In some examples, the simulation program 300 may make this determination based on whether a user has reached a selected goal and/or completed a selected exercise. In some examples, the determination may be based on whether a user has provided some input indicative of a desire and/or command to stop the simulation. If the simulation program 300 determines that the simulation should stop, the simulation program 300 proceeds to block 306, which is discussed above. If the simulation program determines that the simulation should continue, the simulation program 300 returns to block 308.

In some examples, the simulation program 300 may implement changes to the simulation configurations at block 316 if the simulation program 300 determines the simulation should continue. For example, the user may provide one or more inputs indicative of a desire and/or command to change one or more simulation configurations (e.g., exercise, equipment parameters, goals, difficulty, realism, etc.) during the welding simulation. As another example, the simulation program 300 may automatically decide to change one or more simulation parameters. In such examples, the simulation program 300 may implement those changes at block 316 if the simulation program 300 determines the simulation should continue, before returning to block 308.

FIG. 4a depicts an example display screen 204 of the mobile device 200 during a normal operational mode of the simulation program 300. As shown, the display screen 204 depicts a simulated welding tool 407 applying a simulated welding arc 402 to a simulated workpiece assembly 410 at an end of a simulated weld bead 404. A simulated weld puddle 406 and simulated fumes 408 are produced by the simulated welding arc 402. An arrow 418 is displayed to give the user feedback as to where they should be welding. A grade 411 and a score 412 are shown at the bottom of the display screen 204.

In the example of FIG. 4a, interface buttons 414 are shown at the top and bottom of the display screen 204. In some examples, the buttons 414 may inform a user about, and/or allow a user to select and/or change, certain simulation configuration parameters. In some examples, a user may choose to end the welding simulation by selecting the "End" button 414. In some examples, a user may choose to share one or more aspects of the welding simulation by selecting the "Share" button 414. In some examples, the interface buttons 414 may be anchored to the workpiece(s) 900, and/or a user may select one or more of the interface buttons (and/or provide other input) using the welding tool 700, such as described, for example, in U.S. Provisional Patent Application No. 62/807,661, filed Feb. 19, 2019, and titled "SYSTEMS FOR SIMULATING JOINING OPERATIONS USING MOBILE DEVICES," the entirety of which is hereby incorporated by reference.

FIG. 4b depicts an example display screen 204 of the mobile device 200 during a tool-less mode of the simulation program 300. In some examples, the welding simulation program 300 may operate without a welding tool 700 during a tool-less mode of operation. Instead of using a welding tool 700, in some examples, a user may use their finger(s) and/or stylus to deliver touch screen inputs and/or perform the welding simulation during a tool-less mode of operation. In the example of FIG. 4b, a user's hand 416 is providing touch input to the display screen 204 to indicate where a simulated welding arc 402 should be applied to a simulated workpiece assembly 410. In such an example, the simulation program 300 may capture touch input from the display screen 204 of the mobile device 200 at block 308 and use that input to determine positions and/or orientations of a simulated welding tool 407 at block 310, and/or simulated effects at block 312.

In some examples, different touch input may be interpreted differently by the simulation program 300. For example, one finger input may be interpreted as a command to move the simulated welding tool to a selected portion of the display screen 204. On the other hand, two finger input may be interpreted as a command to begin welding (e.g., activate the simulated welding tool 407), such as, for example, where the simulated welding tool 407 is already positioned, or at the selected portion of the display screen 204.

In some examples, a user may hold the mobile device 200 in their hand, during a tool-less mode of operation, rather than the mobile device 200 being held by the mobile device mount 102. In some examples, one or more physical workpieces 900 may still be used during the tool-less mode of operation. In some examples, no workpiece(s) 900 or workpiece assemblies 1000 may be used during the tool-less mode of operation, and the simulation program 300 may simply generate one or more simulated workpiece assemblies 410 on its own.

FIG. 4c is an example depiction of a mobile device 200 mounted to a welding tool 700 during a helmet-less mode of the simulation program 300. In some examples, the simulation program 300 may operate without the helmet shell 104 during the helmet-less mode of operation. In some examples, mounting the mobile device 200 to the welding tool 700 may allow an operator to use the welding tool 700 and/or workpiece(s) 900 in a quasi-normal operation of the simulation program 300, but without having to mount the mobile device 200 to a helmet shell 200 or having to hold the mobile device 200 themselves.

In the example of FIG. 4c, the mobile device 200 is mounted to the welding tool 700 using a tool mount 450. In some examples, the tool mount 450 may be similar (or identical) to the device mount 102. In the example of FIG. 4c, the tool mount 450 comprises a clamp 452 that secures the tool mount 450 to the welding tool 700, and a cradle 454 having brackets 456 that holds the mobile device 200. In some examples, the cradle 454 may be considered part of the mobile device 200. In some examples, the device mount 102 may be used as part or all of the cradle 454. In some examples, the clamp 452 may comprise one or more magnets, adhesives, and/or other additional securement devices. In some examples, the clamp 452 of the tool mount 450 may be omitted and/or integrated into the welding tool 700 itself (e.g., at the handle 704).

While not shown due to the perspective of the drawing, in some examples, the cradle 454 may further include a base configured to support the mobile device 200. While not shown due to the perspective of the drawing, in some examples, the cradle 454 (e.g., at the base) may be attached to the clamp 452 via a mechanical link. In some examples, the mechanical link may comprise a flexible cable, a gooseneck, an arm, a joint (e.g., a ball joint), a ratcheting mechanism, and/or other means by which to movably connect the cradle 454 to the clamp 452. In some examples, the mechanical link is configured to allow the cradle 454 to be repositioned with respect to the clamp 452 and/or welding tool 700, so that the position, orientation, and/or FOV 108 of the mobile device 200 may be adjusted.

Figure 4D:
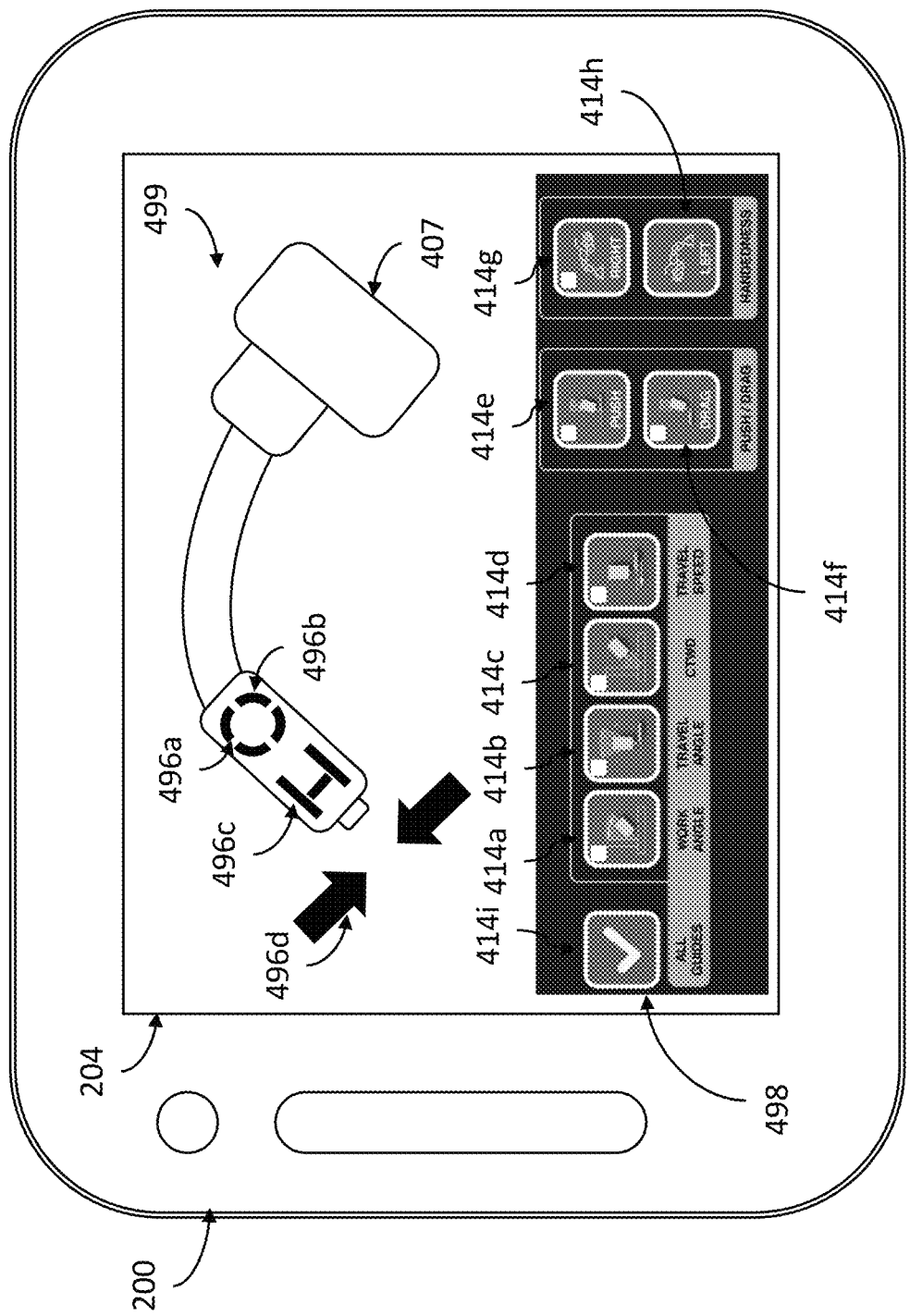
Figure 4F:
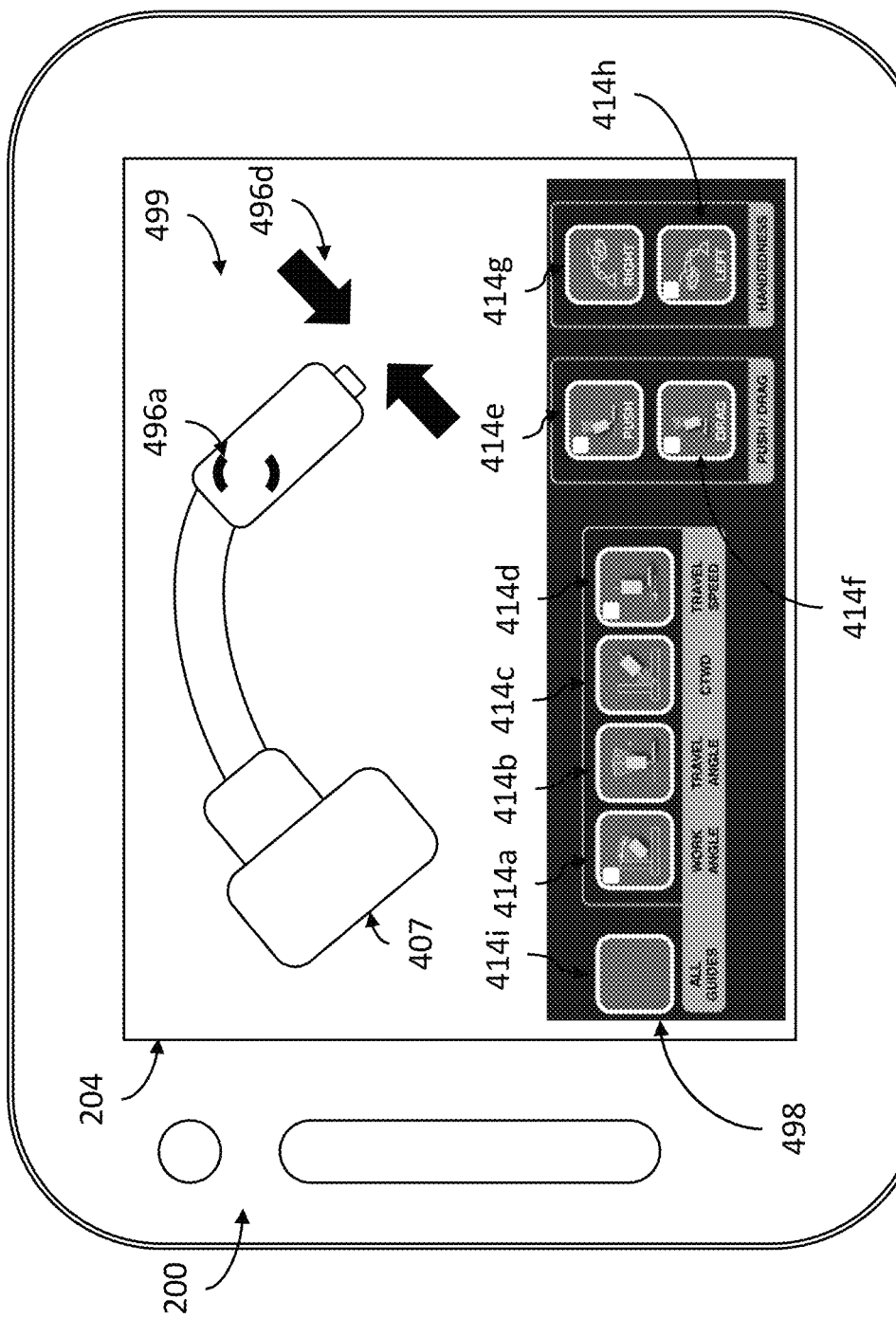

In some examples, the simulation program 300 may provide a preview of the impact of certain feedback setting (s) and/or other simulation parameters. For example, the display screen 204 may show a preview 499 of feedback effects that might be shown during the simulation program 300 under the selected feedback setting(s). In some examples, such a preview 499 might be shown when setting and/or changing feedback settings and/or other simulation parameters (e.g., at blocks 302 and/or 316). FIGS. 4d-4f show examples of such previews 499 shown on an example display screen 204 of the mobile device 200.

In the examples of FIGS. 4d-4f, the display screen 204 depicts an options panel 498 having several interface buttons 414. Interface buttons 414a, 414b, 414c, and 414d are feedback guide settings for work angle, travel angle, contact to work distance (CTWD), and travel speed guides, respectively. Interface buttons 414e and 414f correspond to simulation exercise settings for push and drag welds, respectively. Interface buttons 414g and 4141h correspond to user characteristic settings for right and left handedness, respectively. Interface button 414i allows a user to select all the guides.

In the example of FIGS. 4d-4f, the display screen 204 also depicts a preview 499 above the options panel 498. As shown, the preview 499 includes a depiction of a simulated welding tool 407, along with sample guides 496a, 496b, 496c, and 496d. In some examples, each sample guide 496 corresponds to one of the feedback guide setting buttons 414a, 414b, 414c, and 414d. Thus, a particular sample guide 496 is shown in the preview 499 when its corresponding feedback guide setting button 414 is selected, and not shown in the preview 499 when its corresponding feedback guide setting button 414 is not selected.

In FIG. 4d, all the feedback guide setting buttons 414a, 414b, 414c, and 414d are shown as selected. Likewise, all the sample guides 496a, 496b, 496c, and 496d are shown in the preview 499. In FIG. 4e, the work angle button 414a and travel speed button 414d have been deselected, while the travel angle button 414b and CTWD button 414c remain selected. Accordingly, the preview 499 depicts the sample guide 496b and sample guide 496c, but not the sample guide 496a or sample guide 496d. In FIG. 4f, the opposite is true; the work angle button 414a and travel speed button 414d are selected, while the travel angle button 414b and CTWD button 414c have been deselected. Accordingly, the preview 499 depicts the sample guide 496a and sample guide 496d, but not the sample guide 496b or sample guide 496c.

In the examples of FIGS. 4d-4f, the depictions of both the preview 499 and the simulation exercise setting buttons 414e and 414f are dependent on the selection of the characteristic setting buttons 414g/h for right and left handedness. In the examples of FIGS. 4d and 4e, the right handed characteristic setting button 414g is selected, and so both the preview 499 and simulation exercise setting buttons 414e and 414f are depicted in a right handed orientation. However, in FIG. 4f, the left handed characteristic setting button 414h is selected, and so both the preview 499 and the simulation exercise setting buttons 414e and 414f are depicted in a left handed orientation. While shown as a static image in the examples of FIGS. 4d-4f, in some examples, the preview 499 may be an animation or video, such as a video of a previously recorded simulation. In some examples, the depictions of the preview 499 and/or the simulation exercise setting buttons 414e/f may assist a user in quickly understanding how feedback, user characteristic, simulation exercise, and/or other settings might impact the simulation program 300.

Figure 5:
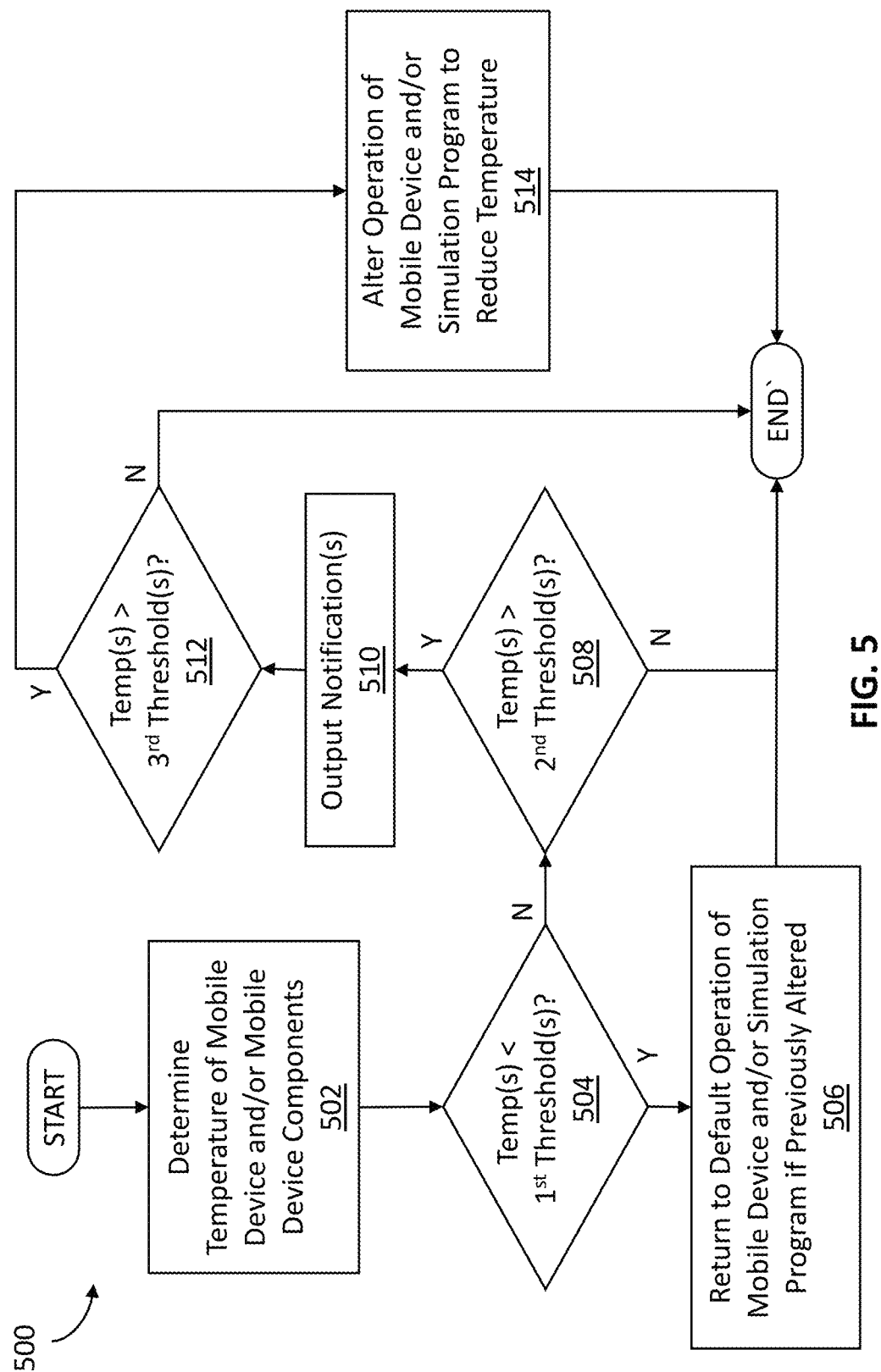
FIG. 5 is a flowchart illustrating an example temperature detection process, in accordance with aspects of this disclosure.

FIG. 5 is a flowchart illustrating an example temperature detection process 500. In some examples, the temperature detection process 500 may alter operation of the welding simulation program 300 and/or mobile device 200 if/when the operating temperature of the mobile device 200 exceeds a threshold. In some examples, the temperature detection process 500 may comprise machine readable instructions stored by the memory circuitry 226 of the mobile device 200. In some examples, the temperature detection process 500 may be part of the welding simulation program 300. For example, the temperature detection process 500 may execute during the preliminary configuration block 302 of the simulation program 300, and/or when the simulation loop recurs at block 316. In some examples, the temperature detection process 500 may execute independently of the welding simulation program 300, such as, for example, before, during, and/or after the execution of the welding simulation program 300.

In the example of FIG. 5, the temperature detection process 500 begins at block 502. At block 502, the temperature detection process 500 determines a temperature of the mobile device 200 and/or one or more components of the mobile device 200. In some examples, the temperature detection process 500 may determine the temperature via the mounted sensors 106 of the mobile device mount 102 and/or the mobile sensors 206 of the mobile device 200. In some examples, mobile sensors 206 and/or mounted sensors 106 may be positioned and/or configured to detect an overall temperature of the mobile device 200, and/or a particular temperature of one or more particular components of the mobile device 200. For example, the mobile device 200 may have one or more internal mobile temperature sensors 206 positioned and/or configured to measure a temperature proximate the processing circuitry 222, graphics circuitry 224, communication circuitry 210, memory circuitry 226, and/or other components of the mobile device 200. As another example, the mobile sensors 206 and/or mounted sensors 106 may be positioned and/or configured to measure an overall temperature of the mobile device 200 as a whole.

In the example of FIG. 5, the temperature detection process 500 proceeds to block 504 after block 502. At block 504, the temperature detection process 500 determines whether one or more temperatures measured at block 502 are less than one or more first temperature thresholds. In some examples, the first temperature threshold(s) may be representative of one or more temperatures below which there is little risk of thermal damage to the mobile device 200. In some examples, the first temperature threshold(s) may be predetermined and/or stored in the memory circuitry 226. In some examples, one or more of the temperature threshold may be set by a user, such as, for example, during block 302 of the welding simulation program 300. In some examples, the temperature detection process 500 may consider multiple first temperature thresholds at block 504. For example, the memory circuitry 226 may store different first temperature thresholds for the mobile device 200 as a whole and the individual components of the mobile device 200 (e.g., the processing circuitry 222, the graphics circuitry 224, etc.).

In the example of FIG. 5, the temperature detection process 500 proceeds to block 506 after block 504 if the temperature detection process 500 determines one or more measured temperatures are below the first temperature threshold(s). In some examples, the temperature detection process 500 proceeds to block 506 after block 504 only if the temperature of the mobile device 200 as a whole and the temperature of all of its individual components are all less than (or equal to) the first temperature threshold(s). In some examples, the temperature detection process 500 proceeds to block 506 after block 504 if the temperature of the mobile device 200 as a whole or the temperature of any of its individual components are less than (or equal to) the first temperature threshold(s).

At block 506, the temperature detection process 500 sets (or returns) the mobile device 200 and/or simulation program 300 (and/or related settings) to regular, default, and/or peak operation. In some examples, this may comprise setting, resetting, and/or increasing one or more performance and/or graphical settings of the mobile device 200 and/or simulation program 300, and/or one or more related settings (e.g., realism, resolution, etc.). In some examples, this may comprise enabling and/or resuming uploads to the remote server(s) 114, mirroring done by the remote display(s) 116, the welding simulation blocks 308 and/or 316, and/or the simulation program 300 in general. As shown, the temperature detection process 500 ends after block 506, though, in some examples, the temperature detection process 500 may instead return to block 502 instead of ending.

In the example of FIG. 5, the temperature detection process 500 proceeds to block 508 after block 504 if the temperature detection process 500 determines that one or more measured temperatures are not below the first temperature threshold(s). At block 508, the temperature detection process 500 determines whether one or more temperatures measured at block 502 are greater than one or more second temperature thresholds. In some examples, the second temperature threshold(s) may be the same or higher than the first temperature threshold(s). In some examples, the second temperature threshold(s) may be representative of one or more temperatures above which there is non-trivial and/or substantial risk of thermal damage to the mobile device 200. In some examples, one or more of the second temperature thresholds may be predetermined and/or stored in the memory circuitry 226. In some examples, one or more of the second temperature thresholds may be set by a user, such as, for example, during block 302 of the welding simulation program 300. In some examples, the temperature detection process 500 may consider multiple second temperature thresholds at block 508. For example, the memory circuitry 226 may store different second temperature thresholds for the mobile device 200 as a whole and the individual components of the mobile device 200 (e.g., the processing circuitry 222, the graphics circuitry 224).

In the example of FIG. 5, the temperature detection process 500 ends after block 508 if the measured temperature of the mobile device 200 and/or its components are less than their respective second temperature thresholds. In some examples, the temperature detection process 500 ends if the measured temperature of the mobile device 200 and/or its individual components are less than or equal to their respective second temperature thresholds. In some examples, the temperature detection process 500 ends only if the temperature of the mobile device 200 as a whole and the temperature of all of its individual components are all less than (or equal to) their respective second temperature thresholds. In some examples, the temperature detection process 500 ends if the temperature of the mobile device 200 as a whole or the temperature of any of its individual components are less than (or equal to) their respective second temperature threshold. While shown as ending in the example of FIG. 5, in some examples, the temperature detection process 500 may instead return to block 502 instead of ending.

In the example of FIG. 5, the temperature detection process 500 proceeds to block 510 after block 508 in response to determining the temperature of the mobile device 200 as a whole and/or the temperature of all or some of its individual components are greater than or equal to their respective second temperature thresholds. At block 510, the temperature detection process 500 outputs one or more notifications. In some examples, the notification(s) may be output via the light(s) 202, speaker(s) 214, display screen 204, and/or any other output device(s) 216 of the mobile device 200. In some examples, the notification(s) may be output via a speaker, light, vibration device, and/or other output device of the welding tool 700. In some examples, the notification(s) may include one or more symbols, icons, messages (e.g., visual and/or audio), animations, vibrations, and/or light flashes. For example, the welding tool 700 and/or mobile device 200 may vibrate to indicate that one or more temperatures have exceeded the threshold(s). As another example, speech may play from the welding tool 700 and/or mobile device 200 telling the user that one or more temperatures have exceeded the threshold(s), and/or how to reduce the temperature(s). As another example, an icon, symbol, text message, one or more pictures, a video, and/or an animation may be shown via the display screen 204 of the mobile device telling the user that one or more temperatures have exceeded the threshold(s), and/or how to reduce the temperature(s). In some examples, the notification may include an output (such as discussed above) indicating that the welding simulation will be terminated, disabled, and/or prevented from running until the temperature(s) are reduced.

In the example of FIG. 5, the temperature detection process 500 proceeds to block 512 after block 510. In some examples, block 510 may instead be skipped and/or omitted. In such an example, the temperature detection process 500 may proceed to block 512 after block 508 if the temperature detection process 500 determines that the temperature(s) measured at block 502 is/are greater than the second temperature threshold(s).

At block 512, the temperature detection process 500 determines whether the one or more temperatures measured at block 502 are greater than one or more third temperature thresholds. In some examples, the third temperature threshold(s) may be the same or higher than the second temperature threshold(s). In some examples, the third temperature threshold(s) may be representative of one or more temperatures above which there is significant and/or immediate risk of thermal damage to the mobile device 200. In some examples, one or more of the third temperature thresholds may be predetermined and/or stored in the memory circuitry 226. In some examples, one or more of the third temperature thresholds may be set by a user, such as, for example, during block 302 of the welding simulation program 300. In some examples, the temperature detection process 500 may consider multiple third temperature thresholds at block 510. For example, the memory circuitry 226 may store different third temperature thresholds for the mobile device 200 as a whole and the individual components of the mobile device 200 (e.g., the processing circuitry 222, the graphics circuitry 224).

In the example of FIG. 5, the temperature detection process 500 ends after block 512 if the measured temperature of the mobile device 200 and/or its components are less than their respective third temperature thresholds. In some examples, the temperature detection process 500 ends if the measured temperature of the mobile device 200 and/or its individual components are less than or equal to their respective third temperature thresholds. In some examples, the temperature detection process 500 ends only if the temperature of the mobile device 200 as a whole and the temperature of all of its individual components are all less than (or equal to) their respective third temperature thresholds. In some examples, the temperature detection process 500 ends if the temperature of the mobile device 200 as a whole or the temperature of any of its individual components are less than (or equal to) their respective third temperature threshold. While shown as ending in the example of FIG. 5, in some examples, the temperature detection process 500 may instead return to block 502 instead of ending.

In the example of FIG. 5, the temperature detection process 500 proceeds to block 514 after block 512 in response to determining the temperature of the mobile device 200 as a whole and/or the temperature of all or some of its individual components are greater than or equal to their respective third temperature thresholds. At block 514, the temperature detection process 500 alters an operation, parameter, setting, configuration, and/or other aspect of the mobile device 200 and/or simulation program 300 to reduce a temperature of the mobile device 200 and/or one or components of the mobile device 200. In some examples, the alteration(s) may comprise a decrease in a performance and/or graphical setting of the mobile device 200 and/or simulation program 300, and/or a related setting (e.g., realism, resolution, etc.). In some examples, the alteration(s) may comprise turning off and/or stopping uploads to the remote server(s) 114, to lessen the work required by the communication circuitry 210. In some examples, the alteration(s) may comprise turning off and/or terminating any mirroring being done on the remote display(s) 116 to lessen the work required by the communication circuitry 210 and/or graphics circuitry 224. In some examples, the alteration(s) may comprise terminating the simulation program 300 entirely, and/or prohibiting the simulation program 300 from beginning the welding simulation at block 308 and/or continuing the welding simulation at block 316. In some examples, the alteration(s) may comprise powering down the mobile device 200. While the example of FIG. 5 shows the temperature detection process 500 ending after block 514, in some examples, the temperature detection process 500 may instead return to block 502 instead of ending.

FIG. 6 is a flowchart illustrating an example orientation configuration process 600. In some examples, the orientation configuration process 600 may determine whether a current orientation of the mobile device 200 should be changed before beginning the welding simulation. In some examples, the orientation configuration process 600 may comprise machine readable instructions stored by the memory circuitry 226 of the mobile device 200. In some examples, the orientation configuration process 600 may execute as part of the welding simulation program 300. For example, the orientation configuration process 600 may execute during the preliminary configuration block 302 of the simulation program 300 and/or when the simulation loop recurs at block 316. In some examples, the orientation configuration process 600 may execute independently of the welding simulation program 300, such as, for example, before execution of the welding simulation program 300. In some examples, the orientation configuration process 600 may only execute during a normal mode of operation.

In the example of FIG. 6, the orientation configuration process 600 begins at block 602. At block 602, the orientation configuration process 600 determines a current orientation (e.g., left or right landscape) of the mobile device 200 within the mobile device mount 102. In some examples, this orientation determination may include and/or entail receiving some input from the user (e.g., via welding tool 700 and/or one of the input devices 218) identifying the orientation of the mobile device 200 In some examples, this determination may include and/or entail evaluating one or more measurements and/or outputs of the camera sensor(s) 208, mobile sensor(s) 206, and/or mount sensor(s) 106. For example, the orientation configuration process 600 may evaluate magnetometer, accelerometer, IMU, and/or other sensor data to determine the orientation of the mobile device 200.

In some examples, the mobile device 200 may undergo a calibration step prior to the orientation configuration process 600, where sensor data from the camera sensor(s) 208, mobile sensor(s) 206, and/or mount sensor(s) 106 is evaluated in different orientations of the mobile device 200 and/or associated with the different orientations of the mobile device when stored in memory circuitry 226. In such an example, the orientation configuration process 600 may compare instantaneous data from of the camera sensor(s) 208, mobile sensor(s) 206, and/or mount sensor(s) 106 with the stored data to determine the most likely orientation of the mobile device 200. In some examples, the sensor data and orientation association(s) may be predefined and/or predetermined. For example, the sensor data and orientation association(s) may be downloaded from the remote server(s) 114 and/or queried from memory circuitry 226 (e.g., based on some identifying information of the mobile device 200, such as a make, model, serial number, etc.).

In some examples, the orientation configuration process 600 may evaluate sensor data from interactions and/or communications between the mobile sensor(s) 206 and/or mount sensor(s) 106 to determine an orientation of the mobile device 200. For example, the mobile device mount 102 may include one or more mounted sensors 106 (e.g., NFC and/or RFID sensors) positioned at different portions of the device mount 102. In such an example, the mounted sensor(s) 106 may be configured to sense, detect, communicate with, and/or otherwise interface with one or more mobile sensors 206 of the mobile device 200 when the mobile sensor(s) 206 and mounted sensor(s) 106 are in proximity to one another. In some examples, certain mobile sensors 206 and mounted sensors 106 may only be in such proximity when the mobile device 200 is in a particular orientation. In some examples, a calibration step and/or loading of calibration data may be performed prior to this sort of orientation determination, similar to that discussed above.

In the example of FIG. 6, the orientation configuration process 600 proceeds to block 604 from block 602. At block 604, the orientation configuration process 600 determines an operational orientation of the mobile device 200. In some examples, determination of the operational orientation may be based on one or more user characteristics (e.g., dominant user hand). In some examples, the user characteristic(s) may be determined via manual input from the user (e.g., selection of one or more options via the welding tool 700 and/or input device 218 of mobile device 200), loading of the user characteristic(s) from memory circuitry 226, and/or download of the user characteristic(s) from the remote server(s) 114.

In some examples, the user characteristic(s) may be automatically determined by the orientation configuration process 600. For example, the orientation configuration process 600 may determine the user characteristic(s) based on certain user behaviors observed during the welding simulation. In some examples, data from the mounted sensors 106 and/or the mobile sensors 206 may show that a user exhibits welding behavior indicative of one or more particular user characteristics. For example, data from the mounted sensors 106 and/or the mobile sensors 206 may show that a user positions the welding tool 700 relative to the workpiece assembly 1000 in a certain way and/or a certain orientation at the start and/or end of a particular type of welding that is indicative of a particular user characteristic. For example, the orientation configuration process 600 may determine that a user is right handed if data from the mounted sensor(s) 106, camera sensor(s) 208, and/or mobile sensor(s) 206 show that the user positions the welding tool 700 to the right of the workpiece assembly 1000 when beginning a push welding technique, and/or positions the welding tool 700 to the left of the workpiece assembly 1000 when beginning a drag welding technique.

In some examples, the orientation configuration process 600 may determine the user characteristic(s) based on data from the mounted sensor(s) 106, camera sensor(s) 208, and/or mobile sensor(s) 206 relating to the welding tool 700, and/or markers 112 on the welding tool 700. For example, the orientation configuration process 600 may analyze and/or evaluate (e.g., image) data captured by the mounted sensor(s) 106, camera sensor(s) 208, and/or mobile sensor(s) 206 to determine whether the markers 112 on the welding tool 700 are relatively discernable, clear, and/or perpendicular to the camera sensor(s) 208. In some examples, the orientation configuration process 600 may further consider the current orientation of the mobile device 200 determined at block 602 when determining the user characteristic(s) and/or operational orientation. For example, the orientation configuration process 600 may analyze and/or evaluate the sensor data and determine that the markers 112 on the welding are not discernable, clear, and/or perpendicular to the camera sensor(s) 208. The orientation configuration process 600 may further determine that the current mobile device 200 orientation (determined at block 602), in conjunction with the determination that the markers 112 are less than discernable, clear, and/or perpendicular, suggests a particular user characteristic (e.g., right handed). Further, the orientation configuration process 600 may determine that, in view of the user characteristic and the current orientation of the mobile device 200, the operational orientation of the mobile device 200 during the welding simulation should be a different orientation.

Figure 7B:
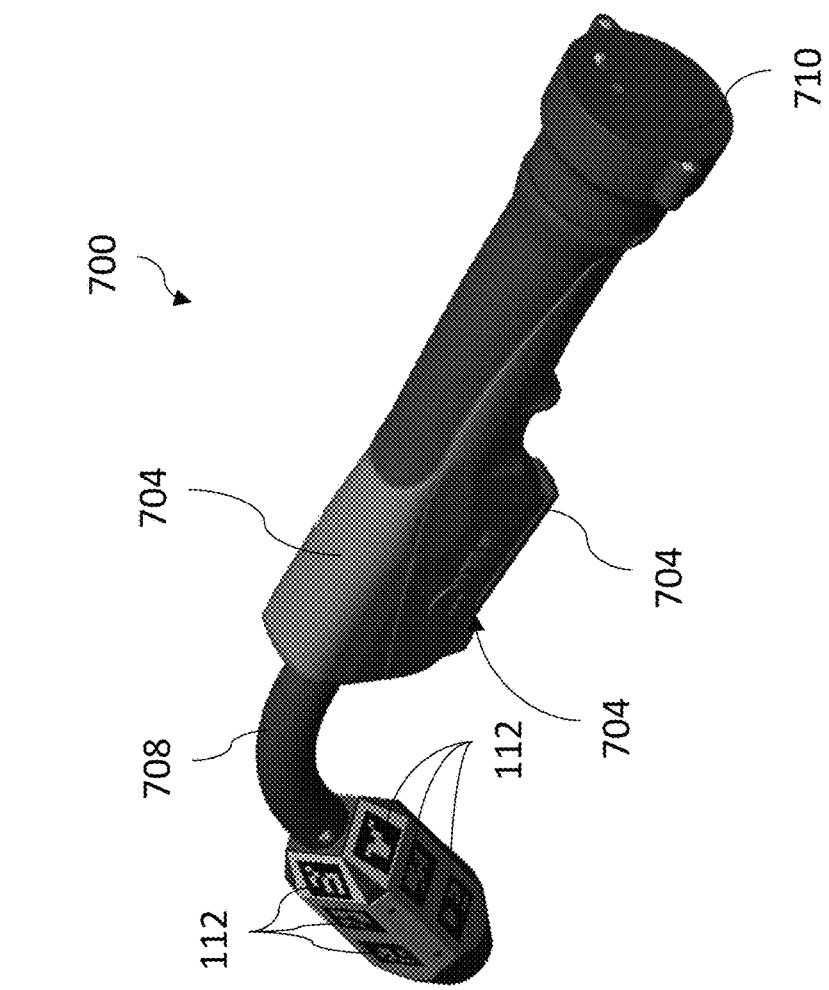
FIGS. 7*a*-7*b* illustrate different perspectives of an example welding tool, as may be captured by a camera sensor of the mobile device of FIG. 2 when the mobile device is mounted in different orientations, in accordance with aspects of this disclosure.
Figure 7A:
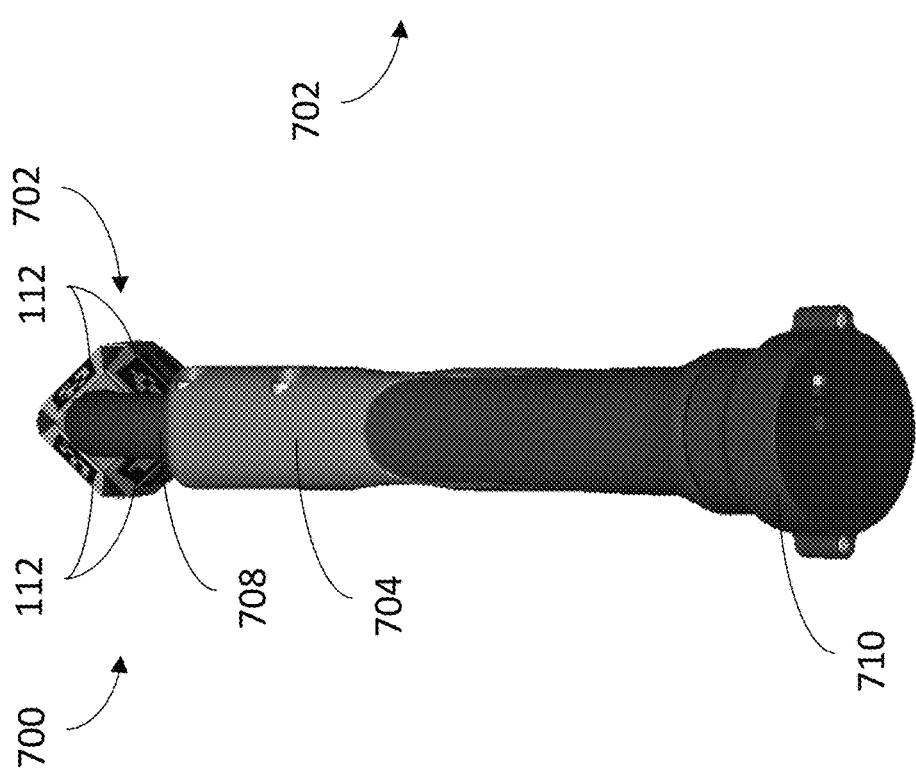

FIGS. 7a-7b illustrate different perspectives of a welding tool 700, such as may be captured, for example, by a camera sensor 208 of the mobile device 200 when the mobile device is mounted in different orientations. In the example of FIG. 7a, the welding tool 700 appears oriented substantially parallel to the viewer. While some of the markers 112 on the nozzle 702 are somewhat visible, most of the markers 112 are completely invisible due to the orientation of the welding tool 700. Additionally, the profile of the welding tool 700 itself is difficult to discern. Indeed, were the welding tool 700 tilted farther forward in the example of FIG. 7a, none of the markers 112 might be visible and the visible profile of the welding tool 700 would be even less.

In the example of FIG. 7b, the welding tool 700 is oriented more perpendicular to the viewer, such that a substantial side and/or perspective profile of the welding tool 700 is relatively apparent. More markers 112 on the nozzle 702 of the welding tool 700 are clear and visible than in FIG. 7a. The markers 112, and the profile of the welding tool 700, are also more perpendicular to the viewer. Were the welding tool 700 to tilt forward or backward (as may occur during welding), the markers 112 on the welding tool 700 would still be visible. Additionally, the profile of the welding tool 700 and/or features of the welding tool 700 (e.g., the nozzle 702, neck 708, handle 704, trigger 706, logo 712, etc.) would still be visible.

In some examples, the memory circuitry 226 of the mobile device 200 may store information relating to the markers 112 of the welding tool 700 (e.g., number, shape, size, pattern, position, etc.). In some examples, the memory circuitry 226 may store other data relating to the welding tool 700, such as, for example, one or more images, models, and/or diagrams of the welding tool 700 and/or its shape, features, dimensions, and/or other characteristics. In some examples, the orientation configuration process 600 may compare the stored information to the information obtained from the mounted sensor(s) 106, camera sensor(s) 208, and/or other mobile sensor(s) 206 to determine the user characteristic.

For example, the orientation configuration process 600 may determine that the welding tool 700 is oriented similarly to FIG. 7a relative to the camera sensor(s) 208 based on an analysis of the sensor data. Further, the current orientation of the mobile device 200 determined at block 602 may be a right landscape orientation, with the camera sensor(s) 208 facing outwards from the mobile device mount 102 through the right aperture 110a rather than the left aperture 110b. In such an example, the orientation configuration process 600 may determine that the user is right handed. Further, the orientation configuration process 600 may determine that the operational orientation of the mobile device 200 should be a left landscape orientation (e.g., with the camera sensor(s) 208 facing outwards from the mobile device mount 102 through the left aperture 110b, based on the determined user characteristic (i.e., right handedness), as that would provide a clearer and/or more perpendicular view of the welding tool 700 and/or markers 112 (similar to FIG. 7b).

In the example of FIG. 6, the orientation configuration process 600 proceeds to block 606 after block 604. At block 606, the orientation configuration process 600 determines whether the current orientation of the mobile device 200 determined at block 602 is the same as the operational orientation determined at block 604. If so, the orientation configuration process 600 proceeds to block 608, where the orientation configuration process 600 returns and/or executes the welding simulation (e.g., at block 302 of the program 300) then ends. If not, the orientation configuration process 600 proceeds to block 610, where the orientation configuration process 600 outputs one or more notifications to the user, then ends. However, in some examples, the orientation configuration process 600 may return to the beginning at block 602 after block 610, rather than ending.

In some examples, the notification(s) output at block 610 may be output via the speaker(s) 214, display screen 204, and/or output device(s) 216 of the mobile device 200. In some examples, the notification(s) output at block 610 may be output via a speaker and/or vibration device of the welding tool 700. In some examples, the notification(s) may include one or more arrows, icons, messages (e.g., visual and/or audio), animations, vibrations, and/or light flashes. For example, the welding tool 700 and/or mobile device 200 may vibrate to indicate that the orientation should change, and/or speech may play from the welding tool 700 and/or mobile device 200 telling the user that the orientation should be changed and/or providing instructions on how to change the orientation. As another example, an icon, arrow, text message, one or more pictures, a video, and/or an animation may be shown via the display screen 204 of the mobile device telling the user that the orientation should be changed and/or providing instructions on how to change the orientation. In some examples, the notification may include an output (such as discussed above) indicating that the welding simulation will be terminated, disabled, and/or prevented from running until the orientation is changed. In some examples, the orientation configuration process 600 may interface with the simulation program 300 to prevent execution of the welding simulation until the orientation is changed. In some examples, the notification(s) may indicate that (and/or how) an orientation (and/or other configuration) of the device mount 102 may be changed in order to change an orientation of the mobile device 200.

Figure 8:
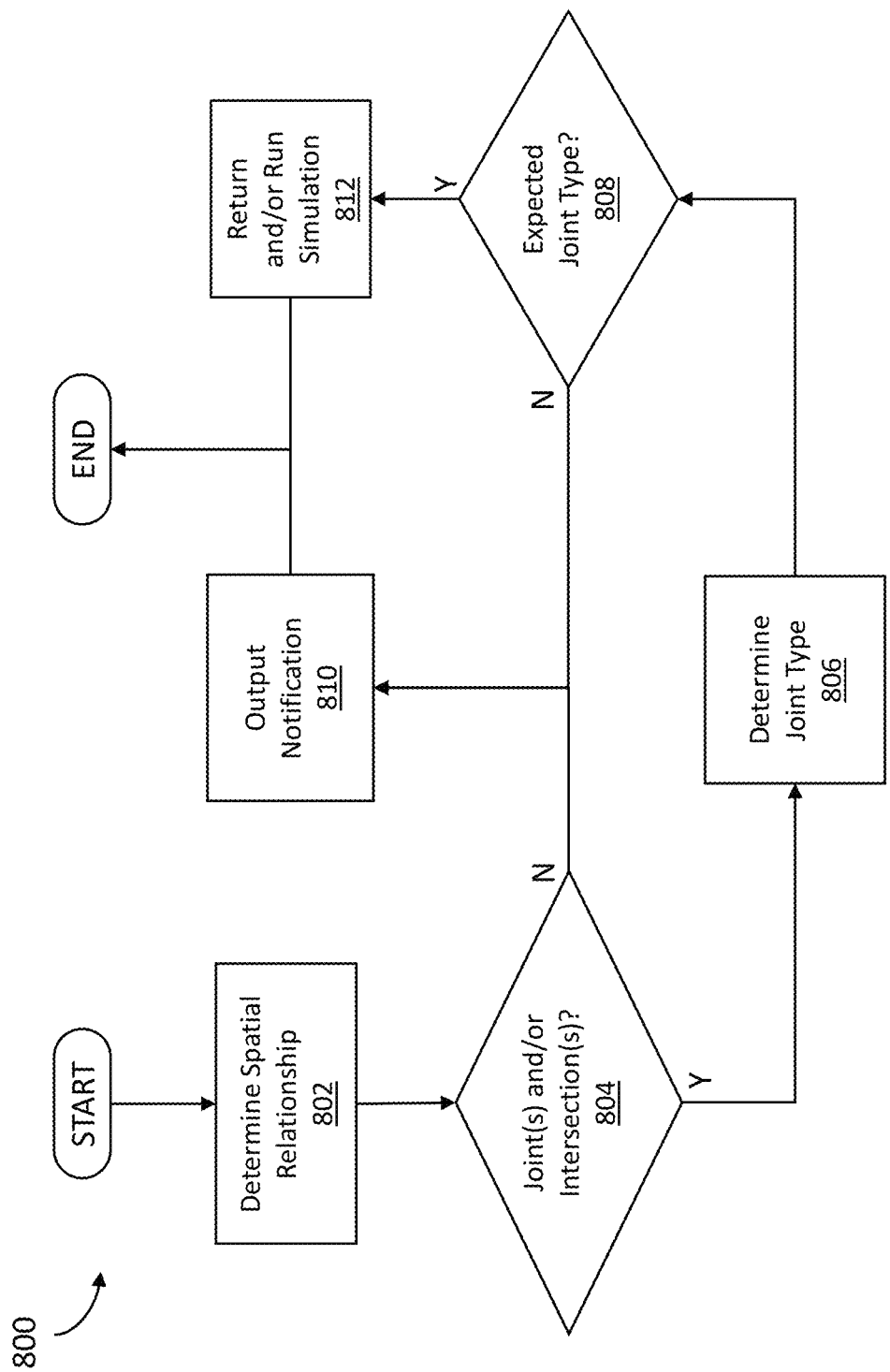
FIG. 8 is a flowchart illustrating an example workpiece configuration process, in accordance with aspects of this disclosure.

FIG. 8 is a flowchart illustrating an example workpiece configuration process 800. In some examples, the workpiece configuration process 800 may detect and/or determine a spatial relationship between two or more workpieces 900 based on data from the camera sensor(s) 208, mobile sensor(s) 206 and/or mounted sensor(s) 106. In some examples, the workpiece configuration process 800 may comprise machine readable instructions stored by the memory circuitry 226 of the mobile device 200. In some examples, the workpiece configuration process 800 may execute as part of the welding simulation program 300. For example, the workpiece configuration process 800 may execute during the preliminary configuration block 302 of the simulation program 300 and/or when the simulation loop recurs at block 316. In some examples, the workpiece configuration process 800 may execute independently of the welding simulation program 300, such as, for example, before execution of the welding simulation program 300.

In the example of FIG. 8, the workpiece configuration process 800 begins at block 802. At block 802, the workpiece configuration process 800 determines a spatial relationship (e.g., relative positions and/or orientations) between two or more workpieces 900. In some examples, the workpiece configuration process 800 may determine the spatial relationship based on data from the camera sensor(s) 208, mobile sensor(s) 206, and/or mounted sensor(s) 106. For example, the workpiece configuration process 800 may analyze and/or evaluate the data in an attempt to recognize features and/or characteristics of a workpiece 900, such as, for example, one or more markers 112 (and/or the absence of one or more markers 112). In some examples, the memory circuitry 226 may include and/or store images, models, diagrams, and/or other data relating to known features and/or characteristics of certain workpieces 900. Such features and/or characteristics may include, for example, types, positions, orientations, patterns, shapes, dimensions, numbers, arrangements, colors, and/or other properties of the markers 112 on the workpieces 900. In some examples, the features and/or characteristics may include, for example, one or more dimensions, profiles, shapes, and/or other properties of the workpieces 900 themselves. In some examples, the workpiece configuration process 800 may additionally consider the position and/or orientation of the mobile device 200 (and therefore the user) relative to the workpiece(s) 900 when determining the spatial relationship between the two or more workpieces 900.

In the example of FIG. 8, the workpiece configuration process 800 proceeds to block 804 after block 802. At block 804, the workpiece configuration process 800 determines whether the spatial relationship between two or more workpieces 900 is such that a joint and/or intersection has been formed between the two or more workpieces 900. Obviously, in examples where the workpiece configuration process 800 fails to recognize at least two workpieces 900 at block 802, the workpiece configuration process 800 will determine there is no joint or intersection between two or more workpieces 900. In some examples, the workpiece configuration process 800 may detect and/or recognize two or more workpieces 900 within the FOV 108 and/or vicinity of the mobile device 200, yet still fail to detect and/or recognize a joint and/or intersection between the two or more workpieces 900. For example, the two or more workpieces 900 may instead be separated by some distance, rather than intersecting. In the example of FIG. 8, the workpiece configuration process 800 proceeds to block 810 (discussed below) if the workpiece configuration process 800 determines that no joint and/or intersection has been formed between two or more workpieces 900.

In the example of FIG. 8, the workpiece configuration process 800 proceeds to block 806 after block 804 if the workpiece configuration process 800 determines that one or more joints and/or intersections have been formed between two or more workpieces 900. At block 806, the workpiece configuration process 800 determines what type of intersection(s) and/or joint(s) are formed by the two or more workpieces 900. For example, a joint may be lap joint, a butt joint, a corner joint, a T joint, an edge joint, a pipe joint, and/or some other type of joint.

In some examples, the determination of the type(s) of joint(s) and/or intersection(s) may be based on data from the camera sensor(s) 208, mobile sensor(s) 206, and/or mount sensor(s) relating to features and/or characteristics of the workpieces 900. In some examples, the determination of the type(s) of joint(s) and/or intersection(s) may additionally be based on data stored in memory circuitry 226 relating to features and/or characteristics of known workpieces 900, workpieces assemblies 1000, and/or joints formed between workpieces 900 to form one or more workpiece assemblies 1000. For example, the workpiece configuration process 800 may analyze and/or evaluate the sensor data collected by the camera sensor(s) 208, mobile sensor(s) 206, and/or mounted sensor(s) 106 and compare that sensor data to the data stored in memory circuitry 226 in an attempt to recognize one or more types of joints and/or intersections. In some examples, the stored data may be stored by and/or retrieved from the remote server(s) 116 instead of, or in addition to, the memory circuitry 226.

In some examples, the stored data may include, for example, images, models, diagrams, and/or other data relating to features and/or characteristics of known workpieces 900, workpieces assemblies 1000, and/or joints. In some examples, the features and/or characteristics may include the presence and/or absence of one or more markers 112. In some examples, the features and/or characteristics may include types, positions, orientations, patterns, shapes, dimensions, numbers, arrangements, colors, and/or other properties of the markers 112 on the workpieces 900. In some examples, the features and/or characteristics may include dimensions, profiles, shapes, and/or other properties of the workpieces 900 themselves. In some examples, the features and/or characteristics may include dimensions, profiles, shapes, and/or other properties of various workpiece assemblies 1000 that may be formed by combinations of workpieces 900. In some examples, the features and/or characteristics may include dimensions, profiles, shapes, and/or other properties of various joints that may be formed between workpieces 900 to create the workpiece assemblies 1000.

In the example of FIG. 8, the workpiece configuration process 800 proceeds to block 808 after block 806. At block 808, the workpiece configuration process 800 determines whether the joint type(s) determined at block 806 match one or more expected joint types. In some examples, the workpiece configuration process 800 may determine the one or more expected joint types based on one or more simulation parameters (e.g., exercise(s), joint type(s), difficulty, etc.). In some examples, there may be no expected joint type and/or the expected joint type(s) may be any joint type.

In some examples, block 808 is satisfied if there is at least one joint type determined at block 806 for each expected joint type1. In some examples, the number of joint types must match the exact same number of expected joint types (e.g., 6 lap joints=6 expected lap joints) for block 806 to be satisfied. In some examples, block 806 may also be satisfied if the number of joint types is more than the number of expected joint types (e.g., 8 lap joints >6 expected lap joints).

In the example of FIG. 8, the workpiece configuration process 800 proceeds to block 812 if the joint type(s) determined at block 806 match the expected joint type(s) at block 808. At block 812, the workpiece configuration process 800 returns and/or executes the welding simulation (e.g., at block 302 of the program 300). In some examples, the welding simulation may execute using the joint type(s) determined by the workpiece configuration process 800. In some examples, the workpiece configuration process 800 may also interface with the welding simulation program 300 to record a positive impact on the score/grade of the user at block 812, and/or output a notification to that effect. In the example of FIG. 8, the workpiece configuration process 800 ends after block 812. However, in some examples, the workpiece configuration process 800 may return to block 802 after block 812 instead of ending.

In the example of FIG. 8, the workpiece configuration process 800 proceeds to block 810 if the joint type(s) determined at block 806 do not match the expected joint type(s) at block 808, or if the workpiece configuration process 800 determines that there are no joints at block 804. At block 810, the workpiece configuration process 800 outputs a notification. In some examples, the workpiece configuration process 800 may also interface with the welding simulation program 300 to record a negative impact on the score/grade of the user at block 810, and/or output a notification to that effect. In some examples, a magnitude of the negative impact may be influenced by a degree of difference between the expected joint(s) and the determined joint(s), and/or whether there was any joint at all. As shown, after block 810, the workpiece configuration process 800 ends. However, in some examples, the orientation configuration process 600 may return to the beginning at block 802 after block 810, rather than ending.

In some examples, the notification(s) output at block 810 and/or 812 may be output via the speaker(s) 214, display screen 204, and/or output device(s) 216 of the mobile device 200. In some examples, the notification(s) may be output via a speaker and/or vibration device of the welding tool 700. In some examples, the notification(s) may include one or more arrows, icons, messages (e.g., visual and/or audio), animations, vibrations, and/or light flashes. For example, the welding tool 700 and/or mobile device 200 may vibrate to indicate that there are no recognized joints or that one or more of the recognized joints are different than the expected joint(s). As another example, speech may play from the welding tool 700 and/or mobile device 200 telling the user that the workpieces 900 should be rearranged (and/or how they should be rearranged) to produce an expected joint changed and/or workpiece assembly 1000. As another example, an icon, arrow, text message, one or more pictures, a video, and/or an animation may be shown via the display screen 204 of the mobile device telling the user that the workpieces 900 should be rearranged (and/or how they should be rearranged). In some examples, the notification may include an output (such as discussed above) indicating that the welding simulation will be terminated, disabled, and/or prevented from running until the workpieces 900 are rearranged. In some examples, the workpiece configuration process 800 may interface with the simulation program 300 to prevent execution of the welding simulation until the orientation is changed.

Figure 9B:
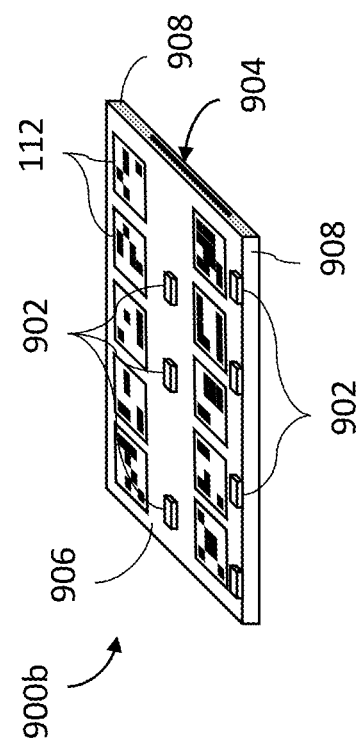
FIGS. 9*a*-9*f* depict example modular workpieces that may be used with the example weld training systems of FIGS. 1*a*-1*b*, in accordance with aspects of this disclosure.
Figure 9D:
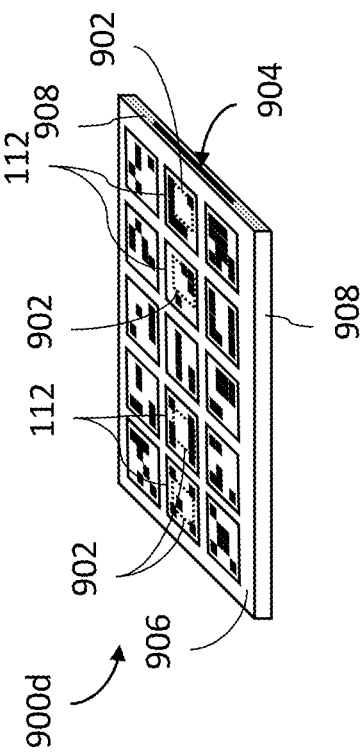
Figure 9A:
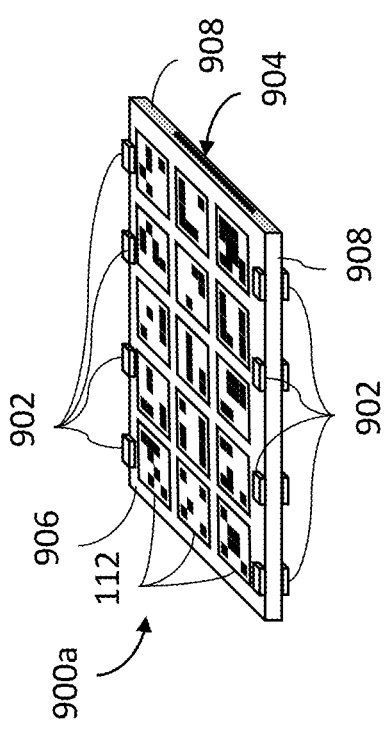
Figure 9C:
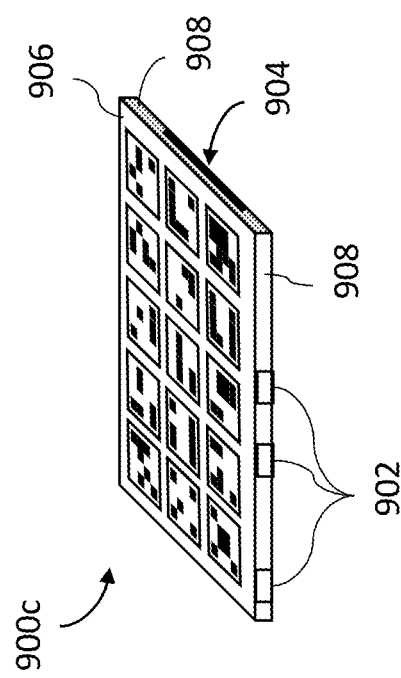
Figure 9E:
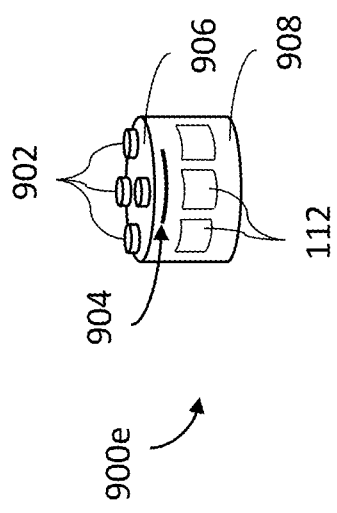
Figure 9F:
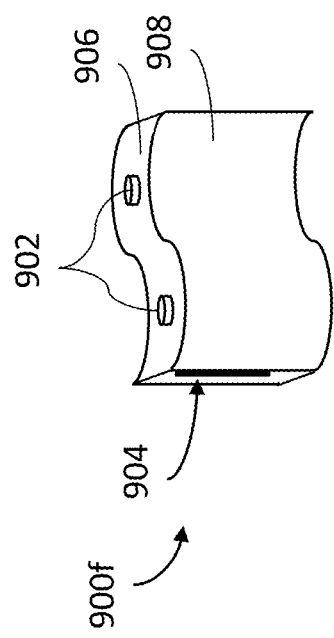
Figure 10B:
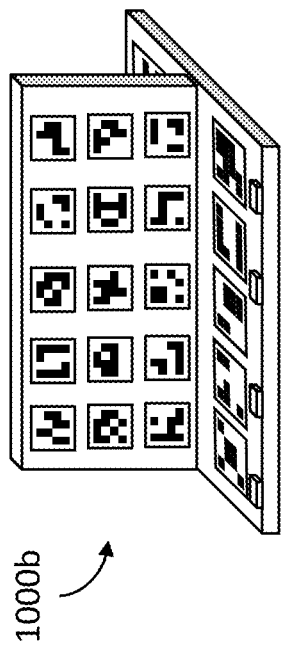
FIGS. 10*a*-10*f* depict example workpiece assemblies constructed from some of the modular workpieces of FIGS. 9*a*-9*f*, in accordance with aspect of this disclosure.
Figure 10D:
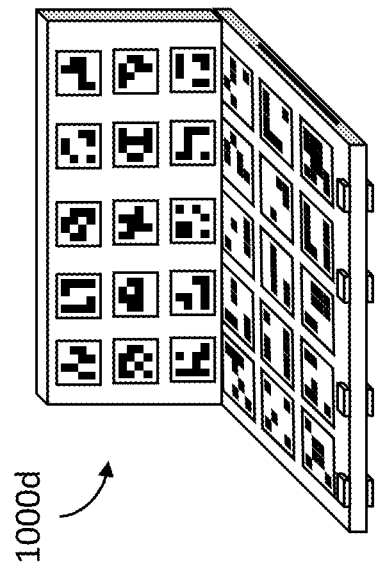
Figure 10A:
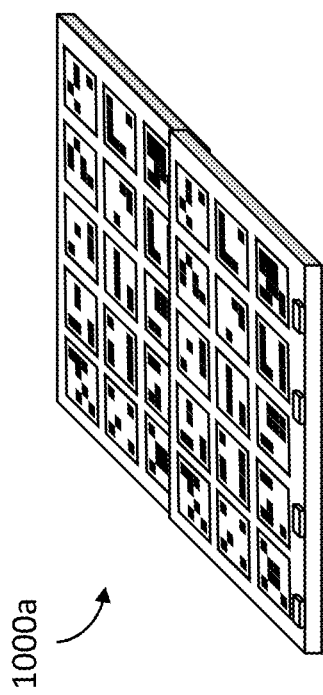
Figure 10C:
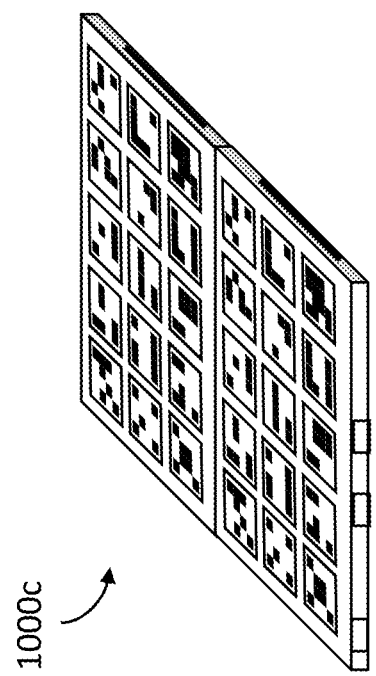
Figure 10E:
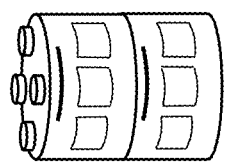
Figure 10F:
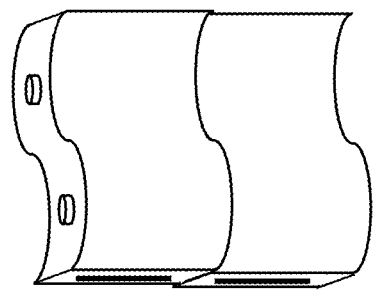
Figure 11A:
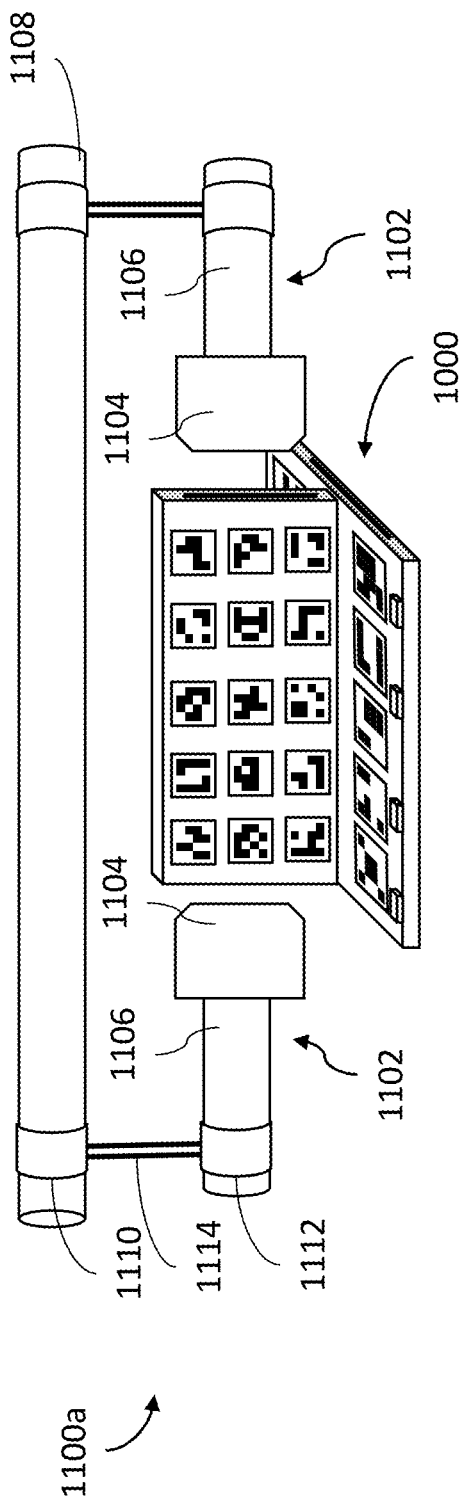
FIGS. 11*a*-11*b* depicts an example fixturing system of the example weld training systems of FIGS. 1*a*-1*b*, in accordance with aspects of this disclosure.
Figure 11B:
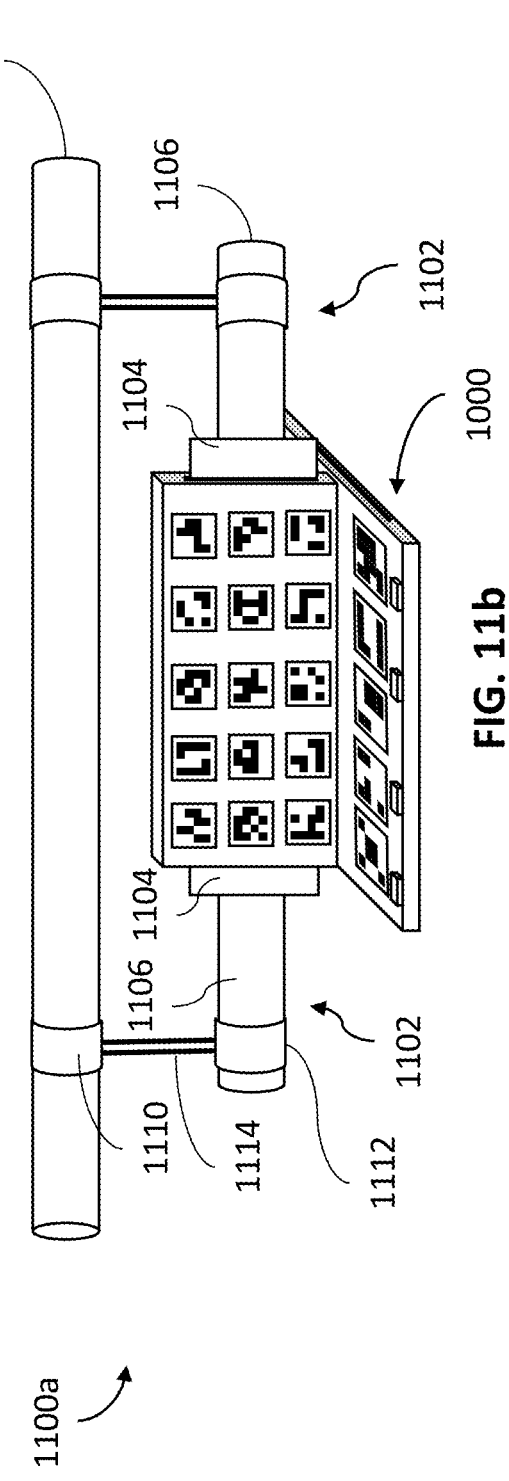
Figure 11C:
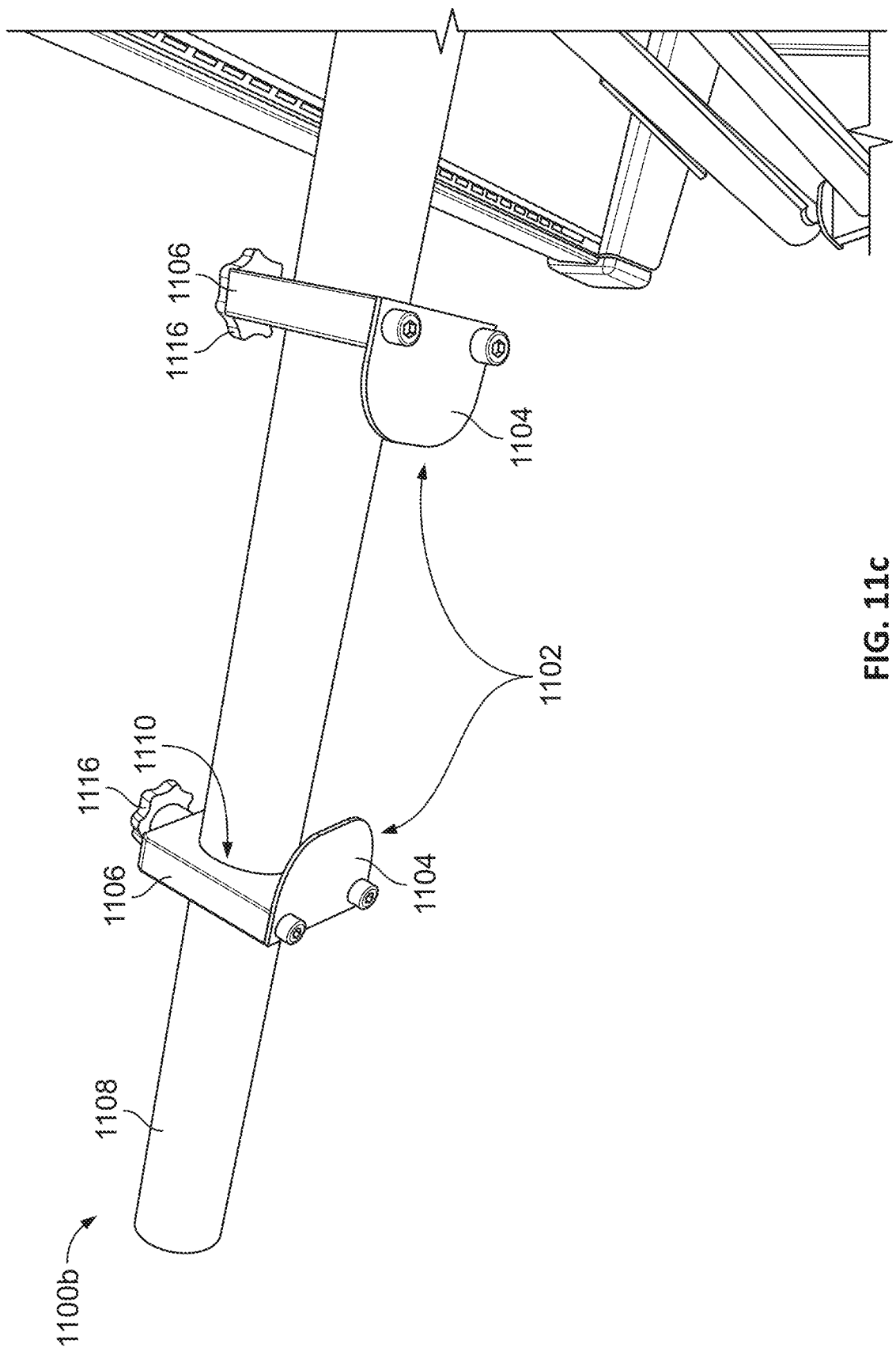
FIG. 11*c* depicts an example of an alternative fixture system that may be used with the example weld training systems of FIGS. 1*a*-1*b*, in accordance with aspects of this disclosure.

FIGS. 9a-9f depict example modular workpieces 900 that may be used with the weld training system 100. FIGS. 9a-9d depict substantially flat, cuboid, workpieces 900. FIG. 9e depicts a cylindrical workpiece 900. FIG. 9f shows a more irregularly shaped workpiece 900. In some examples, each modular workpiece 900 may include and/or be configured with one or more connectors 902 that enable the modular workpiece 900 to be tool-lessly connected and/or disconnected to another modular workpiece 900 to form a workpiece assembly 1000. FIGS. 10a-10f show example workpiece assemblies 1000 that may be constructed from the various workpieces 900. In some examples, each modular workpiece 900 may include and/or be configured with one or more fixture couplers 904 that enable the modular workpiece 900 to be tool-lessly connected and/or disconnected to a fixturing system 1100. FIGS. 11a-11c show example fixturing systems 1100 that may be used to capture and/or retain workpiece assemblies 1000.

In some examples, a connector 902 may be a magnet (north or south polarity), an electromagnet, a ferromagnetic material, a hook fastener, a loop fastener, a snap fastener, a button, a clamping fastener, a prong, a stud, an aperture, a socket, and/or some other type of tool-less connector. In some examples, tool-less connectors 902 may be advantageous because they can be easily connected to and/or engaged with other connectors 902 without the need for auxiliary tools (e.g., screwdrivers, hammers, etc.). Tool-less connectors 902 may also be advantageous over adhesives, as the tool-less connectors 902 may be continually connected, disconnected, and reconnected with negligible change to their effectiveness, unlike adhesives.

FIG. 9*a* shows an example modular workpiece 900*a*. As shown, the workpiece 900*a* is a substantially flat, cuboid, object. The workpiece 900*a* has a substantially flat upper surface 906 on which markers 112 are disposed. While hidden in the example of FIG. 9*a*, the workpiece 900*a* also has a lower surface opposite the upper surface 906. Several sidewalls 908 of the workpiece 900*a* connect the upper surface 906 and lower surface.

In the example of FIG. 9*a*, a fixture coupler 904 is disposed on a sidewall 908 of the workpiece 900*a*. As shown, the coupler 904 on the workpiece 900 is an aperture. However, in some examples, the coupler 904 may be any of the tool-less type connectors 902 described above. In some examples, the coupler 904 may be configured to tool-lessly engage with, and/or disengage from, a complementary coupler 904 of a fixturing system 1100, so as to hold the workpiece 900*a* in place for simulated welding.

In the example of FIG. 9*a*, arrays of connectors 902 are distributed along two opposite edges of the upper surface 906. Connectors 902 are also arrayed along an edge of the lower surface, substantially aligned with those on the upper surface 906. While hidden in the example of FIG. 9*a*, an array of connectors 902 may also be distributed along an opposite edge of the lower surface. In some examples, markers 112 may also be disposed on the lower surface. In some examples, arrays of connectors 902 may be distributed along the other edges of the workpiece 900 as well. In some examples, fewer connectors 902 may be distributed along the workpiece 900.

In the example of FIG. 9*a*, the connectors 902 along each edge are substantially evenly spaced and/or symmetrical. In some examples, this may allow each and/or any array of connectors 902 on the workpiece 900*a* to be used with any other workpiece 900 with a similar array of connectors 902. Thus, two workpieces 900*a* may be connected together in several different ways to form several different joints, such as, for example, the lap joint workpiece assembly 1000*a* shown in FIG. 10*a*.

FIG. 9*b* shows another example modular workpiece 900*b*. As shown, the workpiece 900*b* is also a substantially flat, cuboid, object. The workpiece 900*b* also has a substantially flat upper surface 906 on which markers 112 are disposed, and a sidewall 908 on which a coupler 904 is disposed. An array of connectors 902 are also substantially evenly distributed along an edge of the upper surface 906.

However, unlike the workpiece 900*a*, the workpiece 900*b* has no markers 112 across an approximate middle of the workpiece 900*b* in the example of FIG. 9*b*. Instead, an array of connectors 902 are distributed across the middle of the workpiece 900. The markers 112 have been removed across the middle to allow for another workpiece 900 to be connected across the middle. Nevertheless, in some examples, markers 112 may be disposed across the middle over or under the connectors 902. FIG. 9*d* shows a workpiece 900*d* with connectors across the middle arrayed in a substantially symmetrical arrangement underneath (and/or hidden by) the markers 112.

In the example of FIG. 9*b*, the connectors 902 are asymmetrically and/or unevenly distributed across the middle of the workpiece 900*b* in a poka yoke arrangement. In some examples, this asymmetric and/or poka yoke arrangement of connectors 902 may allow only connection to workpieces 900 with complementary arrangements of connectors 902. Additionally, the asymmetry may ensure the workpieces 900 only connect together in a particular configuration and/or orientation, thereby preventing unintended and/or incorrect arrangements and/or connections.

FIG. 9*c* shows a workpiece 900*c* that is similar to workpiece 900*a*. However, instead of connectors 902 arrayed along edges of the upper surface 906 and lower surface, workpiece 900*c* has connectors 902 arrayed along a sidewall 908 of the workpiece 900*c*. While only shown on one sidewall 908 in the example of FIG. 9*c*, in some examples, the connectors 902 may be arrayed along several sidewalls 908. The connectors 902 are also arranged asymmetrically, similar to workpiece 900*b*.

Given the complementary arrangement of connectors 902 in workpiece 900*b* and workpiece 900*c*, in some examples, the two workpieces 900 may connect together to form a T joint workpiece assembly 1000*b*. Such a T joint workpiece assembly 1000*b* is shown, for example, in FIG. 10*b*. In some examples, two workpieces 900*c* may connect together along the sidewalls 908 to form an edge joint workpiece assembly 1000*c*, such as shown, for example in FIG. 10*c*. In some examples, the connectors 902 on the sidewall 908 of workpiece 900*c* (and/or along a different sidewall 908) may be symmetrically arranged more like those of workpiece 900*a*, so that a connection with workpiece 900*a* may be possible to form a butt joint and/or corner joint, such as shown in the workpiece assembly 1000*d* of FIG. 10*d*. While the workpieces 900*a-d* in FIGS. 9*a*-9*d* are each shown with distinct arrangements to illustrate certain concepts, in some examples, a single workpiece 900 may include and/or combine two or more of these arrangements.

FIG. 9*e* shows a cylindrical workpiece 900*e* with connectors arranged in a circular pattern on its upper surface 906. While not shown due to the viewpoint of FIG. 9*e*, in some examples a similar arrangement (and/or a different arrangement) of connectors 902 may be arranged on a lower surface of the workpiece 900*e*, and/or on the sidewall 908 of the workpiece 900*e*. With such an arrangement of connectors 902, the workpieces 900 may be stacked to form a pipe joint workpiece assembly 1000*e*, such as shown, for example, in FIG. 10*e*.

While FIGS. 9*a*-9*e* show conventional shaped workpieces 900, in some examples, the weld training system 100 may include irregularly and/or unconventionally shaped workpieces. FIG. 9*f* depicts an example of an irregularly shaped workpiece 900*f*. As shown, the workpiece 900*f* is somewhat wave shaped, with connectors 902 arranged on an upper surface. In some examples, connectors 902 may also be arranged on the sidewalls 908. FIG. 10*f* shows an irregular workpiece assembly 100*f* formed from two workpieces 900*f*. Other workpiece 900 and/or workpiece assembly 1000 shapes and/or configurations are also contemplated by this disclosure. While FIGS. 10*a*-10*f* show workpiece assemblies 100 comprising two connected workpieces 900, in some examples, a workpiece assembly may comprise three or more connected workpieces 900.

FIGS. 11*a*-11*b* depict an example fixturing system 1100*a*. In some examples, the fixturing system 1100*a* may be configured to retain one or more workpieces 900 and/or workpiece assemblies 1000 in various positions, such as for welding, observation, inspection, temporary storage, and/or other appropriate activities. FIG. 11*a* shows the fixturing system 1100*a* in a disengaged position, where no workpiece assembly 1000 is retained by the fixturing system 1100. FIG.

11b shows the fixturing system 1100a in an engaged position where the fixturing system 1100a retains a workpiece assembly 1000 in a fixed position.

In the examples of FIGS. 11a-11b, the fixturing system 1100 includes two movable retainers 1102. Each retainer 1102 has a body 1106 attached to a coupler 1104. As shown, the coupler 1104 of each retainer 1102 is a prong. However, in some examples, the coupler 1104 may be any of the tool-less type connectors described above. In some examples, the coupler 1104 may be configured to tool-lessly engage with, and/or disengage from, a complementary coupler 904 on a workpiece 900, so as to hold the workpiece 900 in a fixed position for simulated welding.

In the example of FIGS. 11a-11b, each retainer 1102 of the fixturing system 1100 is linked to a fixture 1108 through a linking mechanism. In some examples, the fixture 1108 may be a tube, pipe, stanchion, table, platform, wall, and/or other appropriate surface. As shown, the linking mechanism includes a fixture clamp 1110 connected to the fixture 1108 and a retainer clamp 1112 connected to the retainer body 1106. The fixture clamp 1110 and retainer clamp 1112 are connected to one another through a mechanical link 1114. In some examples, the connection of the fixture clamp 1110 to the fixture 1108 may be loosened and/or tightened, such as, by example, loosening and/or tightening the fixture clamp 1110 via a tightening mechanism (not shown). By loosening and/or tightening the fixture clamps 1110, the retainers 1102 may be moved apart to allow a workpiece 900 and/or workpiece assembly 1000 to be put in place (e.g., as shown in FIG. 11a), then moved back together to retain the workpiece 900 and/or workpiece assembly 1000 via the couplers 1104 (e.g., as shown in FIG. 11b).

FIG. 11c shows an example of an alternative fixturing system 1100b. In the example of FIG. 11c, the fixture clamps 1110 are part of the retainer bodies 1106, and the retainer clamps 1112 and link 1114 are omitted. As shown, the tightening mechanism 1116 is also in mechanical communication with the retainer bodies 1106 and, through them, the fixture clamps 1110.

Figure 12:
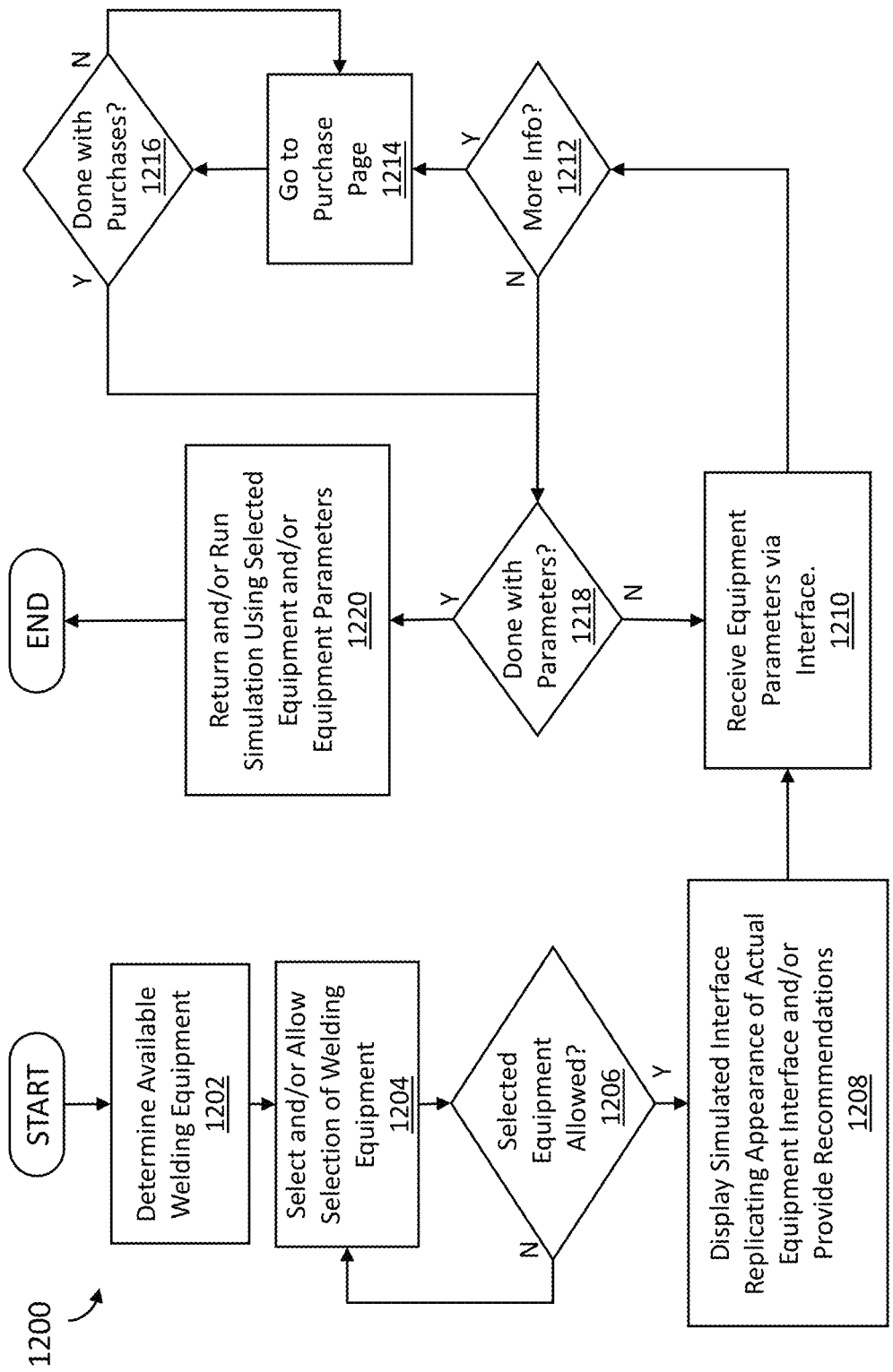
FIG. 12 is a flowchart illustrating an example equipment configuration process, in accordance with aspects of this disclosure.

FIG. 12 is a flowchart illustrating an example equipment configuration process 1200. In some examples, the equipment configuration process 1200 may generate a simulated equipment interface that replicates an appearance of an actual equipment interface corresponding to a selected piece of welding-type equipment. In some examples, the equipment configuration process 1200 may additionally allow the user to select equipment parameters that may be used to conduct the welding simulation via the simulated equipment interface. In some examples, the equipment configuration process 1200 may comprise machine readable instructions stored by the memory circuitry 226 of the mobile device 200. In some examples, the equipment configuration process 1200 may be part of the welding simulation program 300. For example, the equipment configuration process 1200 may execute during the preliminary configuration block 302 of the simulation program 300, and/or during the welding simulation. In some examples, the equipment configuration process 1200 may execute independently of the welding simulation program 300, such as, for example, before, during, and/or after the execution of the welding simulation program 300.

In the example of FIG. 12, the equipment configuration process 1200 begins at block 1202. At block 1202, the equipment configuration process 1200 determines what welding-type equipment may be selected for the welding simulation. In some examples, this determination may be based on certain user information, such as, for example, what equipment the user currently uses, has previously purchased, and/or is authorized to use for the welding simulation. In some examples, this user information may be stored in memory circuitry 226 and/or received from the remote server(s) 114 (e.g., in response to one or more signals and/or queries). In some examples, the determination may be based on one or more simulation parameters (e.g., exercise, difficulty, realism, user characteristics, etc.).

In the example of FIG. 12, the equipment configuration process 1200 proceeds to block 1204 after block 1202. At block 1204, the equipment configuration process 1200 automatically selects, or allows a user to select, a piece of welding-type equipment. In some examples, the equipment configuration process 1200 may automatically select the welding-type equipment when there is only one appropriate option, such as, for example, when a selected simulation parameter (e.g., exercise) dictates that a particular piece of welding-type equipment be used, or when the user information only allows for one particular piece of welding-type equipment. In some examples, the equipment configuration process 1200 may automatically select a default piece of welding even if there are multiple appropriate options, and let the user decide whether to keep or change the default welding-type equipment.

Figure 13:
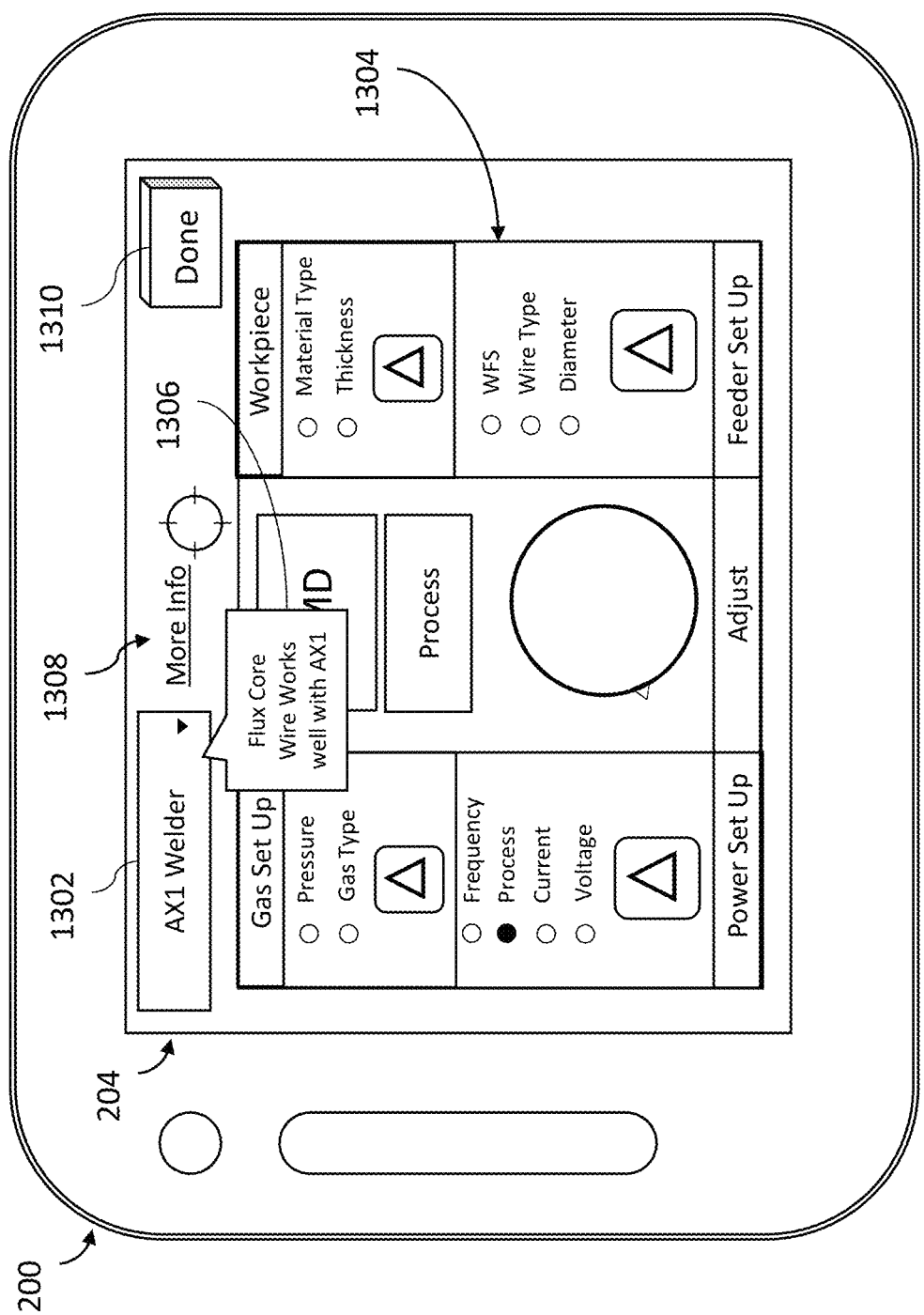
FIG. 13 depicts an example simulated equipment interface that may be displayed during operation of the example equipment configuration process of FIG. 12, in accordance with aspects of this disclosure.

In some examples, the equipment configuration process 1200 may allow a user to select the welding-type equipment using the welding tool 700, display screen 204, one or more input devices 218, mobile sensors 206, camera sensors 208, and/or other appropriate mechanisms. In some examples, the equipment configuration process 1200 may allow a user to select the welding-type equipment via a dropdown menu 1302 displayed to the user, such as shown in FIG. 13, for example. For example, the equipment configuration process 1200 may display the dropdown menu 1302, and the user may use speech, the welding tool 700, and/or some other means to make selections. In some examples, the equipment configuration process 1200 may allow the user to select the welding-type equipment by entering an identifier (e.g., serial number) of a real piece of welding-type equipment, scanning a graphical indicia (e.g., QR code, barcode, etc.) having identifying information of a real piece of welding-type equipment encoded, taking a picture of a real piece of welding-type equipment, and/or some other means. In some examples, the equipment configuration process 1200 may prohibit selection of welding-type equipment determined not to be available at block 1202.

In the example of FIG. 12, the equipment configuration process 1200 proceeds to block 1206 after block 1204. At block 1206, the equipment configuration process 1200 checks to make sure the selected welding-type equipment is one of the pieces of welding-type equipment determined to be available at block 1202. If not, the equipment configuration process 1200 returns to block 1204. If so, the equipment configuration process 1200 proceeds to block 1208.

In the example of FIG. 12, the equipment configuration process 1200 displays on the display screen 204 of the mobile device 200 a simulated equipment interface 1304 that replicates the appearance of an actual equipment interface 1404 of the selected welding-type equipment. In some examples, this replication may help orient a user who is already familiar with the actual interface 1404 of the selected welding-type equipment, thereby making them more comfortable with the welding simulation. In some examples, the replication may help familiarize users with new welding-type equipment interfaces if the selected welding-type equipment is not one with which they are already readily familiar. While described as being displayed on the display screen 204 of the mobile device, in some examples, the simulated equipment interface 1304 may instead be displayed on the display screen(s) 204 of the desktop device 250.

Figure 14:
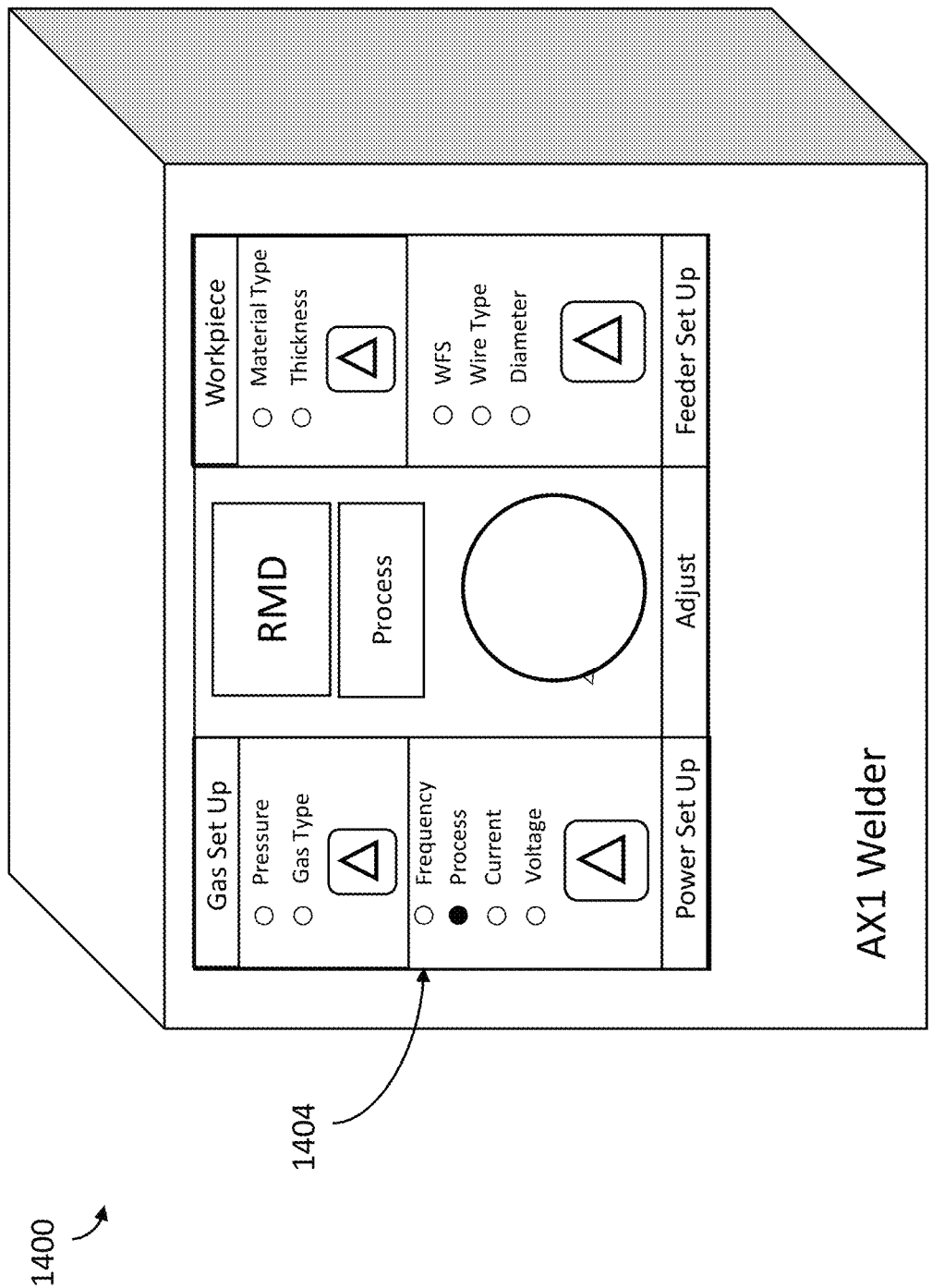
FIG. 14 depicts example piece of welding equipment with an actual equipment interface that may be used as a basis for the simulated equipment interface of FIG. 13, in accordance with aspects of this disclosure.

FIG. 13 shows an example of a simulated equipment interface 1304 displayed on the display screen 204 of the mobile device 200. As shown, the user has selected an AX1 Welder as the equipment. FIG. 14 shows an example of an actual AX1 Welder 1400, with its actual equipment interface 1404. As shown, the simulated equipment interface 1304 replicates an actual equipment interface 1404 of the AX1 Welder 1400, with simulated buttons, options, and display screens, as well as a simulated dial. In some examples, the user may use the simulated equipment interface 1304 to select equipment parameters to use in the welding simulation.

In some examples, the equipment configuration process 1200 may additionally provide one or more recommendations to the user (e.g., via the display screen 204 and/or speaker(s) 214) based on the selected welding-type equipment. For example, the equipment configuration process 1200 may recommend equipment parameters (e.g., gas type, wire type, etc.) and/or complementary welding-type equipment based on the selected welding-type equipment. In some examples, the equipment configuration process 1200 may store (e.g., in memory circuitry 226) recommended equipment parameters associated with certain welding-type equipment and/or other simulation parameters (e.g., exercise, realism, difficult, goals, etc.), and query the stored recommendations. In some examples, the equipment configuration process 1200 may receive recommendations from the remote server(s) 114 (e.g., in response to one or more similar queries and/or signals). In the example of FIG. 13 the equipment configuration process 1200 has displayed a recommendation message 1306 recommended a certain wire type for the selected welding-type equipment.

In the example of FIG. 12, the equipment configuration process 1200 proceeds to block 1210 after block 1208. At block 1210, the equipment configuration process 1200 receives the equipment parameters from the user via the simulated equipment interface 1304. In some examples, the equipment configuration process 1200 may also receive other selections from the user at block 1210. For example, a user may select to receive more information about the welding-type equipment they have selected. In the example of FIG. 13, the display screen 204 displays a link 1308 to an informational page (e.g., online and/or locally stored) where the user may access more information about the selected welding-type equipment. In some examples, selection of this link 1308 may direct the user to an informational page that is also a purchasing page where the selected welding-type equipment, a recommended (or other) consumable (e.g., wire, gas, contact tip, etc.), complementary welding-type equipment, and/or other items may be purchased.

In the example of FIG. 12, the equipment configuration process 1200 proceeds to block 1212 after block 1210. At block 1212 the equipment configuration process 1200 determines whether the user has selected the link 1308. If so, the equipment configuration process 1200 proceeds to block 1214, where the user is taken to the informational and/or purchasing page associated with the link 1308. If the user does not select the link 1308 (or when the user has finished with the informational/purchasing page), the equipment configuration process 1200 proceeds to block 1218.

In the example of FIG. 12, the equipment configuration process 1200 determines whether the user has finished entering equipment parameters at block 1218. In some examples, the equipment configuration process 1200 may determine the user has finished when the user makes an explicit selection that they have finished (e.g., by selecting the "Done" icon 1310 in FIG. 13). In some examples, the equipment configuration process 1200 may determine the user has finished when all or a sufficient number of equipment parameters have been entered. In some examples, the sufficient number may be based on other simulation parameters (e.g., exercise, goal, user characteristics etc.). In some examples, the equipment configuration process 1200 may prohibit finishing until all or a sufficient number of equipment parameters have been entered. In the example of FIG. 12, the equipment configuration process 1200 returns to block 1210 if the equipment configuration process 1200 determines the user has not finished entering equipment parameters.

In the example of FIG. 12, the equipment configuration process 1200 proceeds to block 1220 if the equipment configuration process 1200 determines the user has finished entering equipment parameters. At block 1220 the equipment configuration process 1200 either returns to the main welding simulation program 300, where a welding simulation may be run using the selected equipment parameters, or begins the welding simulation itself using the selected equipment parameters. As shown, the equipment configuration process 1200 ends after block 1220.

The present disclosure contemplates using mobile devices 200 (and/or desktop devices 250) to conduct welding simulations. In some examples, it may be advantageous to use mobile devices 200 due to their availability, relative affordability, and/or technical power. The disclosure further contemplates automatically detecting whether an orientation of the mobile device 200 is proper for the simulation, and notifying the user if not.

The present disclosure additionally contemplates using modular workpieces 900 for conducting welding simulations. In some examples, the modular workpieces 900 may be configured to tool-lessly connect to, and/or disconnect from, other modular workpieces 900 to form various workpiece assemblies 1000. In some examples, tool-less connectors 902 may be advantageous because they can be easily connected to and/or engaged with other connectors 902 without the need for auxiliary tools (e.g., screwdrivers, hammers, etc.). Tool-less connectors 902 may also be advantageous over adhesives, as the tool-less connectors 902 may be continually connected, disconnected, and reconnected with negligible change to their effectiveness, unlike adhesives. In some examples, the welding simulation may further be configured to recognize different joints formed by the modular workpieces 900, and conduct the welding simulation accordingly.

The present disclosure further contemplates using simulated equipment interfaces 1304 that replicate the appearance of actual equipment interfaces 1404 of actual welding-type equipment. In some examples, this replication may help orient a user who is already familiar with a particular piece of welding-type equipment and/or its actual equipment interface 1404, thereby making them more comfortable with the welding simulation. In some examples, the replication may help users who are unfamiliar with a particular piece of welding-type equipment become familiar with the welding-type equipment (and/or its actual equipment interface 1404). Additionally, the present disclosure contemplates simulating certain welding effects in accordance with the way the effects might occur in the real world when real welding is performed using the real world welding-type equipment.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Some examples may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain examples, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular examples disclosed, but that the present method and/or system will include all implementations falling within the scope of the appended claims.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, "mobile device" or "mobile electronic device" refers to a handheld electronic computing apparatus having a casing that houses a camera, a display screen, processing circuitry, and communication circuitry in a single unit.

As used herein, "desktop device" or "desktop electronic device" refers to a non-handheld electronic computing apparatus that houses processing circuitry, communication circuitry, and possibly a display in a single unit, while also controlling (and/or powering) a camera and a display that are housed in a separate unit (e.g., a helmet shell) outside of the single unit of the non-handheld electronic computing apparatus.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory circuitry" means computer hardware or circuitry to store information for use by a processor and/or other digital device. The memory and/or memory circuitry can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

As used herein, welding-type refers to welding, cladding, brazing, plasma cutting, induction heating, carbon arc cutting, and/or hot wire welding/preheating (including laser welding and laser cladding), carbon arc cutting or gouging, and/or resistive preheating.

As used herein, welding-type power refers power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, hardware, and/or software may be done via hardware, software (including firmware), or a combination of hardware and software, and may include physical disconnection, de-energization, and/or a software control that restricts commands from being implemented to activate the circuitry, actuators, hardware, and/or software. Similarly, enabling of circuitry, actuators, hardware, and/or software may be done via hardware, software (including firmware), or a combination of hardware and software, using the same mechanisms used for disabling.

What is claimed is:

1. A weld training system, comprising:
    a mobile electronic device configured to conduct a weld training simulation, the mobile electronic device comprising:
        a display screen,
        processing circuitry, and
        memory circuitry comprising computer readable instructions which, when executed by the processing circuitry, cause the processing circuitry to:
            select a piece of welding-type equipment from several pieces of welding-type equipment,
            select one or more simulation parameters, and
            simulate a welding arc, a weld puddle, a weld bead, a welding sound, or a welding fume via the weld training simulation based on the piece of welding-type equipment that was selected and the one or more simulation parameters that were selected,
            the welding arc, the weld puddle, the weld bead, the welding sound, or the welding fume being simulated differently than if a different piece of welding-type equipment had been selected and an identical set of the one or more simulation parameters had been selected.

2. The system of claim 1, wherein the memory circuitry comprises computer readable instructions which, when executed by the processing circuitry, cause the processing circuitry to display, on the display screen, a simulated welding-type equipment interface based on the piece of welding-type equipment that was selected, wherein the simulated welding-type equipment interface replicates an appearance of an actual equipment interface of the piece of welding-type equipment.

3. The system of claim 1, wherein the one or more simulation parameters comprise one or more of a welding process, a welding current, a welding voltage, a pulse frequency, a gas type, a gas pressure, a wire type, wire diameter, a wire feed speed, a workpiece material type, or a workpiece material thickness, and the piece of welding-type equipment comprises a welding-type power supply, a gas supply, or a wire feeder, or a welding tool.

4. The system of claim 1, wherein the memory circuitry comprises computer readable instructions which, when executed by the processing circuitry, cause the processing circuitry to:
    select the piece of welding-type equipment based on machine-readable indicia encoding equipment identifying information, the machine-readable indicia comprising graphical indicia encoding equipment identifying information, or
    select the piece of welding-type equipment based on an image of the piece of welding-type equipment captured by a camera of the mobile electronic device.

5. The system of claim 1, wherein the memory circuitry comprises computer readable instructions which, when executed by the processing circuitry, further cause the processing circuitry to provide a recommendation of a welding consumable or complementary welding-type equipment based on the piece of welding-type equipment that was selected or a simulation parameter of the one or more simulation parameters, the simulation parameter comprising a realism setting of the weld training simulation, a difficulty setting of the weld training simulation, or a simulation goal.

6. The system of claim 5, wherein the memory circuitry comprises computer readable instructions which, when executed by the processing circuitry, further cause the processing circuitry to display, on the display screen, an option to purchase the piece of welding-type equipment, welding consumable, or complementary welding-type equipment, and the option to purchase comprises a link to a purchase page where the piece of welding-type equipment, welding consumable, or complementary welding-type equipment can be purchased.

7. The system of claim 1, wherein the memory circuitry comprises computer readable instructions which, when executed by the processing circuitry, cause the processing circuitry to simulate an intensity of the welding arc, the weld puddle, the weld bead, the welding sound, or the welding fume based on the piece of welding-type equipment and the one or more simulation parameters that were selected, the intensity of the welding arc, the weld puddle, the weld bead, the welding sound, or the welding fume being simulated differently than if the different piece of welding-type equipment had been selected and the identical set of the one or more simulation parameters had been selected.

8. The system of claim 1, wherein the memory circuitry comprises computer readable instructions which, when executed by the processing circuitry, further cause the processing circuitry to:
    identify one or more available pieces of welding-type equipment that are available for selection, or one or more unavailable pieces of welding-type equipment that are unavailable for selection, based on a simulation exercise assigned to the user, one or more simulation exercises previously completed by the user, one or more scores previously achieved by the user, a dominant hand of the user, a height of the user, a realism setting of the weld training simulation, or a difficulty setting of the weld training simulation, and
    prohibit selection of a prohibited piece of welding-type equipment in response to the one or more unavailable pieces of welding-type equipment including the prohibited piece of welding-type equipment, or the one or more available pieces of welding-type equipment not including the prohibited piece of welding-type equipment.

9. The system of claim 1, wherein the welding simulation simulates the welding arc, the weld puddle, the weld bead, the welding sound, or the welding fume based on that which would occur in the real world when welding using the piece of welding-type equipment that was selected.

10. The system of claim 1, wherein the memory circuitry comprises computer readable instructions which, when executed by the processing circuitry, further cause the processing circuitry to:
 identify one or more available pieces of welding-type equipment that are available for selection, or one or more unavailable pieces of welding-type equipment that are unavailable for selection, based on what equipment a user currently uses, what equipment the user has previously purchased, or what equipment the user is authorized to use for the welding simulation, and
 prohibit selection of a prohibited piece of welding-type equipment in response to the one or more unavailable pieces of welding-type equipment including the prohibited piece of welding-type equipment, or the one or more available pieces of welding-type equipment not including the prohibited piece of welding-type equipment.

11. A mobile electronic device configured to conduct a weld training simulation, the mobile electronic device comprising:
 a display screen;
 processing circuitry; and
 memory circuitry comprising computer readable instructions which, when executed by the processing circuitry, cause the processing circuitry to:
  select a piece of welding-type equipment from several pieces of welding-type equipment,
  select one or more simulation parameters, and
  simulate a welding arc, a weld puddle, a weld bead, a welding sound, or a welding fume via the weld training simulation based on the piece of welding-type equipment that was selected and the one or more simulation parameters that were selected,
  the welding arc, the weld puddle, the weld bead, the welding sound, or the welding fume being simulated differently than if a different piece of welding-type equipment had been selected and an identical set of the one or more simulation parameters had been selected.

12. The mobile electronic device of claim 11, wherein the memory circuitry comprises computer readable instructions which, when executed by the processing circuitry, cause the processing circuitry to display, on the display screen, a simulated welding-type equipment interface based on the piece of welding-type equipment that was selected, wherein the simulated welding-type equipment interface replicates an appearance of an actual equipment interface of the piece of welding-type equipment.

13. The mobile electronic device of claim 11, wherein the one or more simulation parameters comprise one or more of a welding process, a welding current, a welding voltage, a pulse frequency, a gas type, a gas pressure, a wire type, wire diameter, a wire feed speed, a workpiece material type, or a workpiece material thickness, and the piece of welding-type equipment comprises a welding-type power supply, a gas supply, or a wire feeder, or a welding tool.

14. The mobile electronic device of claim 11, wherein the memory circuitry comprises computer readable instructions which, when executed by the processing circuitry, cause the processing circuitry to:
 select the piece of welding-type equipment based on machine-readable indicia encoding equipment identifying information, the machine-readable indicia comprising graphical indicia, or
 select the piece of welding-type equipment based on an image of the piece of welding-type equipment captured by a camera of the mobile electronic device.

15. The mobile electronic device of claim 11, wherein the memory circuitry comprises computer readable instructions which, when executed by the processing circuitry, further cause the processing circuitry to provide a recommendation of a welding consumable or complementary welding-type equipment based on the piece of welding-type equipment that was selected and a simulation parameter of the one or more simulation parameters, the simulation parameter comprising a realism setting of the weld training simulation, a difficulty setting of the weld training simulation, or a simulation goal.

16. The mobile electronic device of claim 11, wherein the weld training simulation simulates the welding sound or the welding fume based on the piece of welding-type equipment that was selected.

17. The mobile electronic device of claim 11, wherein the memory circuitry comprises computer readable instructions which, when executed by the processing circuitry, cause the processing circuitry to simulate an intensity of the welding arc, the weld puddle, the weld bead, the welding sound, or the welding fume based on the piece of welding-type equipment and the one or more simulation parameters that were selected, the intensity of the welding arc, the weld puddle, the weld bead, the welding sound, or the welding fume being simulated differently than if the different piece of welding-type equipment had been selected and the identical set of the one or more simulation parameters had been selected.

18. The mobile electronic device of claim 11, wherein the memory circuitry comprises computer readable instructions which, when executed by the processing circuitry, further cause the processing circuitry to:
 identify one or more available pieces of welding-type equipment that are available for selection, or one or more unavailable pieces of welding-type equipment that are unavailable for selection, based on a simulation exercise assigned to the user, one or more simulation exercises previously completed by the user, one or more scores previously achieved by the user, a dominant hand of the user, a height of the user, a realism setting of the weld training simulation, or a difficulty setting of the weld training simulation, and
 prohibit selection of a prohibited piece of welding-type equipment in response to the one or more unavailable pieces of welding-type equipment including the prohibited piece of welding-type equipment, or the one or more available pieces of welding-type equipment not including the prohibited piece of welding-type equipment.

19. The mobile electronic device of claim 11, wherein the welding simulation simulates the welding arc, the weld puddle, the weld bead, the welding sound, or the welding fume based on that which would occur in the real world when welding using the piece of welding-type equipment that was selected.

20. The mobile electronic device of claim 11, wherein the memory circuitry comprises computer readable instructions which, when executed by the processing circuitry, further cause the processing circuitry to:
 identify one or more available pieces of welding-type equipment that are available for selection, or one or more unavailable pieces of welding-type equipment that are unavailable for selection, based on what equipment a user currently uses, what equipment the user has previously purchased, or what equipment the user is authorized to use for the welding simulation, and
prohibit selection of a prohibited piece of welding-type equipment in response to the one or more unavailable pieces of welding-type equipment including the prohibited piece of welding-type equipment, or the one or more available pieces of welding-type equipment not including the prohibited piece of welding-type equipment.

\* \* \* \* \*